(12) United States Patent
Fujii

(10) Patent No.: US 8,664,297 B2
(45) Date of Patent: Mar. 4, 2014

(54) INK SET FOR FORMING MULTIPLE LAYERS, INK JET RECORDING METHOD, AND PRINTED MATERIAL

(75) Inventor: Yuusuke Fujii, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/607,154

(22) Filed: Sep. 7, 2012

(65) Prior Publication Data

US 2013/0065029 A1   Mar. 14, 2013

(30) Foreign Application Priority Data

Sep. 9, 2011   (JP) .................................. 2011-197565

(51) Int. Cl.
*C09D 11/10*   (2006.01)

(52) U.S. Cl.
USPC .......... 523/160; 523/161; 428/195.1; 347/37; 524/548

(58) Field of Classification Search
USPC .................................................. 523/160, 161
See application file for complete search history.

(56) References Cited

U.S. PATENT DOCUMENTS

2007/0211111 A1* 9/2007 Hayata ............................ 347/52

FOREIGN PATENT DOCUMENTS

| JP | 2007-131755 A | 5/2007 |
|---|---|---|
| JP | 2008-100501 A | 5/2008 |
| JP | 2010-000788 A | 1/2010 |
| JP | 2011-105802 A | 6/2011 |

OTHER PUBLICATIONS

Japanese Office Action in Appl'n No. 2011-197565, dated Sep. 3, 2013.

* cited by examiner

*Primary Examiner* — Doris Lee
(74) *Attorney, Agent, or Firm* — Sughrue Mion, PLLC

(57) ABSTRACT

An ink set for forming multiple layers comprising a colored ink composition comprising a yellow ink composition, a magenta ink composition, a cyan ink composition, and a black ink composition, and a white ink composition, each ink composition comprising (Component A) a radically polymerizable compound and (Component B) a radical polymerization initiator, Component A above comprising (Component A-1) an N-vinyl compound and (Component A-2) a compound represented by Formula (a-2) below, and when the content of the radical polymerization initiator in the white ink composition is X and the content of the radical polymerization initiator in the magenta ink composition is Y, Expression (1) below being satisfied wherein $R^1$, $R^2$, and $R^3$ independently denote a hydrogen atom, a methyl group, or an ethyl group, and $X^2$ denotes a single bond or a divalent linking group.

$$0.1 \le \frac{Y}{X} < 1 \quad (1)$$

20 Claims, 11 Drawing Sheets

FIG.1
(A) 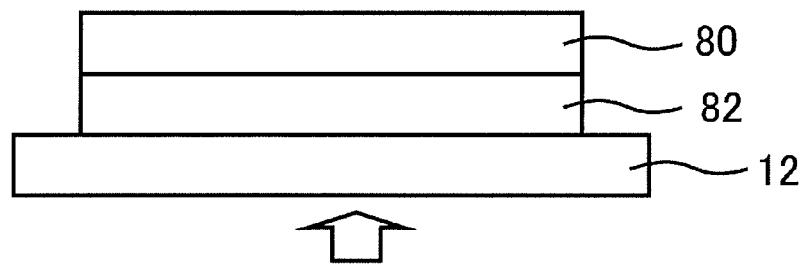
(B) 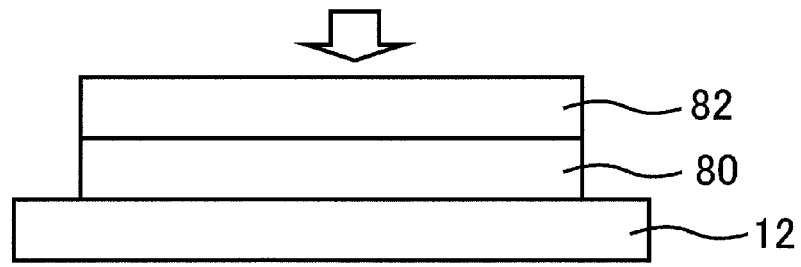

INK SET FOR FORMING MULTIPLE LAYERS, INK JET RECORDING METHOD, AND PRINTED MATERIAL

TECHNICAL FIELD

The present invention relates to an ink set for forming multiple layers, an ink jet recording method, and a printed material.

BACKGROUND ART

As image recording methods for forming an image on a recording medium such as paper based on an image data signal, there are an electrophotographic system, sublimation type and melt type thermal transfer systems, an inkjet system, etc.

With regard to the inkjet system, the printing equipment is inexpensive, it is not necessary to use a plate when printing, and since an image is formed directly on a recording medium by discharging an ink composition only on a required image area, the ink composition can be used efficiently and the running cost is low, particularly in the case of small lot production. Furthermore, there is little noise and it is excellent as an image recording system, and has been attracting attention in recent years.

Among them, an inkjet recording ink composition (radiation-curing inkjet recording ink composition), which is curable upon exposure to radiation such as UV rays, is an excellent system from the viewpoint of it being possible to print on various types of recording media because, compared with a solvent-based ink composition, the drying properties are excellent and an image is resistant to spreading since the majority of the components in the ink composition cure upon exposure to radiation such as UV rays.

Various radiation curing ink compositions have previously been proposed; JP-A-2007-131755 (JP-A denotes a Japanese unexamined patent application publication) describes an actinic radiation curable ink for ink jet comprising a polymerizable monomer, the polymerizable monomer comprising a monofunctional monomer at 80 wt % to 99.99 wt % and a polyfunctional monomer at 20 wt % to 0.01 wt % relative to the entire monomer, and the percentage change of weight of a cured film of said ink when immersed in said ink for 30 seconds being no greater than 30 wt %.

Currently, when printing is carried out using an ink jet printer by firing ink droplets onto plain paper or a non-water absorbing recording medium such as a plastic, higher speed, higher image quality, and fixation onto the recording medium are important objects.

JP-A-2008-100501 discloses an ink set for ink jet recording for the purpose of improving image uniformity, etc. between various recording media, the ink set comprising at least a colored liquid composition comprising at least a polymerizable compound, a photopolymerization initiator, and a colorant and an undercoat liquid composition comprising at least a polymerizable compound and a photopolymerization initiator, the polymerizable compound contained in the colored liquid composition comprising at least one type of monofunctional monomer and at least one type of polyfunctional monomer, the amount of monofunctional monomer in the entire colored liquid composition being 10 to 70 wt %, and the amount of polyfunctional monomer being 10 to 50 wt %.

Furthermore, improving the durability, etc. of a printed material is also an object.

JP-A-2010-000788 discloses an ink jet printed material for the purpose of obtaining an ink jet printed material having excellent weatherability and durability, the ink jet printed material having a transparent protective layer formed on the surface, the ink jet printed material comprising a substrate and a picture layer formed above the substrate by ink jet type printing, the transparent protective layer being formed above the picture layer, the picture layer comprising a UV-curable resin ink that cures upon irradiation with UV, and the transparent protective layer comprising an electron beam-curable resin that cures upon irradiation with an electron beam.

SUMMARY OF INVENTION

It is an object of the present invention to provide an ink set for forming multiple layers that can form an image having excellent substrate—ink and ink—ink adhesion when forming multiple layers and excellent image quality and surface gloss, an ink jet recording method employing the ink set and having high productivity, and a printed material recorded by the ink jet recording method.

The above-mentioned object has been attained by means described in <1>, <10>, or <15> below, which are described together with <2> to <9> and <11> to <14>, which are preferred embodiments.

<1> An ink set for forming multiple layers comprising a colored ink composition comprising a yellow ink composition, a magenta ink composition, a cyan ink composition, and a black ink composition, and a white ink composition, each ink composition comprising (Component A) a radically polymerizable compound and (Component B) a radical polymerization initiator, Component A above comprising (Component A-1) an N-vinyl compound and (Component A-2) a compound represented by Formula (a-2) below, and when the content of the radical polymerization initiator in the white ink composition is X and the content of the radical polymerization initiator in the magenta ink composition is Y, Expression (1) below being satisfied

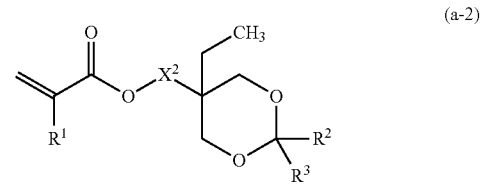

(a-2)

wherein $R^1$, $R^2$, and $R^3$ independently denote a hydrogen atom, a methyl group, or an ethyl group, and $X^2$ denotes a single bond or a divalent linking group, $$0.1 \leq \frac{Y}{X} < 1 \quad (1)$$

<2> the ink set for forming multiple layers according to <1>, wherein when the content of the radical polymerization initiator in the white ink composition is X and the content of the radical polymerization initiator in the magenta ink composition is Y, Expression (2) below is satisfied, $$0.3 \leq \frac{Y}{X} < 1 \quad (2)$$

<3> the ink set for forming multiple layers according to <1> or <2>, wherein Component A above further comprises (Component A-3) trimethylolpropane triacrylate, <4> the ink set for forming multiple layers according to any one of <1> to <3>, wherein Component A-1 above is an N-vinyllactam, <5> the ink set for forming multiple layers according to any one of <1> to <4>, wherein Component A-1 above comprises N-vinylcaprolactam, <6> the ink set for forming multiple layers according to any one of <1> to <5>, wherein the content of the radical polymerization initiator in the magenta ink composition is at least 3 wt % but less than 12 wt %, and the content of the radical polymerization initiator in the white ink composition is at least 12 wt % but no greater than 20 wt %, <7> the ink set for forming multiple layers according to any one of <1> to <6>, wherein Component A above comprises a monofunctional radically polymerizable compound in an amount of at least 50 wt % but no greater than 90 wt % relative to the total amount of Component A, <8> the ink set for forming multiple layers according to any one of <1> to <7>, wherein the magenta ink composition comprises as Component B a bisacylphosphine oxide compound and/or a monoacylphosphine oxide compound, and the white ink composition comprises as Component B a monoacylphosphine oxide compound, <9> the ink set for forming multiple layers according to any one of <1> to <8>, wherein all the ink compositions have a surface tension of 32 to 40 mN/m, <10> an ink jet recording method employing the ink set for forming multiple layers according to any one of <1> to <9>, the method comprising an image formation step of carrying out image formation by discharging the colored ink composition and a white ink layer application step of applying the white ink composition to thus form a white ink layer, <11> the ink jet recording method according to <10>, wherein the method comprises in sequence an image formation step of carrying out image formation by discharging the colored ink composition onto a recording medium, and a white ink layer application step of applying the white ink composition onto the image that is formed to thus form a white ink layer, <12> the ink jet recording method according to <10>, wherein the method comprises in sequence a white ink layer application step of applying the white ink composition onto a recording medium to thus form a white ink layer, and an image formation step of carrying out image formation by applying the colored ink composition onto the white ink layer, <13> the ink jet recording method according to any one of <10> to <12>, wherein the method comprises a scanning step of reciprocatingly moving in a first direction relative to a recording medium an ink jet head comprising a plurality of nozzle arrays comprising a first nozzle array having a plurality of nozzles arranged for discharging the colored ink composition and a second nozzle array having a plurality of nozzles arranged for discharging the white ink composition, a relative movement step of moving the recording medium relative to the ink jet head in a second direction that is not parallel to the first direction, a discharge control step of dividing the nozzle array into a plurality of regions in the second direction and controlling ink discharge of the ink jet head for each of the divided nozzle region, and an actinic radiation irradiation step of carrying out irradiation with actinic radiation of ink that has been discharged from the ink jet head in the discharge control step and is attached to the recording medium, the actinic radiation irradiation step being a step of carrying out said irradiation with actinic radiation by dividing an area that is to be irradiated with actinic radiation into a plurality of regions corresponding to the divided nozzle regions, and controlling the amount of light for each of the divided irradiation regions individually for each region, <14> the ink jet recording method according to <13>, wherein the nozzles for discharging the colored ink composition have a minimum droplet volume of at least 5 pL but less than 20 pL, and the nozzles for discharging the white ink composition have a minimum droplet volume of at least 20 pL but no greater than 60 pL, and <15> a printed material obtained by the method according to any one of <10> to <14>.

BRIEF DESCRIPTION OF DRAWINGS

FIG. 1: A schematic diagram showing a sectional view when an image layer and a white ink layer are formed above a recording medium using the ink set for forming multiple layers of the present invention.

DESCRIPTION OF EMBODIMENTS

Figure 2:
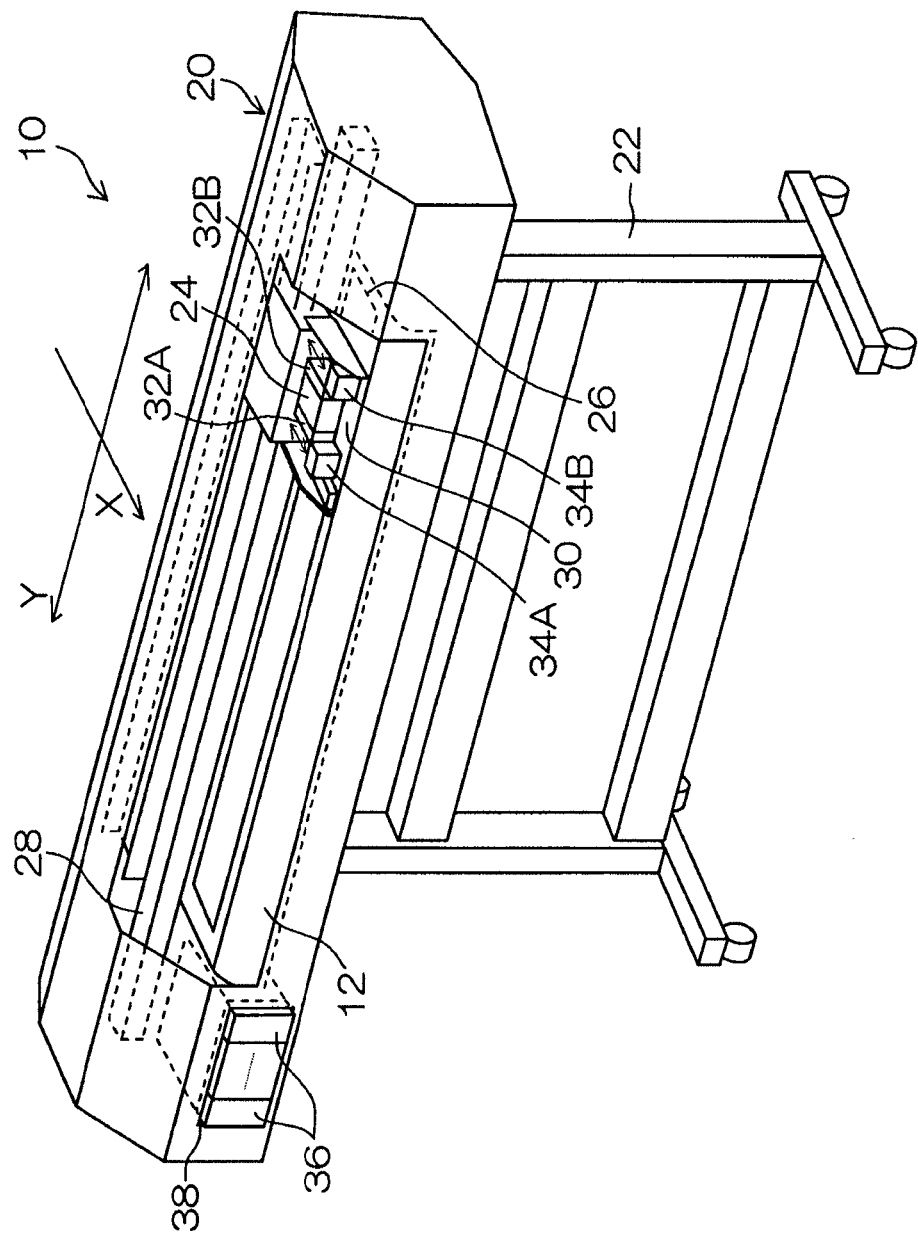
FIG. 2: An external perspective view showing one example of ink jet recording equipment suitably used in the present invention.

The ink set for forming multiple layers of the present invention (hereinafter, also simply called an 'ink set') comprises a colored ink composition comprising a yellow ink composition, a magenta ink composition, a cyan ink composition, and a black ink composition, and a white ink composition, each ink composition comprising (Component A) a radically polymerizable compound and (Component B) a radical polymerization initiator, Component A above comprising (Component A-1) an N-vinyl compound and (Component A-2) a compound represented by Formula (a-2) below, and when the content of the radical polymerization initiator in the white ink composition is X and the content of the radical polymerization initiator in the magenta ink composition is Y, Expression (1) below being satisfied.

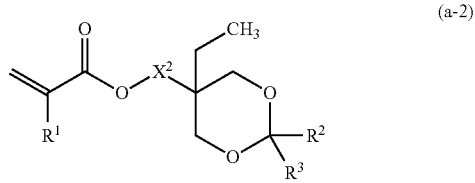

(In Formula (a-2), $R^1$, $R^2$, and $R^3$ independently denote a hydrogen atom, a methyl group, or an ethyl group, and $X^2$ denotes a single bond or a divalent linking group.)

$$0.1 \leq \frac{Y}{X} < 1 \quad (1)$$

In the specification, the notation 'X to Y', which expresses a numeral range, has the same meaning as 'at least X but no greater than Y'. Furthermore, '(Component A-1) an N-vinyl compound', etc. are also simply called 'Component A-1', etc. Moreover, when referring to either or both of 'acrylate' and 'methacrylate', '(meth)acrylate' is also used.

The present invention is explained in detail below.

I. Ink Set for Forming Multiple Layers

The ink set for forming multiple layers of the present invention forms an image layer using the colored ink composition, which comprises the yellow ink composition, the magenta ink composition, the cyan ink composition, and the black ink composition, and forms a white ink layer using the white ink. The image layer may be formed above the recording medium (also called a support or a substrate) using the colored ink composition and the white ink layer may be formed thereabove, or the white ink layer may be formed above the recording medium and the image layer may be formed thereabove.

FIG. 1 is a schematic diagram showing a sectional view when an image layer 82 and a white ink layer 80 are formed above a recording medium 12 using the ink set for forming multiple layers of the present invention. Furthermore, the arrow in the diagram shows the direction from which the image is viewed (observation direction).

In FIG. 1A, the image layer 82 is formed above the recording medium 12, and the white ink layer 80 is further formed thereabove. In this case, it is preferable to use a transparent recording medium as the recording medium, and the image is viewed through the recording medium 12.

On the other hand, in FIG. 1B the white ink layer 80 is formed above the recording medium 12, and the image layer 82 is further formed thereabove. In this case, the recording medium 12 may be transparent or non-transparent and is not particularly limited. The white ink layer functions as an undercoat layer.

In addition, the white ink layer is provided in at least a region where the image is formed, and preferably in a region where the image is formed or a region that is wider than the above as one solid printed layer.

The present invention is not limited to the above-mentioned mode in which two layers are formed; examples include a three layer mode in which a clear ink layer is formed as an undercoat layer above a recording medium and an image layer and a white ink layer are formed thereabove in that order, and a three layer structure in which a white ink layer and an image layer are provided in that order above a recording medium and a clear ink layer is then further formed as an overcoat layer. Furthermore, the structure may be such that a first image layer, a white ink layer, and a second image layer are layered in sequence above a transparent recording medium. In this case, the structure is such that the white ink layer is sandwiched between upper and lower image layers. In images having such a structure, the image layers having the white ink layer as a background are viewed from both sides of the recording medium.

When forming at least two layers, that is, an image layer and a white ink layer, from the viewpoint of productivity it is necessary to form a second layer after a short amount of time (for example, a few seconds) has elapsed after forming a first layer. Because of this, the image quality or surface gloss of the second layer is affected by the curing profile and the state of cure of the first layer.

In accordance with the ink set of the present invention, when forming such multiple layers, an image having excellent substrate—ink and ink—ink adhesion and excellent image quality and surface gloss can be obtained. Although details of the mechanism of action are unclear, it is surmised to be as follows.

That is, it is surmised that the affinity between layers is increased and image layer—white ink layer adhesion is improved as a result of a specific radically polymerizable compound being contained.

Furthermore, optimizing the amount of initiator improves the spreading while wet on an ink film, thus giving an image having surface gloss and suppressing banding. The banding referred to here means stripy print unevenness and is a phenomenon in which the surface gloss varies according to the swath width period of multipass printing. If spreading of dots after ink droplets are fired is insufficient, print dropouts cannot be eliminated by the spreading of dots, thus causing stripy print unevenness.

In the embodiment of FIG. 1A, an image layer having a low polymerization initiator content is the lower layer, and spreads while wet above the recording medium, thus suppressing banding. Furthermore, a white ink layer (white layer) having a high content of the polymerization initiator and excellent curability is formed above the image layer, thus improving ink—ink adhesion.

On the other hand, in the embodiment of FIG. 1B, since a white ink layer having a high polymerization initiator content has high curability, the ink composition of the image layer spreads well while wet, gloss improves, and banding is suppressed.

(Ink Composition)

First, the ink composition comprising (Component A) and (Component B) used in the present invention (hereinafter, also called the 'ink composition of the present invention) is explained in detail. When it is simply called the ink composition, it collectively means the colored ink composition and the white ink composition.

The ink composition of the present invention is an ink composition that can cure upon exposure to an actinic radiation and is also an oil-based ink composition. The 'actinic radiation' is a radiation that can provide energy that enables an initiating species to be generated in the ink composition when irradiated, and broadly includes α rays, γ rays, X rays, ultraviolet rays, visible light, and an electron beam. Among these, ultraviolet rays and an electron beam are preferable from the viewpoint of curing sensitivity and the availability of equipment, and ultraviolet rays are particularly preferable.

Furthermore, since the ink composition of the present invention is a radiation-curable ink composition and is cured after being applied onto a recording medium, it is preferable that it does not contain volatile solvent and is solvent-free.

This is because, if volatile solvent remains in a cured ink image, the solvent resistance is degraded, and the VOC (Volatile Organic Compound) problem based on volatile solvent occurs.

In the present invention, the content of a solvent, including water, in the ink composition is preferably 0 to 5 wt %, more preferably 0 to 3 wt %, yet more preferably 0 to 1 wt %, and most preferably none, that is, 0 wt %.

The components of the ink compositions of each color forming the ink set of the present invention are now explained.

(Component A) Radically Polymerizable Compound

The ink composition of the present invention comprises (Component A) a radically polymerizable compound, Component A comprising Component A-1 and Component A-2 above.

(Component A-1) N-Vinyl Compound

The ink composition of the present invention preferably comprises (Component A-1) an N-vinyl compound as (Component A) the radically polymerizable compound.

As the N-vinyl compound, an N-vinyllactam is preferable and a compound represented by Formula (a-1) is more preferable.

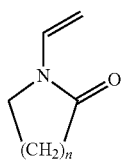

(a-1)

In Formula (a-1), n denotes an integer of 1 to 5; n is preferably an integer of 2 to 4 from the viewpoint of flexibility after the ink composition is cured, adhesion to a recording medium, and ease of availability of starting material, n is more preferably an integer of 2 or 4, and n is particularly preferably 4, which is N-vinylcaprolactam. N-vinylcaprolactam is preferable since it has excellent safety, is commonly used and easily available at a relatively low price, and gives particularly good ink curability and adhesion of a cured film to a recording medium.

The content of Component A-1 in the ink composition of the present invention is preferably in the range of 5 to 60 wt % relative to the weight of the entire ink composition, more preferably in the range of 15 to 35 wt %. When the content is 5 wt % or greater the adhesion to a recording medium is excellent, and when the content is no greater than 60 wt % the storage stability is excellent.

(Component A-2) Compound Represented by Formula (a-2)

The ink composition of the present invention comprises (Component A-2) a compound represented by Formula (a-2) as (Component A) the radically polymerizable compound. When Component A-2 is not contained, adhesion to a recording medium (in particular, polyvinyl chloride, polyethylene terephthalate (PET), or an acrylic resin) is degraded. It is surmised that the compound represented by Formula (a-2) has a low surface tension and improves spreading while wet of the ink composition. Furthermore, it has appropriate polarity, is resistant to incomplete surface curing, and can give a cured material (image layer and white ink layer) having excellent adhesion.

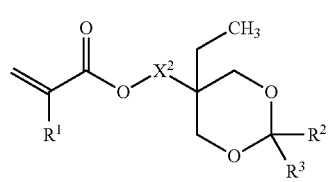

(a-2)

(In Formula (a-2), $R^1$, $R^2$, and $R^3$ independently denote a hydrogen atom, a methyl group, or an ethyl group, and $X^2$ denotes a single bond or a divalent linking group)

$R^1$ is preferably a hydrogen atom or a methyl group, and more preferably a hydrogen atom.

$R^2$ and $R^3$ are independently preferably a hydrogen atom or a methyl group, and more preferably a hydrogen atom, and it is yet more preferable that both $R^2$ and $R^3$ are hydrogen atoms.

The divalent linking group denoted by $X^2$ is not particularly limited as long as the effects of the invention are not greatly impaired, and is preferably a divalent hydrocarbon group or a divalent group in which a hydrocarbon group and an ether bond are combined, and more preferably a divalent hydrocarbon group, poly(alkyleneoxy) group, or poly(alkyleneoxy)alkyl group. Furthermore, the number of carbons of the divalent linking group is preferably 1 to 60, and more preferably 1 to 20.

$X^2$ is preferably a single bond, a divalent hydrocarbon group, or a divalent group in which a hydrocarbon group and an ether bond are combined, more preferably a divalent hydrocarbon group having 1 to 20 carbons, yet more preferably a divalent hydrocarbon group having 1 to 8 carbons, and particularly preferably a methylene group.

Specific examples of Component A-2 are cited below, but it is not limited to these compounds. In the specific examples below, R denotes a hydrogen atom or a methyl group.

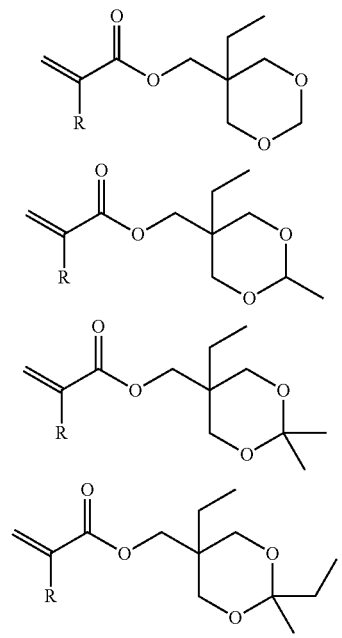

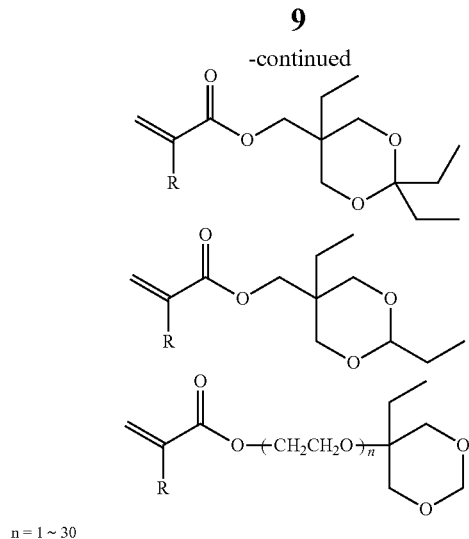

n = 1 ~ 30

Among them, cyclic trimethylolpropane formal (meth)acrylate is preferable, and cyclic trimethylolpropane formal acrylate is particularly preferable. Component A-2 may be a commercial product, and specific examples of the commercial product include SR531 (SARTOMER).

From the viewpoint of curability of the ink composition and adhesion between a recording medium and an image, the content of Component A-2 is preferably 1 to 70 wt % relative to the entire weight of the ink composition, more preferably 3 to 65 wt %, and yet more preferably 5 to 60 wt %, and most preferably 5 to 50 wt %.

(Component A-3) Trimethylolpropane Triacrylate

In the present invention, the ink composition preferably comprises (Component A-3) trimethylolpropane triacrylate as (Component A) the radically polymerizable compound. Due to Component A-3 being contained, the curability and scratch resistance improve.

From the viewpoint of curability and scratch resistance, the content of Component A-3 is preferably 0.1 to 15 wt % relative to the total weight of the ink composition, more preferably 0.2 to 10 wt %, and yet more preferably 0.5 to 5 wt %.

<Other Monofunctional (Meth)Acrylate>

The ink composition of the present invention may comprise a monofunctional (meth)acrylate other than Component A-2.

Preferred examples of the other monofunctional (meth)acrylate include (Component A-4) an aromatic hydrocarbon group-containing monofunctional (meth)acrylate.

(Component A-4) Aromatic Hydrocarbon Group-Containing Monofunctional (Meth)Acrylate The ink composition of the present invention preferably comprises (Component A-4) an aromatic hydrocarbon group-containing monofunctional (meth)acrylate. When the ink composition comprises Component A-4, discharge stability and curability of the ink composition are improved. Component A-4 is preferably a compound having a molecular weight of no greater than 500, and more preferably no greater than 300.

Preferred examples of Component A-4 include an aromatic monofunctional radically polymerizable monomer described in paragraphs 0048 to 0063 of JP-A-2009-096985. In the present invention, the aromatic hydrocarbon group-containing monofunctional (meth)acrylate compound is preferably a compound represented by Formula (a-4).

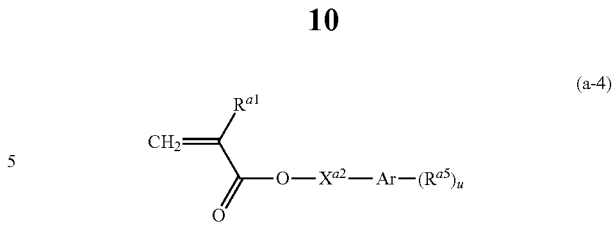

(In Formula (a-4), $R^{a1}$ denotes a hydrogen atom or a methyl group, $X^{a1}$ denotes a divalent linking group, Ar denotes an aromatic hydrocarbon group, $R^5$ denotes a substituent, u denotes an integer of 0 to 5, and the u $R^{a5}$s may be identical to or different from each other.)

In Formula (a-4), $R^{a1}$ is preferably a hydrogen atom.

$X^{a1}$ denotes a divalent linking group, and preferably an ether bond (—O—), an ester bond (—C(O)O— or —OC(O)—), an amide bond (—C(O)NR'— or —NR'C(O)—), a carbonyl group (—C(O)—), an imino group (—NR'—), an optionally substituted alkylene group having 1 to 15 carbons, or a divalent group in which two or more thereof are combined. R' denotes a hydrogen atom, a straight-chain, branched, or cyclic alkyl group having 1 to 20 carbons, or an aryl group having 6 to 20 carbons. Examples of the substituent include a hydroxy group and a halogen atom.

The moiety containing $R^{a1}$ and $X^{a1}$ ($H_2C=C(R^{a1})$—C(O)O—$X^{a1}$—) may be bonded to any position of the aromatic hydrocarbon group. From the viewpoint of improving affinity with a colorant, the end of $X^{a1}$ bonded to the aromatic hydrocarbon group in Formula (a-4) is preferably an oxygen atom, and more preferably an ethereal oxygen atom. $X^{a1}$ in Formula (a-4) is preferably *-(LO)$_q$—. Here, * denotes the position at which the carbonic ester bond in Formula (a-4) are bonded, q is an integer of 0 to 10, and L denotes an alkylene group having 2 to 4 carbons. q is preferably an integer of 0 to 4, more preferably an integer of 0 to 2, and yet more preferably 1 or 2. (LO)$_q$ is preferably an ethylene oxide chain or a propylene oxide chain.

Ar denotes an aromatic hydrocarbon group. Examples of the aromatic hydrocarbon group include a monocyclic aromatic hydrocarbon group having 1 ring and a polycyclic aromatic hydrocarbon group having 2 to 4 rings. Specific examples thereof include a group in which at least one hydrogen atom is removed from benzene, naphthalene, anthracene, 1H-indene, 9H-fluorene, 1H-phenalene, phenanthrene, triphenylene, pyrene, naphthacene, tetraphenylene, biphenylene, as-indacene, s-indacene, acenaphthylene, fluoranthene, acephenanthrylene, aceanthrylene, chrysene, and pleiadene, etc.

Among them, in the present invention, a phenyl group and a naphthyl group are preferable, and a monocyclic aromatic hydrocarbon group, that is a phenyl group, is more preferable.

It is preferable that the u $R^{a5}$s independently represent a halogen atom, a carboxy group, an acyl group having 1 to 10 carbons, a hydroxy group, a substituted or unsubstituted amino group, a thiol group, a siloxane group, or an optionally substituted hydrocarbon group, or heterocyclic group having a total number of carbons of no greater than 30. The substituents include a hydroxy group, an alkyl group having 1 to 10 carbons, and an aryl group having 6 to 12 carbons.

u denotes an integer of 0 to 5, and is preferably 0.

Specific preferred examples of Formula (a-4) include [L-1] to [L-19] and [L-21] to [L-65].
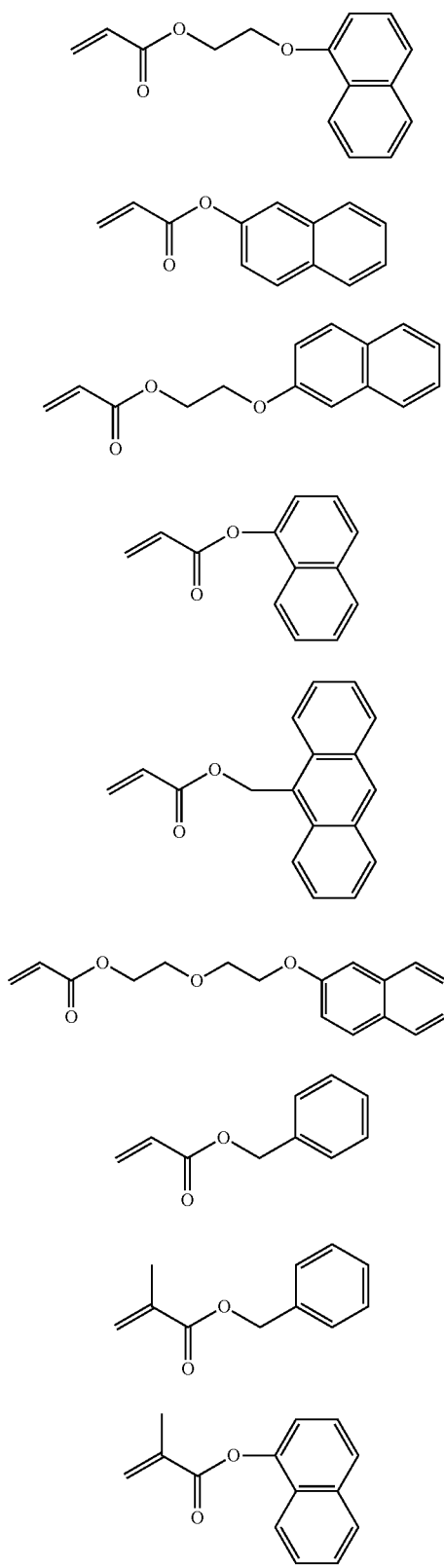
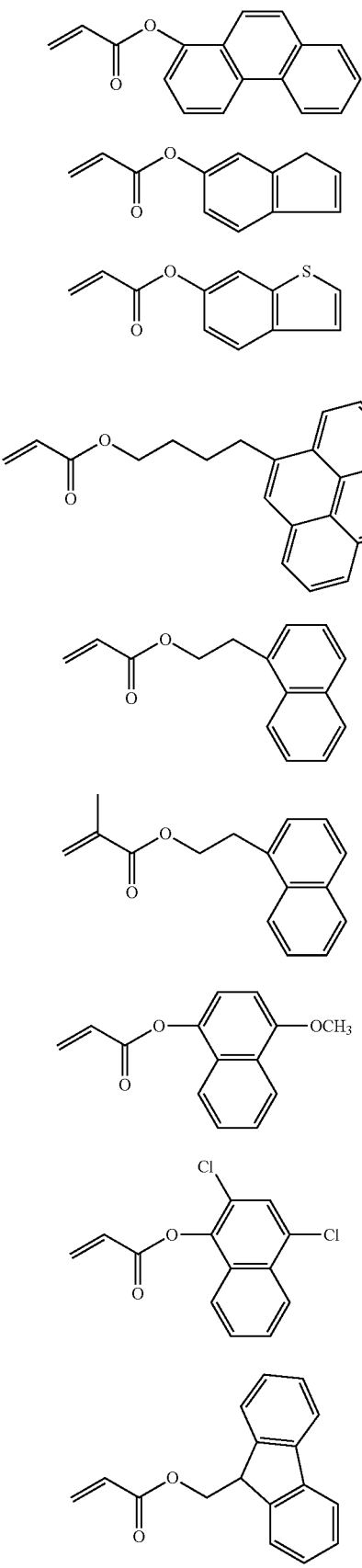

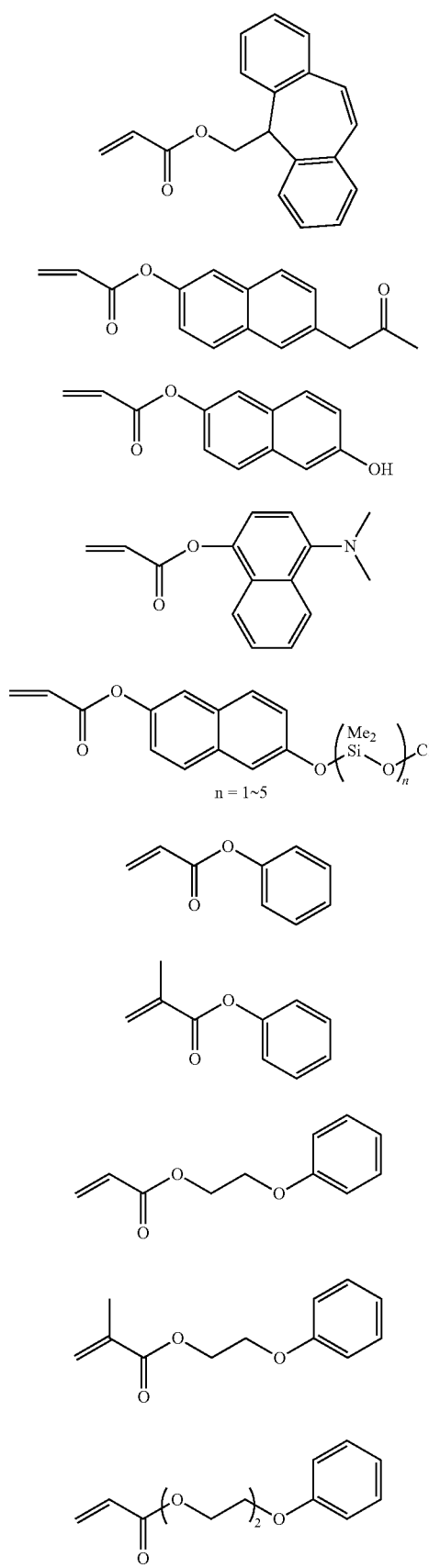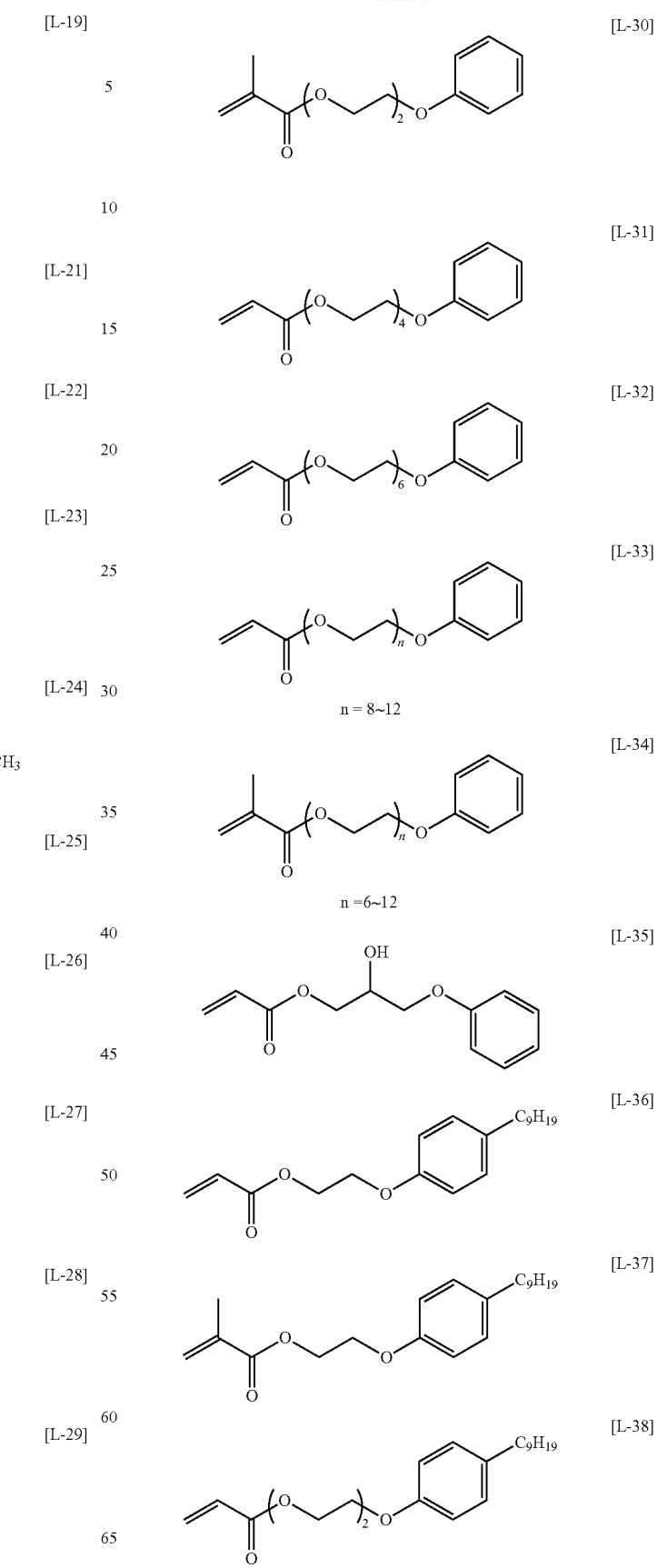

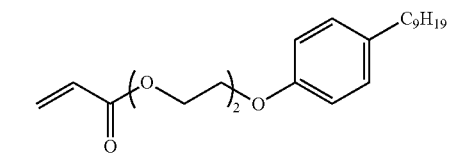
[L-39]
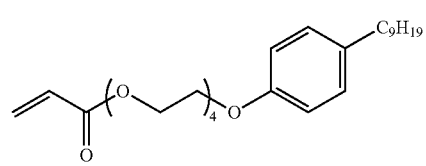
[L-40]
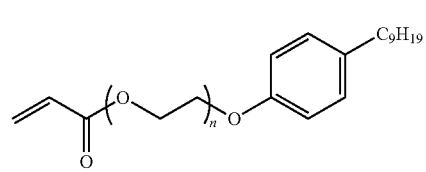
[L-41]
n = 6~12
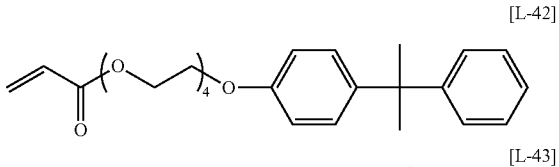
[L-42]
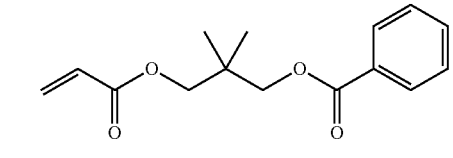
[L-43]
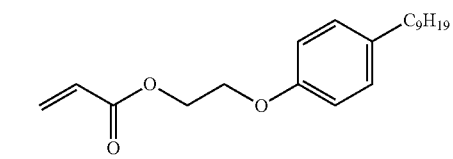
[L-44]
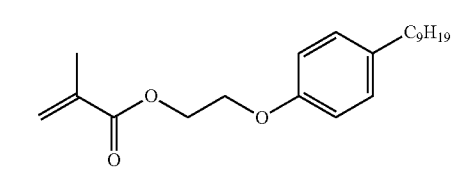
[L-45]
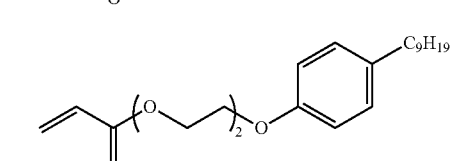
[L-46]
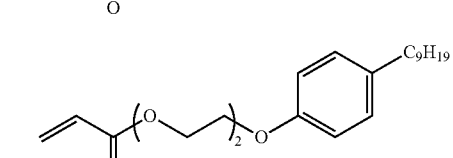
[L-47]
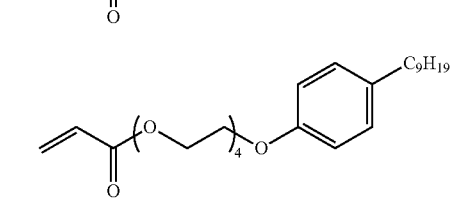
[L-48]
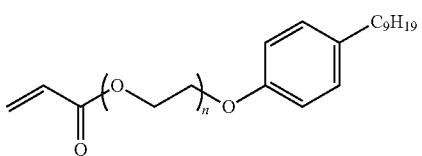
[L-49]
n = 6~12
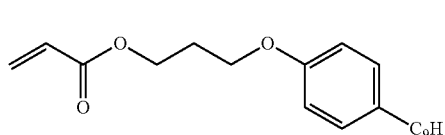
[L-50]
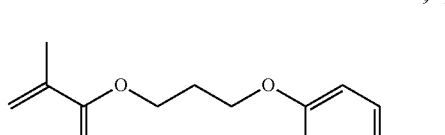
[L-51]
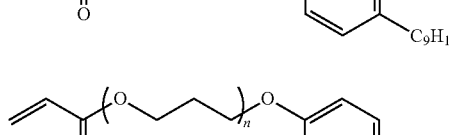
[L-52]
n = 2~12
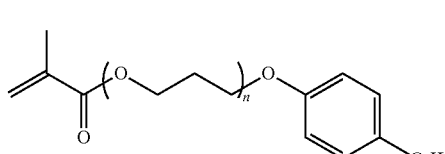
[L-53]
n = 2~12
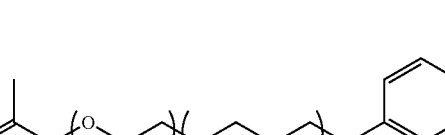
[L-54]
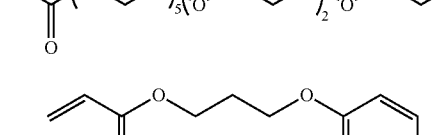
[L-55]
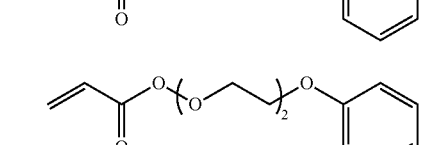
[L-56]
[L-57]
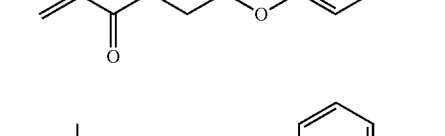
[L-58]

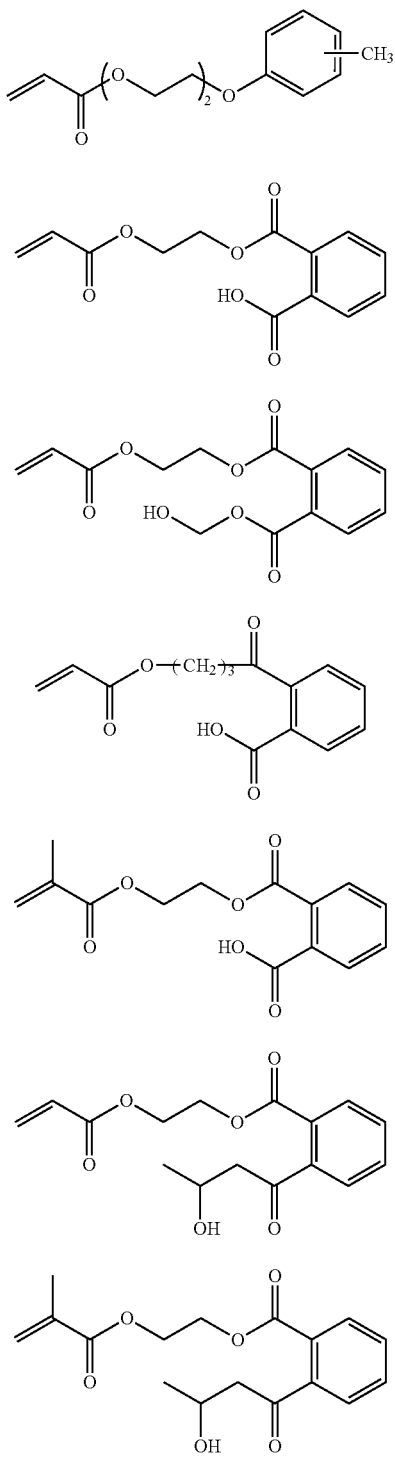

In the present invention, a compound represented by Formula (a-4) is preferably a compound having a phenyl group, more preferably 2-phenoxyethyl (meth)acrylate or benzyl (meth)acrylate, yet more preferably 2-phenoxyethyl (meth)acrylate, and particularly preferably 2-phenoxyethyl acrylate.

From the viewpoint of inkjet discharge properties and flexibility, the content of Component A-4 is preferably 1 to 50 wt % relative to the weight of the entire ink composition, more preferably 3 to 45 wt %, and yet more preferably 5 to 40 wt %.

The ink composition of the present invention may comprise other monofunctional (meth)acrylate compound other than Component A-2 and Component A-4. Specific examples of the monofunctional (meth)acrylate compound other than Component A-2 and Component A-4 include isoamyl (meth)acrylate, stearyl (meth)acrylate, lauryl (meth)acrylate, octyl (meth)acrylate, isooctyl (meth)acrylate, decyl (meth)acrylate, isomyristic (meth)acrylate, isostearyl (meth)acrylate, 2-ethylhexyl diglycol (meth)acrylate, 2-hydroxybutyl (meth)acrylate, buthoxyethyl (meth)acrylate, methoxydiethylene glycol (meth)acrylate, methoxypolyethylene glycol (meth)acrylate, methoxypropylene glycol (meth)acrylate, tetrahydrofurfuryl (meth)acrylate, isobornyl (meth)acrylate, 2-hydroxyethyl (meth)acrylate, 2-hydroxypropyl (meth)acrylate, 2-(meth)acryloyloxyethylsuccinic acid, 2-(meth)acryloyloxyethyl-2-hydroxyethylphthalic acid, a lactone-modified flexible (meth)acrylate, t-butylcyclohexyl (meth)acrylate, 2-(2-ethoxyethoxy)ethyl (meth)acrylate, cyclopentenyl acrylate, cyclopentenyloxyethyl acrylate, and dicyclopentanyl acrylate, etc.

In the present invention, the total content of monofunctional radically polymerizable compounds, including Component A-1 and Component A-2, is preferably 50 to 90 wt % relative to the total amount of (Component A) the radically polymerizable compound. The monofunctional polymerizable compounds include, in addition to Component A-1 and Component A-2, a monofunctional polymerizable compound such as Component A-4 or the above-mentioned other monofunctional (meth)acrylate.

When the content of the monofunctional polymerizable compounds is in the above-mentioned range, an image having excellent ink—ink and ink-recording medium adhesion and excellent flexibility is obtained.

The content of the monofunctional polymerizable compounds is preferably 55 to 90 wt % relative to the total amount of Component A, and more preferably 65 to 85 wt %.

(Component A-5) Polyfunctional (Meth)Acrylate

The ink composition of the present invention may comprise (Component A-5) another polyfunctional (meth)acrylate in addition to Component A-3 above.

Due to the ink composition comprising a polyfunctional (meth)acrylate compound, high curability can be obtained.

Specific examples of Component A-5 include bis(4-(meth)acryloxypolyethoxyphenyl)propane, neopentyl glycol di(meth)acrylate, ethoxylated (2) neopentyl glycol di(meth)acrylate (compound formed by di(meth)acrylating neopentyl glycol ethylene oxide 2 mol adduct), propoxylated (2) neopentyl glycol di(meth)acrylate (compound formed by di(meth)acrylating neopentyl glycol propylene oxide 2 mol adduct), 1,6-hexanediol di(meth)acrylate, 1,9-nonanediol di(meth)acrylate, ethylene glycol di(meth)acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, pentaerythritol tri(meth)acrylate, pentaerythritol tetra(meth)acrylate, dipentaerythritol tetra(meth)acrylate, tetramethylolmethane tetra(meth)acrylate, tetramethylolmethane tri(meth)acrylate, dimethyloltricyclodecane di(meth)acrylate, modified glycerol tri(meth)acrylate, modified bisphenol A di(meth)acrylate, bisphenol A PO adduct di(meth)acrylate, bisphenol A EO adduct di(meth)acrylate, dipentaerythritol hexa(meth)acrylate, and caprolactone-modified dipentaerythritol hexa(meth)acrylate.

The ink composition of the present invention may comprise an oligomer as the polyfunctional (meth)acrylate compound.

The 'oligomer' means a polymer having a limited number (preferably 5 to 100) of monomer-based constituent units. A weight-average molecular weight of the oligomer is preferably 400 to 10,000, and more preferably 500 to 5,000.

The oligomer is preferably a compound having a (meth) acryloyl group as a functional group.

From the viewpoint of a balance between flexibility and curability, it is preferable for the number of the functional group contained in the oligomer to be 2 to 15 per oligomer molecule, more preferably 2 to 6, yet more preferably 2 to 4, and particularly preferably 2.

Examples of the oligomer in the present invention include a polyester (meth)acrylate-based oligomer, an olefin-based oligomer (an ethylene oligomer, a propylene oligomer, a butene oligomer, etc.), a vinyl-based oligomer (a styrene oligomer, a vinyl alcohol oligomer, a vinylpyrrolidone oligomer, an acrylate oligomer, a methacrylate oligomer, etc.), a diene-based oligomer (a butadiene oligomer, a chloroprene rubber, a pentadiene oligomer, etc.), a ring-opening polymerization type oligomer (di-, tri-, tetra-ethylene glycol, polyethylene glycol, polyethylimine, etc.), an addition-polymerization type oligomer (an oligoester (meth)acrylate, a polyamide oligomer, a polyisocyanate oligomer), an addition-condensation oligomer (a phenolic resin, an amino resin, a xylene resin, a ketone resin, etc.), and amine-modified polyester oligomer, etc. Among these, an oligoester (meth)acrylate is preferable, and among them a urethane (meth)acrylate and a polyester (meth)acrylate are more preferable, and a urethane (meth)acrylate is particularly preferable because the ink composition provides excellent curability and adhesion.

With regard to the oligomer, one type thereof may be used on its own or two or more types may be used in combination.

As the urethane (meth)acrylate, an aliphatic urethane (meth)acrylate and an aromatic urethane (meth)acrylate may preferably be cited.

With respect to the oligomer, 'Origomar Handobukku (Oligomer Handbook)' (edited by Junji Furukawa, The Chemical Daily Co., Ltd.) may also be referred to.

Examples of the oligomer based on the urethane (meth) acrylate include U-2PPA, U-4HA, U-6HA, U-6LPA, U-15HA, U-324A, UA-122P, UA5201, UA-512, etc. manufactured by Shin-Nakamura Chemical Co., Ltd.; CN964A85, CN964, CN959, CN962, CN963J85, CN965, CN982B88, CN981, CN983, CN996, CN9002, CN9007, CN9009, CN9010, CN9011, CN9178, CN9788, CN9893 manufactured by Sartomer; EB204, EB230, EB244, EB245, EB270, EB284, EB285, EB810, EB4830, EB4835, EB4858, EB1290, EB210, EB215, EB4827, EB4830, EB4849, EB6700, EB204, EB8402, EB8804, EB8800-20R, etc. manufactured by DAICEL-CYTEC COMPANY LTD.

Examples of the amine-modified polyester oligomer include EB524, EB80, EB81 manufactured by DAICEL-CYTEC COMPANY LTD.; CN550, CN501, CN551 manufactured by Sartomer; GENOMER5275 manufactured by RAHN AG.

From the viewpoint of a balance being achieved between curability and adhesion, the content of the oligomer is preferably 1 to 10 wt % relative to the total weight of the ink composition, more preferably 2 to 8 wt %, and yet more preferably 3 to 7 wt %.

From the viewpoint of curability, the total content of (Component A-5) the other polyfunctional (meth)acrylates is preferably 1 to 30 wt % relative to the total weight of the ink composition, more preferably 3 to 25 wt %, yet more preferably 5 to 20 wt %, and particularly preferably 5 to 15 wt % wt %.

The total content of all the radically polymerizable compounds (Component A) in the ink composition is preferably 65 to 99 wt %, and more preferably 70 to 90 wt %. When the content of Component A in the ink composition is in the above-mentioned range, excellent curability is obtained.

(Component B) Polymerization Initiator

The ink composition of the present invention comprises a radical polymerization initiator.

When the content of the radical polymerization initiator contained in the white ink composition is X (wt %) and the content of the radical polymerization initiator contained in the magenta ink composition is Y (wt %), Expression (1) below is satisfied.

$$0.1 \leq \frac{Y}{X} < 1 \qquad (1)$$

When Y/X is less than 0.1, the curability of the magenta ink composition can be insufficient or the curability of the white ink composition can be non-uniform. When Y/X is 1 or greater, the spreadability while wet of the magenta ink becomes poor.

Y/X is preferably $0.3 \leq (Y/X) < 1$, more preferably $0.4 \leq (Y/X) < 1$, and yet more preferably $0.5 \leq (Y/X) < 1$.

In the present invention, it is sufficient that the content of the radical polymerization initiator contained in the magenta ink composition and the content of the radical polymerization initiator contained in the white ink composition satisfy the above-mentioned range, and there is no particular restriction on the relationship between the content of the radical polymerization initiator contained in the other color ink compositions (other color ink compositions such as the yellow ink composition, the cyan ink composition, or the black ink composition, but excluding the white ink composition) and the content of the radical polymerization initiator contained in the white ink composition, but it is preferable that the other color ink compositions also satisfy the relationship of Expression (1) above.

That is, when the content of the radical polymerization initiator contained in the white ink composition is X (wt %), and the content of the radical polymerization initiator contained in the other color ink compositions is W (wt %), it is preferable that $0.1 \leq (W/X) < 1$, it is more preferable that $0.3 \leq (W/X) < 1$, it is yet more preferable that $0.4 \leq (W/X) < 1$, and it is particularly preferable that $0.5 \leq (W/X) < 1$.

The content of the radical polymerization initiator in the magenta ink composition is preferably at least 3 wt % but less than 12 wt %, and more preferably 5 to 11 wt %.

Furthermore, the content of the radical polymerization initiator in the white ink composition is preferably 12 to 20 wt %, and more preferably 12 to 18 wt %.

When the contents of the radical polymerization initiator in the magenta ink composition and the white ink composition are in the above-mentioned ranges, an image having excellent surface gloss is obtained.

Furthermore, the content of the radical polymerization initiator in each of the other color ink compositions is preferably at least 3 wt % but less than 12 wt %, and more preferably 5 to 11 wt %.

When the content of the radical polymerization initiator in the other color ink compositions is in the above-mentioned range, an image having excellent surface gloss is obtained.

As a polymerization initiator that can be used in the present invention, a known radical polymerization initiator may be used. The radical polymerization initiator that can be used in the present invention may be used singly or in a combination of two or more types.

The radial polymerization initiator that can be used in the present invention is a compound that forms a polymerization initiating species by absorbing external energy. The external energy used for initiating polymerization can be broadly divided into heat and actinic radiation, a thermal polymerization initiator and a photopolymerization initiator are used respectively, and a photopolymerization initiator is preferably used. Examples of the actinic radiation include γ rays, β rays, an electron beam, ultraviolet rays, visible light, and infrared rays, and preferred examples include ultraviolet rays.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, (m) an alkylamine compound, etc. With regard to these radical polymerization initiators, the above-mentioned compounds (a) to (m) may be used singly or in combination. The radical polymerization initiator that can be used in the present invention is preferably used singly or in a combination of two or more types.

In the present invention, Component B is preferably (Component B-1) a bisacylphosphine compound and (Component B-2) a monoacylphosphine compound.

(Component B-1) Bisacylphosphine Compound

In the present invention, (Component B-1) a bisacylphosphine compound can preferably be cited as the radical polymerization initiator (Component B).

Preferred examples of Component B-1 and Component B-2, which is described later, include bisacylphosphine oxide compounds and monoacylphosphine compounds described in paragraphs 0080 to 0098 of JP-A-2009-096985.

Component B-1 preferably has a partial structure represented by Formula (b-1-1) in the structure of the compound.

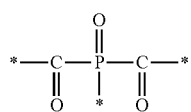

(b-1-1)

(In Formula (b-1-1), * denotes a bonding position.)

Component B-1 is particularly preferably a compound having a chemical structure represented by Formula (b-1-2).

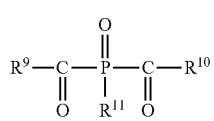

(b-1-2)

(In Formula (b-1-2), $R^9$, $R^{10}$ and $R^{11}$ independently denote an aromatic hydrocarbon group, which may have a methyl group or an ethyl group as a substituent.)

With regard to a bisacylphosphine oxide compound represented by Formula (b-1-2), it is preferable that $R^9$ to $R^{11}$ are phenyl groups, which may have a methyl group as a substituent, and it is more preferable that $R^{11}$ is a phenyl group and $R^9$ and $R^{10}$ are phenyl groups having 1 to 3 methyl groups.

Among them, as the bisacylphosphine oxide compound represented by Formula (b-1-2), bis(2,4,6-trimethylbenzoyl) phenylphosphine oxide (IRGACURE 819, manufactured by Ciba Specialty Chemicals) is preferable.

(Component B-2) Monoacylphosphine Compound

In the present invention, (Component B-2) a Monoacylphosphine compound can preferably be cited as the radical polymerization initiator (Component B).

Component B-2 preferably has a partial structure represented by Formula (b-2-1) in the structure of the compound.

(b-2-1)

(In Formula (b-2-1), denotes a bonding position.)

Component B-2 is particularly preferably a compound having a chemical structure represented by Formula (b-2-2).

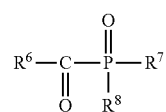

(b-2-2)

(In Formula (b-2-2), $R^6$, $R^7$, and $R^8$ independently denote an aromatic hydrocarbon group, which may have a methyl group or an ethyl group as a substituent.)

With regard to a monoacylphosphine oxide compound represented by Formula (b-2-2), it is preferable that $R^6$ to $R^8$ are phenyl groups, which may have a methyl group as a substituent, and it is more preferable that $R^7$ and $R^8$ are phenyl groups and $R^6$ is a phenyl group having 1 to 3 methyl groups.

Among them, as the monoacylphosphine oxide compound represented by Formula (b-2-2), 2,4,6-trimethylbenzoyl-diphenylphosphine oxide (Darocur TPO manufactured by Ciba Specialty Chemicals, Lucirin TPO manufactured by BASF) is preferable.

In the present invention, the colored ink composition, including the magenta ink composition, preferably comprises a bisacylphosphine oxide compound (Component B-1) and/or a monoacylphosphine oxide compound (Component B-2).

Furthermore, the colored ink composition preferably comprises at least a bisacylphosphine oxide compound (Component B-1) as Component B. It is preferable for the colored ink composition to comprise Component B-1 since the curability is good.

In the colored ink composition, when the total amount of radical polymerization initiator is 100 parts by weight, the total amount of Component B-1 and Component B-2 is preferably at least 20 parts by weight, more preferably at least 25 parts by weight, and yet more preferably at least 30 parts by weight.

Furthermore, in the present invention, the white ink composition preferably comprises a monoacylphosphine oxide compound (Component B-2) as the radical polymerization initiator (Component B).

It is preferable for the white ink composition to comprise a monoacylphosphine oxide compound (Component B-2) as the radical polymerization initiator (Component B) since yellowing of the image is suppressed and excellent curability is obtained.

In the white ink composition, when the total amount of radical polymerization initiator is 100 parts by weight, it is preferable for it to comprise at least 50 parts by weight of the monoacylphosphine oxide compound, more preferably 60 to 100 parts by weight, and yet more preferably 70 to 100 parts by weight.

(Component B-3) Thioxanthone Compound and/or Thiochromanone Compound

The ink composition of the present invention preferably comprises (Component B-3) a thioxanthone compound and/or a thiochromanone compound as Component B. In particular, from the viewpoint of curability, the colored ink composition preferably comprises Component B-3.

<Thioxanthone Compound>

The thioxanthone compound is preferably a compound represented by Formula (b-3-1).

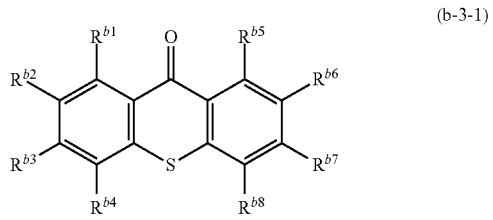

(b-3-1)

(In Formula (b-3-1), $R^{b1}$ to $R^{b8}$ independently denote a hydrogen atom, an alkyl group, a halogen atom, a hydroxy group, a cyano group, a nitro group, an amino group, an alkylthio group, an alkylamino group (The alkylamino group includes the case of monoalkylsubstituted amino group and dialkylsubstituted amino group), an alkoxy group, an alkoxycarbonyl group, an acyloxy group, an acyl group, a carboxy group, or a sulfo group.)

The number of carbon atoms of an alkyl moiety in the alkyl group, alkylthio group, alkylamino group, alkoxy group, alkoxycarbonyl group, acyloxy group, and acyl group is preferably 1 to 20, more preferably 1 to 8, and yet more preferably 1 to 4.

Two of $R^{b1}$ to $R^{b8}$ that are adjacent may be joined to each other to form a ring. When they form a ring, examples of the ring structure include a 5- or 6-membered aliphatic or aromatic ring; it may be a heterocyclic ring containing an element other than a carbon atom, and rings thus formed may be further combined to form a bicyclic ring, for example a condensed ring. These ring structures may further have a substituent. Examples of the substituent include a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, and a sulfo group. Examples of a heteroatom when the resulting ring structure is a heterocyclic ring include N, O, and S.

Examples of the thioxanthone compound include thioxanthone, 2-isopropylthioxanthone, 4-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl]thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboxyimide, N-(1,1,3,3-tetramethylbutyl)thioxanthone-3,4-dicarboxylmide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3,4-dimethyl-9-oxo-9H-thioxanthon-2-yloxy)-N,N,N-trimethyl-1-propanaminium chloride.

Among them, from the viewpoint of ready availability and curability, 2,4-diethylthioxanthone, 2-isopropylthioxanthone, and 4-isopropylthioxanthone are more preferable.

<Thiochromanone Compound>

The thiochromanone compound is preferably a compound represented by Formula (b-3-2).

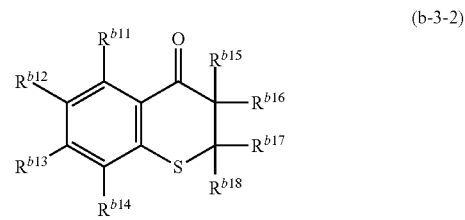

(b-3-2)

In Formula (b-3-2), $R^{b11}$, $R^{b12}$, $R^{b13}$, $R^{b14}$, $R^{b15}$, $R^{b16}$, $R^{b17}$, and $R^{b18}$ independently denote a hydrogen atom, an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group. The number of carbon atoms of an alkyl moiety of the alkyl group, alkylthio group, alkylamino group, alkoxy group, alkoxycarbonyl group, acyloxy group, and acyl group is preferably 1 to 20, more preferably 1 to 8, and yet more preferably 1 to 4. The acyloxy group may be an aryloxycarbonyl group, and the acyl group may be an arylcarbonyl group. In this case, the number of carbon atoms of an aryl moiety is preferably 6 to 14, and more preferably 6 to 10.

Two of $R^{b11}$, $R^{b12}$, $R^{b13}$, and $R^{b14}$ that are adjacent may be bonded to each other, for example condensed, to form a ring.

Examples of the ring structure when those above form a ring include a 5 or 6-membered aliphatic ring or aromatic ring; it may be a heterocyclic ring containing an element other than a carbon atom, and rings thus formed may be further combined to form a bicyclic ring, for example a condensed ring. These ring structures may further have a substituent. Examples of the substituent include those described for Formula (b-3-1). Examples of a heteroatom when the resulting ring structure is a heterocyclic ring include N, O, and S.

Furthermore, the thiochromanone compound is preferably a compound having on the thiochromanone ring structure at least one substituent (an alkyl group, a halogen atom, a hydroxy group, a cyano group, a nitro group, an amino group, an alkylthio group, an alkylamino group, an alkoxy group, an alkoxycarbonyl group, an acyloxy group, an acyl group, a carboxy group, or a sulfo group, etc.). As examples of the substituent above, an alkyl group, a halogen atom, a hydroxy group, an alkylthio group, an alkylamino group, an alkoxy group and an acyloxy group are preferable, an alkyl group having 1 to 20 carbons and a halogen atom are more preferable, and an alkyl group having 1 to 4 carbons and a halogen atom are yet more preferable.

Furthermore, the thiochromanone compound is more preferably a compound having at least one substituent on an aromatic ring and at least one substituent on a thiocyclohexenone ring.

The specific examples of the thiochromanone compound preferably include (I-1) to (I-31) listed below. Among them, (I-14), (I-17) and (I-19) are more preferable, and (I-14) is particularly preferable.

(I-1)

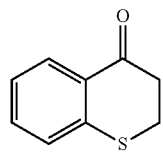

(I-2)

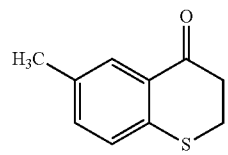

(I-3)

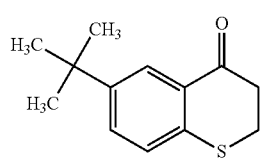

(I-4)

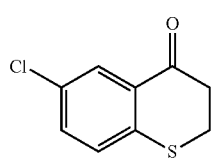

(I-5)

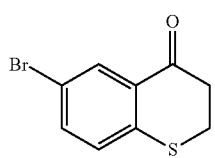

(I-6)

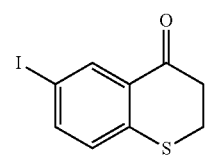

(I-7)

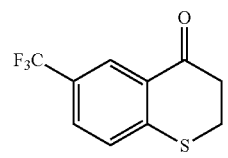

-continued (I-8)

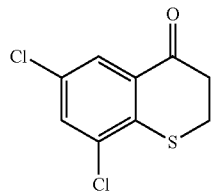

(I-9)

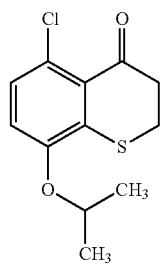

(I-10)

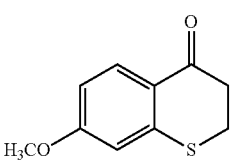

(I-11)

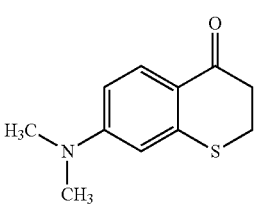

(I-12)

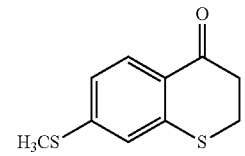

(I-13)

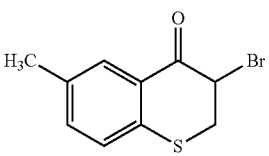

(I-14)

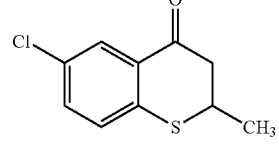

(I-15)

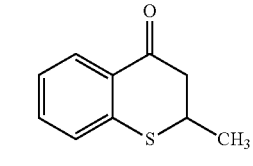

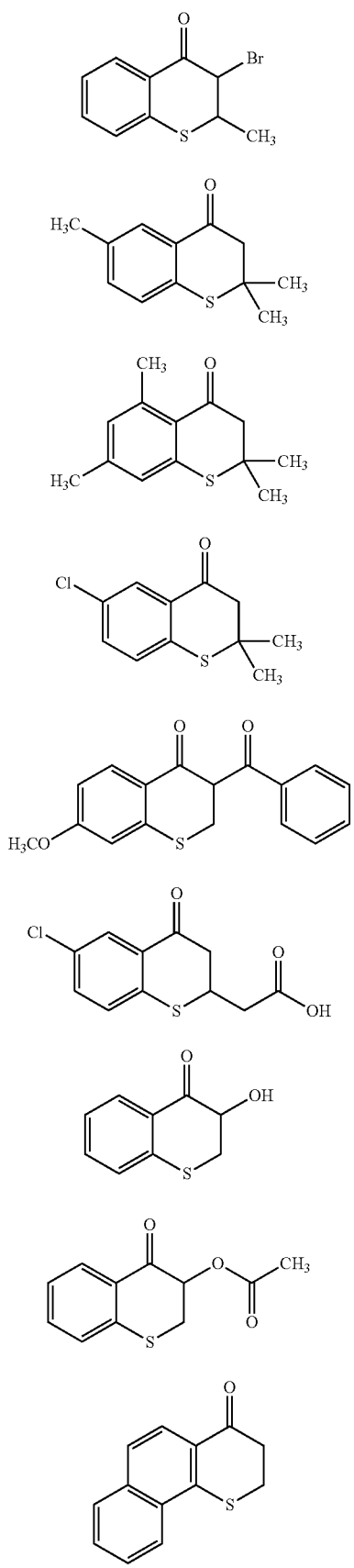
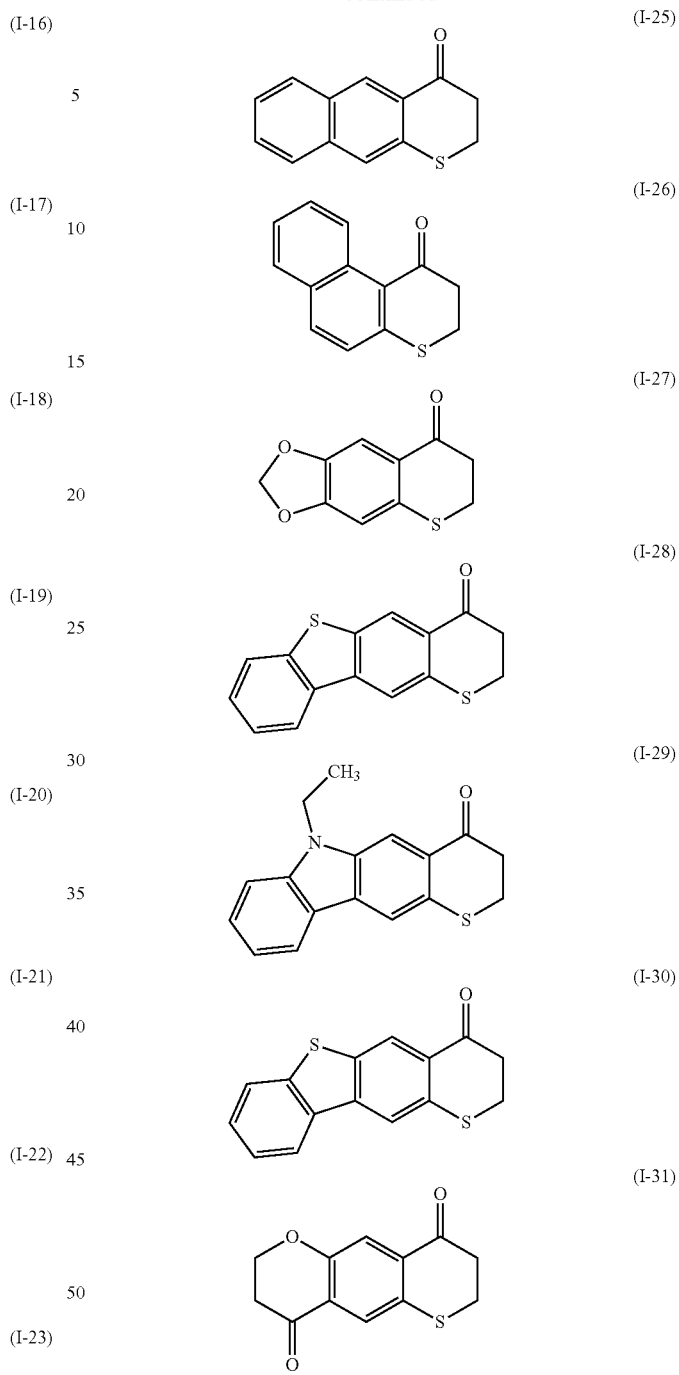

<Other Polymerization Initiator>

The ink composition of the present invention may comprise a polymerization initiator other than Component B-1 to Component B-3. The other polymerization initiator is preferably (Component B-4) an α-aminoalkylphenone compound.

(Component B-4) α-Aminoalkylphenone Compound

The ink composition of the present invention preferably comprises (Component B-4) an α-aminoalkylphenone compound. The colored ink composition preferably comprises Component B-4. Component B-4 is preferably a compound represented by Formula (b-4-1).

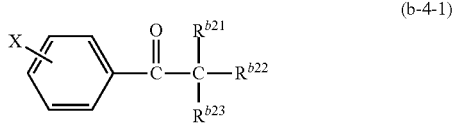

(b-4-1)

In Formula (b-4-1), $R^{b21}$, $R^{b22}$, and $R^{b23}$ independently denote a hydroxy group, an optionally substituted alkyl group, an optionally substituted alkoxy group, or an optionally substituted amino group, and X denotes a hydrogen atom, an optionally substituted amino group, an optionally substituted alkylthio group, or an optionally substituted alkyl group. When $R^{b21}$, $R^{b22}$, $R^{b23}$, and X is an amino group, the substituents may be bonded to each other to form a heterocyclic group. Examples of the substituent include an alkyl group having 1 to 10 carbons.

As Component B-4, a compound represented by Formula (b-4-2) or (b-4-3) is preferable.

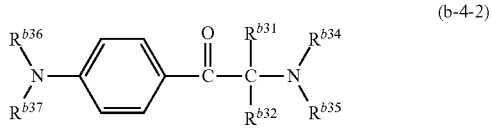

(b-4-2)

In Formula (b-4-2), $R^{b34}$, $R^{b35}$, $R^{b36}$, and $R^{b37}$ independently denote an optionally substituted alkyl group, and at least one of $R^{b34}$, $R^{b35}$ and $R^{b36}$, $R^{b37}$ may be bonded to each other to form a heterocyclic group. $R^{b31}$, $R^{b32}$, and the substituent have the same meanings as $R^{b21}$, $R^{b22}$, and the substituent in Formula (b-4-1).

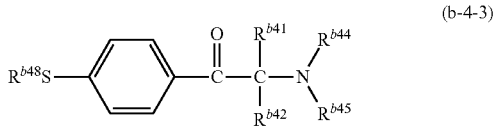

(b-4-3)

In Formula (b-4-3), $R^{b48}$ denotes an optionally substituted alkyl group.
$R^{b41}$, $R^{b42}$ and the substituent have the same meaning as $R^{b21}$, $R^{b22}$ and the substituent in Formula (b-4-1), and $R^{b44}$ and $R^{b45}$ have the same meaning as $R^{b34}$ and $R^{b35}$ in Formula (b-4-2).

The heterocyclic group is not particularly limited and may be selected appropriately. For example, a morpholino group is preferable.

Preferred examples of the α-aminoalkylphenone compound include a commercial product such as IRGACURE 369 and IRGACURE 907 manufactured by Ciba Specialty Chemicals.

From the viewpoint of curability, the content of (Component B-4) the α-aminoalkylphenone compound is preferably 0.1 to 15 wt % relative to the ink composition, more preferably 0.5 to 10 wt %, and yet more preferably 1 to 5 wt %.

Examples of the other polymerization initiator include aromatic ketones, aromatic onium salt compounds, organic peroxides, thio compounds, hexaarylbiimidazole compounds, ketoxime ester compounds, borate compounds, azinium compounds, metallocene compounds, active ester compounds, and carbon halogen bond-containing compounds. Details of the above-mentioned polymerization initiators are known to a person skilled in the art, and are described in for example paragraphs 0090 to 0116 of JP-A-2009-185186.

(Component C) Colorant

The ink composition of the present invention preferably comprises (Component C) a colorant depends on a color of each ink composition.

The colorant that can be used in the present invention is not particularly limited, and various known pigments and dyes may be selected appropriately according to an intended application. Among them, as a colorant, a pigment is preferable particularly from the viewpoint of excellent light fastness.

Pigments that are preferably used in the present invention are now described.

With regard to the pigments, there is no particular limitation, and any generally commercially available organic pigment and inorganic pigment, resin particles dyed with a dye, etc. may be used. Furthermore, a commercial pigment dispersion or a surface-treated pigment such as, for example, a dispersion of a pigment in an insoluble resin, etc. as a dispersion medium or a pigment having a resin grafted on the surface, etc. may be used as long as the effects of the present invention are not impaired.

Examples of these pigments include pigments described in, for example, 'Ganryo no Jiten (Pigment Dictionary)', Ed. by Seishiro Ito (2000), W. Herbst, K. Hunger, Industrial Organic Pigments, JP-A-2002-12607, JP-A-2002-188025, JP-A-2003-26978, and JP-A-2003-342503.

Specific examples of the organic pigment and the inorganic pigment that can be used in the present invention include, as those exhibiting a yellow color, monoazo pigments such as C.I. Pigment Yellow 1 (Fast Yellow G, etc.) and C.I. Pigment Yellow 74, disazo pigments such as C.I. Pigment Yellow 12 (Disazo Yellow AAA, etc.) and C.I. Pigment Yellow 17, benzidine-free azo pigments such as C.I. Pigment Yellow 180, azo lake pigments such as C.I. Pigment Yellow 100 (Tartrazine Yellow Lake, etc.), condensed azo pigments such as C.I. Pigment Yellow 95 (Azo Condensation Yellow GR, etc.), acidic dye lake pigments such as C.I. Pigment Yellow 115 (Quinoline Yellow Lake, etc.), benzimidazolone pigments such as and C.I. Pigment Yellow 120 (Novoperm Yellow 2HG), basic dye lake pigments such as C.I. Pigment Yellow 18 (Thioflavine Lake, etc.), anthraquinone pigments such as Flavanthrone Yellow (Y-24), isoindolinone pigments such as Isoindolinone Yellow 3RLT (Y-110), quinophthalone pigments such as Quinophthalone Yellow (Y-138), isoindoline pigments such as Isoindoline Yellow (Y-139), nitroso pigments such as C.I. Pigment Yellow 153 (Nickel Nitroso Yellow, etc.), and metal complex azomethine pigments such as C.I. Pigment Yellow 117 (Copper Azomethine Yellow, etc.).

Examples of pigments exhibiting a red or magenta color include monoazo pigments such as C.I. Pigment Red 3 (Toluidine Red, etc.), disazo pigments such as C.I. Pigment Red 38 (Pyrazolone Red B, etc.), azo lake pigments such as C.I. Pigment Red 53:1 (Lake Red C, etc.) and C.I. Pigment Red 57:1 (Brilliant Carmine 6B), condensed azo pigments such as C.I. Pigment Red 144 (Azo Condensation Red BR, etc.), acidic dye lake pigments such as C.I. Pigment Red 174 (Phloxine B Lake, etc.), basic dye lake pigments such as C.I. Pigment Red 81 (Rhodamine 6G' Lake, etc.), anthraquinone pigments such as C.I. Pigment Red 177 (Dianthraquinonyl Red, etc.), thioindigo pigments such as C.I. Pigment Red 88 (Thioindigo Bordeaux, etc.), perinone pigments such as C.I. Pigment Red 194 (Perinone Red, etc.), perylene pigments such as C.I. Pigment Red 149 (Perylene Scarlet, etc.), quinacridone pigments such as C.I. Pigment violet 19 (unsubstituted quinacridone, CINQUASIA Magenta RT-355T; manufactured by Ciba Japan) and C.I. Pigment Red 122

(Quinacridone Magenta, etc.), isoindolinone pigments such as C.I. Pigment Red 180 (Isoindolinone Red 2BLT, etc.), and alizarin lake pigments such as C.I. Pigment Red 83 (Madder Lake, etc.).

Examples of pigments exhibiting a blue or cyan color include disazo pigments such as C.I. Pigment Blue 25 (Dianisidine Blue, etc.), phthalocyanine pigments such as C.I. Pigment Blue 15 (Phthalocyanine Blue, etc.) and C.I. Pigment Blue 15:3 (IRGALITE BLUE GLVO; manufactured by Ciba Japan), acidic dye lake pigments such as C.I. Pigment Blue 24 (Peacock Blue Lake, etc.), basic dye lake pigments such as C.I. Pigment Blue 1 (Victoria Pure Blue BO Lake, etc.), anthraquinone pigments such as C.I. Pigment Blue 60 (Indanthrone Blue, etc.), and alkali blue pigments such as C.I. Pigment Blue 18 (Alkali Blue V-5:1).

Examples of pigments exhibiting a green color include phthalocyanine pigments such as C.I. Pigment Green 7 (Phthalocyanine Green) and C.I. Pigment Green 36 (Phthalocyanine Green), and azo metal complex pigments such as C.I. Pigment Green 8 (Nitroso Green).

Examples of pigments exhibiting an orange color include isoindoline pigments such as C.I. Pigment Orange 66 (Isoindoline Orange) and anthraquinone pigments such as C.I. Pigment Orange 51 (Dichloropyranthrone Orange).

Examples of pigments exhibiting a black color include carbon black, titanium black, and aniline black.

Specific examples of white pigments that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) as necessary.

For dispersion of the colorant, for example, a dispersing machine such as a ball mill, a sand mill, an attritor, a roll mill, a jet mill, a homogenizer, a paint shaker, a kneader, an agitator, a Henschel mixer, a colloidal mill, an ultrasonic homogenizer, a pearl mill, or a wet type jet mill may be used.

For dispersion of the colorant, a dispersant such as a surfactant may be added.

Furthermore, when the colorant is added, as a dispersion adjuvant, it is also possible to use a synergist as necessary according to the various types of colorant. The dispersant and dispersion adjuvant are preferably used at at least 1 part by weight but no greater than 50 parts by weight relative to 100 parts by weight of the colorant.

In the ink composition, a solvent may be added as a dispersion medium for various components such as the colorant, or the polymerizable compound, which is a low molecular weight component, may be used as a dispersion medium without using a solvent, and since the ink composition of the present invention is preferably an actinic radiation curing type liquid and the ink composition is cured after being applied on top of a recording medium, it is preferable for it to be solvent-free. This is because, if solvent remains in the cured object formed from the cured ink composition, the solvent resistance is degraded and the VOC (Volatile Organic Compound) problem of residual solvent occurs. From this viewpoint, it is preferable to use the polymerizable compound as a dispersion medium. Among them, it is preferable to select a polymerizable compound having a low viscosity in terms of improvement of dispersion suitability and handling properties of the photocurable composition.

Since excellent coloration is achieved by finer particles, it is preferable for the average particle size of the colorant used here to be at least 0.01 µm but no greater than 0.4 µm, and more preferably at least 0.02 µm but no greater than 0.2 µm. In order to make the maximum particle size be no greater than 3 µm, and preferably no greater than 1 µm, it is preferable for the colorant, the dispersant, and the dispersion medium to be selected, and dispersion conditions and filtration conditions to be set. By such control of particle size, clogging of a head nozzle can be suppressed, and the storage stability of the ink composition, and the transparency and curing sensitivity of the ink composition can be maintained.

The particle size of the colorant may be measured by a known measurement method. Specifically, it may be measured by a centrifugal sedimentation light transmission method, an X-ray transmission method, a laser diffraction/scattering method, or a dynamic light scattering method. In the present invention, a value obtained by measurement using the laser diffraction/scattering method is employed.

The content of the colorant may be selected appropriately according to the color and the intended application, but from the viewpoint of image density and storage stability, it is preferably 0.5 to 30 wt % relative to the weight of the entire colored ink composition, more preferably 1.0 to 20 wt %, and particularly preferably 2.0 to 10 wt %.

Furthermore, in the white ink composition, the white colorant is preferably a white pigment. The content of the white colorant is preferably 1 to 40 wt % relative to the weight of the entire white ink composition, more preferably 3 to 30 wt %, and yet more preferably 5 to 20 wt %.

(Other Components)

The ink composition of the present invention may comprise as necessary, in addition to the above-mentioned components, a polymerization inhibitor, a sensitizer, a co-sensitizer, a UV absorber, an antioxidant, an antifading agent, a conductive salt, a solvent, a polymer compound, a basic compound, a surfactant, a leveling additive, a matting agent and, for adjusting film physical properties, a polyester resin, polyurethane resin, vinyl resin, acrylic resin, rubber resin, or wax, etc. They are described in JP-A-2009-185186 and may be used in the present invention as well.

(Component D) Polymerization Inhibitor

The ink composition of the present invention preferably comprises a polymerization inhibitor from the viewpoint of improving the storage stability.

When the ink composition is used as an inkjet recording ink composition, it is preferably heated in the range of 25° C. to 80° C. to thus make it less viscous and then discharged, and in order to prevent clogging of a head due to thermal polymerization it is preferable to add a polymerization inhibitor.

Examples of the polymerization inhibitor include a nitroso-based polymerization inhibitor, a hydroquinone, a benzoquinone, p-methoxyphenol, TEMPO, TEMPOL, Al cupferron, and a hindered amine. Among them, a nitroso-based polymerization inhibitor and a hindered amine-based polymerization inhibitor are preferable. Specific examples of the nitroso-based polymerization inhibitor preferably used in the present invention are shown below, but not limited thereto.

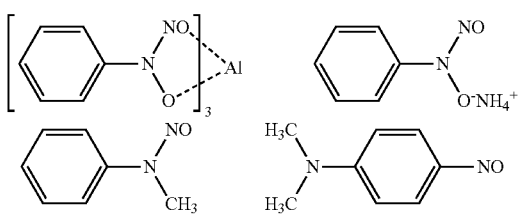

Examples of the nitroso-based polymerization inhibitor include a commercial product such as FIRSTCURE ST-1 manufactured by Chem First. Examples of the hindered amine-based polymerization inhibitor include a commercial product such as TINUVIN292, TINUVIN770DF, TINUVIN765, and TINUVIN123.

The content of the polymerization inhibitor in the ink composition of the present invention is preferably in the range of 0.01 to 1.5 wt % relative to the ink composition, more preferably 0.1 to 1.0 wt %, yet more preferably 0.2 to 0.8 wt %. When in the numerical range above, it is possible to suppress polymerization during storage and preparation of the ink composition and prevent clogging of an inkjet head nozzle.

The ink composition of the present invention preferably comprises a dispersant. Especially, when the pigment is used, the ink composition preferably comprises a dispersant in order to stably disperse the pigment in the ink composition.

As the dispersant, a polymeric dispersant is preferable. The 'polymeric dispersant' referred to in the present invention means a dispersant having a weight-average molecular weight of 1,000 or greater.

The content of the dispersant in the ink composition of the present invention is appropriately selected according to the intended purpose, and is preferably 0.05 to 15 wt % relative to the weight of the entire ink composition.

(Properties of Ink)

While taking into consideration dischargeability, the ink composition of the present invention has a viscosity at 25° C. of preferably no more than 40 mPa·s, more preferably 5 to 40 mPa·s, and yet more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, and uncured monomer can be reduced. Furthermore, ink spreading when ink droplets have landed can be suppressed, and as a result there is the advantage that the image quality is improved.

The 'viscosity' referred to here is a viscosity determined using a model RE80 viscometer manufactured by Toki Sangyo Co., Ltd. The model RE80 viscometer is a conical rotor/flat plate system E-type viscometer, and measurement is carried out at a rotational speed of 10 rpm using a rotor code No. 1 rotor. For those having a viscosity of higher than 60 mPa·s, measurement was carried out by changing the rotational speed as necessary to 5 rpm, 2.5 rpm, 1 rpm, 0.5 rpm, etc.

The ink composition of the present invention preferably has a surface tension at 25° C. of 32 to 40 mN/m, and more preferably 35 to 38 mN/m. When in the above-mentioned range, the surface gloss is excellent.

Here, the surface tension is a value measured at 25° C. by the Wilhelmy method using a general surface tensiometer (e.g. a CBVP-Z surface tensiometer manufactured by Kyowa Interface Science Co., Ltd., etc.).

In the present invention, the colored ink composition comprises at least a yellow ink composition, a magenta ink composition, a cyan ink composition, and a black ink composition, and may further comprise an ink composition of another color.

Specifically, it is preferable for it to further comprise light cyan and light magenta ink compositions. In this case, the colored ink composition comprises a total of six colors, that is, a yellow ink composition, a magenta ink composition, a cyan ink composition, a black ink composition, a light cyan ink composition, and a light magenta ink composition.

The 'dark ink composition' referred to in the present invention means an ink composition for which the content of the colorant exceeds 1 wt % of the entire ink composition. The colorant is not particularly limited; a known colorant may be used, and examples thereof include a pigment and a disperse dye.

The ink set of the present invention may comprise at least one dark ink composition and at least one light ink composition. The dark ink composition and the light ink composition employ colorants of similar colors, the ratio of the colorant concentration of the dark ink composition to the colorant concentration of the light ink composition is preferably dark ink composition:light ink composition=15:1 to 4:1, more preferably 12:1 to 4:1, and yet more preferably 10:1 to 4.5:1. When the ratio is in the above-mentioned range, a vivid full color image with little feeling of grain can be obtained.

Furthermore, the ink set of the present invention may comprise a clear ink composition in addition to the colored ink composition and the white ink composition. The clear ink composition comprises substantially no colorant and is a transparent ink composition.

As described above, the clear ink composition may be used as the undercoat layer of FIG. 1A or may be used as an overcoat layer (protective layer) of FIG. 1B. When the clear ink composition is used, the printed material formed by the ink set preferably has a 3 layer configuration.

II. Ink Jet Recording Method

The ink jet recording method of the present invention comprises an image formation step of carrying out image formation by discharging a colored ink composition and a white ink layer application step of applying a white ink composition to form a white ink layer. The white ink composition may be applied by discharging from a nozzle by the ink jet recording method or may be applied by coating, and there are no particular restrictions.

The coating machine is not particularly limited and may be appropriately selected from known coating machines according to the intended purpose, etc., and examples thereof include an air doctor coater, a blade coater, a rod coater, a knife coater, a squeegee coater, an immersion coater, a reverse roll coater, a transfer roll coater, a gravure coater, a kiss roll coater, a cast coater, a spray coater, a curtain coater, and an extrusion coater.

Furthermore, the order of the image formation step and the white ink layer application step may be appropriately selected according to a desired image.

Specifically, in order to obtain a printed material shown in FIG. 1A, it is preferable to have the image formation step and the white ink layer application step in that order, and in order to obtain a printed material shown in FIG. 1B, it is preferable to have the white ink layer application step and the image formation step in that order.

In the present invention, the ink jet recording method that is particularly preferably used comprises a scanning step of reciprocatingly moving in a first direction relative to a recording medium an ink jet head comprising a plurality of nozzle arrays comprising a first nozzle array having a plurality of nozzles arranged for discharging a colored ink composition and a second nozzle array having a plurality of nozzles arranged for discharging a white ink composition, a relative movement step of moving the recording medium relative to the ink jet head in a second direction that is not parallel to the first direction, a discharge control step of dividing the nozzle arrays (first nozzle array and second nozzle array) into a plurality of regions in the second direction and controlling ink discharge of the ink jet head for each of the divided nozzle region, and an actinic radiation irradiation step of carrying out irradiation with actinic radiation of ink that has been discharged from the ink jet head in the discharge control step and is attached to the recording medium, the actinic radiation irradiation step being a step of carrying out said irradiation with actinic radiation by dividing an area that is to be irradiated with actinic radiation into a plurality of regions corresponding to the divided nozzle regions and controlling the amount of light for each of the divided irradiation regions individually for each region.

The method is explained in detail below by reference to the drawings.

(Overall Configuration of Ink Jet Recording Equipment)

FIG. 2 is an external perspective view showing one example of ink jet recording equipment suitably used in the present invention. This ink jet recording equipment 10 is a wide format printer that forms a color image above a recording medium 12 using a UV curing type ink (UV curable ink). The wide format printer is equipment that is suitable for recording on a wide printing region such as for a large size poster or a commercial wall advertisement. Here, one corresponding to A3+ or greater is called 'wide format'.

The ink jet recording equipment 10 comprises a main body 20 and support legs 22 for supporting the main body 20. The main body 20 is provided with a drop-on-demand type ink jet head 24 for discharging an ink toward a recording medium (media) 12, a platen 26 for supporting the recording medium 12, and a guide mechanism 28 and a carriage 30 as head movement means (scanning means).

The guide mechanism 28 is disposed above the platen 26 so as to extend perpendicular to the transport direction (X direction) of the recording medium 12 and along the scanning direction (Y direction), which is parallel to a medium support face of the platen 26. The carriage 30 is supported so that it can move reciprocatingly in the Y direction along the guide mechanism 28. The carriage 30 is equipped with the ink jet head 24, provisional curing light sources (pinning light sources) 32A and 32B for irradiating the ink above the recording medium 12 with UV, and main curing light sources (curing light sources) 34A and 34B.

The provisional curing light sources 32A and 32B are light sources for emitting UV for preliminary curing of an ink to a degree such that adjacent droplets do not coalesce after ink droplets discharged from the ink jet head 24 land on the recording medium 12. The main curing light sources 34A and 34B are light sources for emitting UV for carrying out additional exposure after preliminary curing and finally completely curing the ink (main curing). Although details are described later, either one or both of the main curing light sources 34A and 34B are configured so as to be movable in the X direction so as to be aligned in the Y direction with the ink jet head 24 and the provisional curing light sources 32A and 32B.

The ink jet head 24, the provisional curing light sources 32A and 32B, and the main curing light sources 34A and 34B disposed on the carriage 30 move integrally (together) with the carriage 30 along the guide mechanism 28. The reciprocating movement direction (Y direction) of the carriage 30 can be called a 'main scanning direction' and the transport direction (X direction) of the recording medium 12 can be called a 'sub scanning direction'. The Y direction corresponds to the 'first direction' and the X direction corresponds to the 'second direction'.

As the recording medium 12, various media such as paper, nonwoven fabric, vinyl chloride, synthetic chemical fiber, polyethylene, polyester, and tarpaulin may be used, regardless of material or permeability. The recording medium 12 is fed from the back side of the equipment in a rolled state (see FIG. 2) and wound up by a wind-up roller (not illustrated in FIG. 2, reference number 44 in FIG. 3). Ink droplets are discharged from the ink jet head 24 onto the recording medium 12 transported on the platen 26, and the ink droplets attached to the recording medium 12 are irradiated with UV from the provisional curing light sources 32A and 32B and the main curing light sources 34A and 34B.

In FIG. 2, a mounting section 38 for an ink cartridge 36 is provided on the left-hand side of the front face of the main body 20. The ink cartridge 36 is a replaceable ink supply source (ink tank) storing a UV curing type ink. The ink cartridges 36 are provided so as to correspond to each color ink used in the ink jet recording equipment 10 of the present example. Each ink cartridge 36 for the respective color is connected to the ink jet head 24 via an independently formed ink supply route, which is not illustrated. When the amount of each color ink remaining becomes small, the ink cartridge 36 is replaced.

Furthermore, although it is not illustrated, a maintenance section for the ink jet head 24 is provided on the right-hand side of the front face of the main body 20. The maintenance section is provided with a cap for preventing the ink jet head 24 from drying out when not printing and a wiping member (blade, web, etc.) for cleaning a nozzle face (ink discharge face) of the ink jet head 24. The cap for capping the nozzle face of the ink jet head 24 is provided with an ink receptor for receiving ink droplets discharged from the nozzle for maintenance.

(Explanation of Recording Medium Transport Route)

Figure 3:
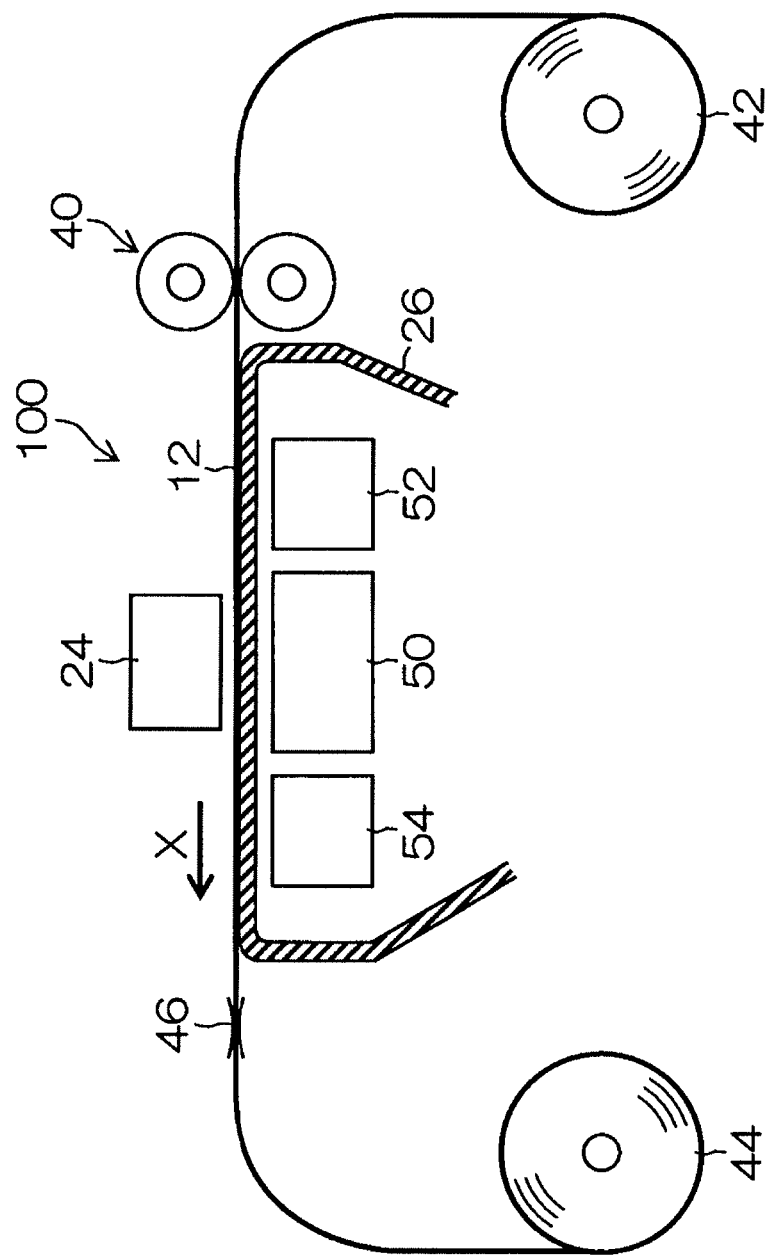
FIG. 3: A transparent plan view schematically showing a paper transport path of the ink jet recording equipment shown in FIG. 2.

FIG. 3 is an explanatory view schematically showing a recording medium transport route in the ink jet recording equipment 10. As shown in FIG. 3, the platen 26 is formed in an inverted gutter shape, and its upper face acts as a support face for the recording medium 12 (medium support face). Disposed on the upstream side, in the recording medium transport direction (X direction), in the vicinity of the platen 26 is a pair of nip rollers 40 as recording medium transport means for intermittently transporting the recording medium 12. These nip rollers 40 move the recording medium 12 in the recording medium transport direction on the platen 26.

The recording medium 12, which is fed out from a supply-side roll (feed-out supply roll) 42 constituting medium transport means of a roll-to-roll system, is intermittently transported in the recording medium transport direction by means of the pair of nip rollers 40 provided at the entrance (upstream side in the recording medium transport direction of the platen 26) of a printing section. The recording medium 12 that has arrived at the printing section immediately below the ink jet head 24 is subjected to printing by the ink jet head 24 and wound up by the wind-up roll 44 after printing. A guide 46 for the recording medium 12 is provided on the downstream side in the recording medium transport direction of the printing section.

A temperature control section 50 for controlling the temperature of the recording medium 12 during printing is provided on the reverse face of the platen 26 (the face opposite to the face supporting the recording medium 12) at a position opposite the ink jet head 24 in the printing section. When the recording medium 12 during printing is controlled to have a predetermined temperature, values of physical properties such as viscosity or surface tension of ink droplets that have landed on the recording medium 12 attain desired values, and it becomes possible to obtain a desired dot size. If necessary, a pre-temperature control section 52 may be provided on the upstream side of the temperature control section 50, and a post-temperature control section 54 may be provided on the downstream side of the temperature control section 50.

(Explanation of Ink Jet Head)

Figure 4:
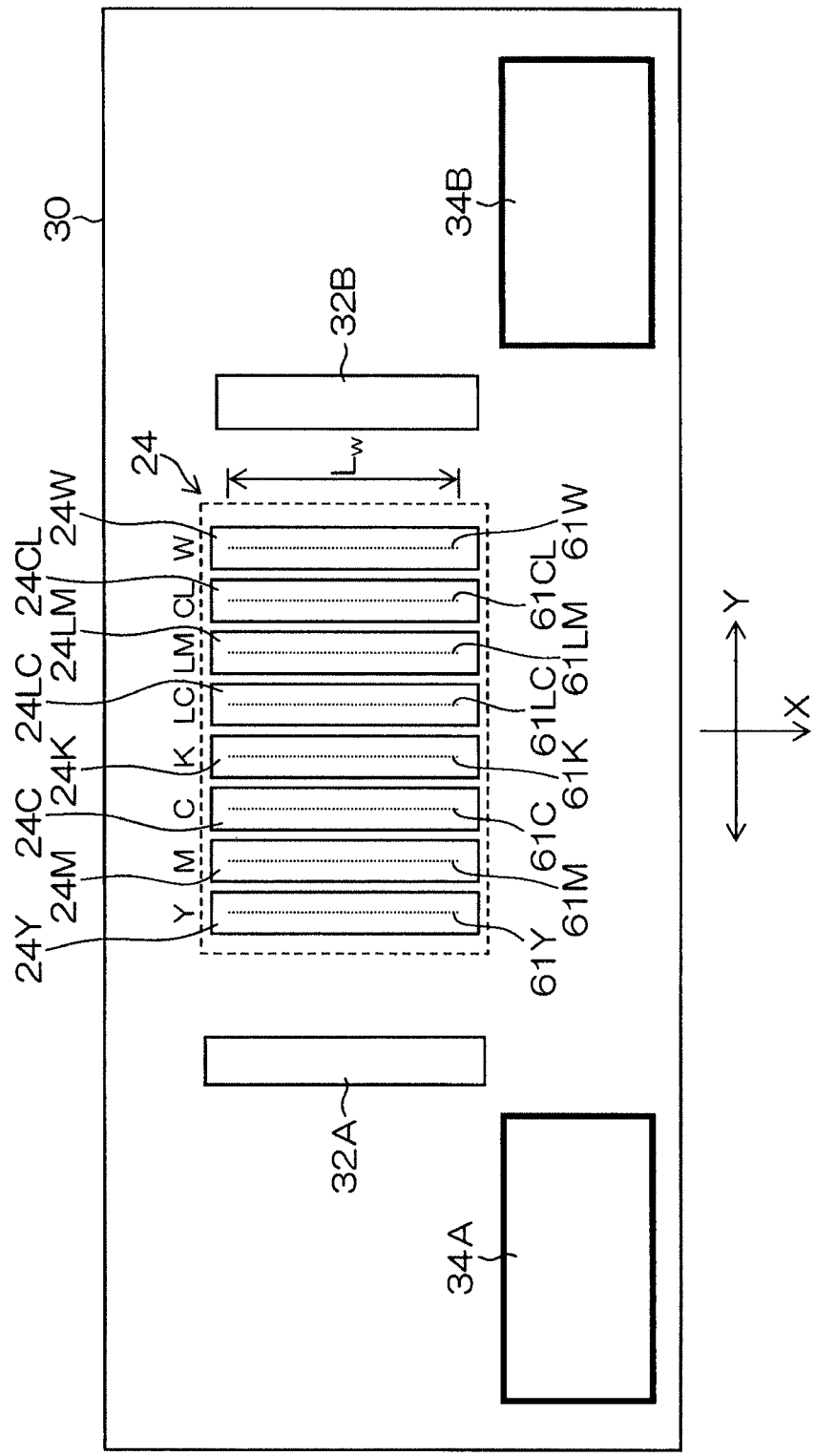
FIG. 4: A transparent plan view showing the layout configuration of an ink jet head and a UV irradiation section shown in FIG. 2.

FIG. 4 is a transparent plan view showing an example of the configuration of the ink jet head 24, the provisional curing light sources 32A and 32B, and the main curing light sources 34A and 34B disposed on the carriage 30.

Nozzle arrays 61Y, 61M, 61C, 61K, 61LC, 61LM, 61CL, and 61W for discharging inks of each color are provided in the ink jet head 24 for inks of each of yellow (Y), magenta (M), cyan (C), black (K), light cyan (LC), and light magenta (LM) colors, a clear (transparent) (CL) ink, and a white (W) ink. In FIG. 4, the nozzle arrays are illustrated by dotted lines, and individual nozzles are not illustrated. In the explanation below, the nozzle arrays 61Y, 61M, 61C, 61K, 61LC, 61LM, 61CL, and 61W might collectively be denoted by reference numeral 61.

The type of ink colors (number of colors) and the combination of colors are not limited to those of the present embodiment. For example, a mode in which LC and LM nozzle arrays are omitted, a mode in which a CL nozzle array is omitted, a mode in which a nozzle array for a metal ink is added, a mode in which a nozzle array for discharging a special color ink is added, etc. are possible. Furthermore, the order for the arrangement of color nozzle arrays is also not restricted. However, a configuration in which an ink having low curing sensitivity toward UV among the plurality of ink types is disposed on the side closer to the provisional curing light source 32A or 32B is preferable.

It is possible to form a head module for the nozzle array 61 of each color and form an ink jet head 24 that can carry out color drawing by arranging the head modules. For example, a mode in which a head module 24Y having the nozzle array 61Y for discharging a yellow ink, a head module 24M having the nozzle array 61M for discharging a magenta ink, a head module 24C having the nozzle array 61C for discharging a cyan ink, a head module 24K having the nozzle array 61K for discharging a black ink, and head modules 24LC, 24LM, 24CL, and 24W having the nozzle arrays 61LC, 61LM, 61CL, and 61W for discharging the respective LC, LM, CL, and W inks are disposed and arranged at equal intervals along the reciprocating movement direction (the main scanning direction, the Y direction) of the carriage 30 is also possible. A module group (head group) comprising the respective color head modules 24Y, 24M, 24C, 24K, 24LC, and 24LM may be interpreted as being the 'ink jet head', or each module may be interpreted as being the 'ink jet head'. Alternatively, a configuration in which ink flow paths for the respective colors are separately formed in the interior of one ink jet head 24 and said one head comprises a nozzle array for discharging inks of a plurality of colors is also possible.

In each nozzle array 61, a plurality of nozzles are arranged at fixed intervals in one line (in a straight line) along the recording medium transport direction (the sub scanning direction, the X direction). In the ink jet head 24 of this example, the arrangement pitch (nozzle pitch) of nozzles forming each nozzle array 61 is 254 μm (100 dpi), the number of nozzles forming one line nozzle array 61 is 256 nozzles, and the overall length Lw of the nozzle array 61 (nozzle array overall length) is about 65 mm (254 μm×255=64.8 mm). Furthermore, the discharge frequency is 15 kHz, and the droplet quantity discharged can be adjusted to three levels, that is, 10 pL, 20 pL, and 30 pL, by changing the drive waveform.

As an ink discharge method for the ink jet head 24, a method (piezo jet method) in which ink droplets are fired by deformation of a piezoelectric element (piezo actuator) is employed. As a discharge energy-generation device, as well as a mode in which an electrostatic actuator is used (electrostatic actuator method), a mode in which a bubble is generated by heating an ink using a heating body (heating device) such as a heater and an ink droplet is fired by the pressure obtained (thermal jet method) may be employed. Since a UV curing type ink usually has high viscosity compared with a solvent ink, when a UV curing type ink is used it is preferable to employ the piezo jet method, which has a relatively large discharge force.

(Drawing Mode)

The ink jet recording equipment 10 shown in the present example employs drawing control by the multipass method and can change printing resolution by changing the number of printing passes. For example, three types of drawing modes, that is, high productivity mode, standard mode, and high image quality mode, are prepared, and the printing resolution is varied for each mode. The drawing mode can be selected according to the purpose of printing or the intended application.

In the high productivity mode, printing is carried out with a resolution of 600 dpi (main scanning direction)×400 dpi (sub scanning direction). In the case of the high productivity mode, a resolution of 600 dpi is achieved in the main scanning direction by 2 passes (two scans). In the first scan (outward pass of the carriage 30), dots are formed with a resolution of 300 dpi. In the second scan (return pass), dots are formed at 300 dpi so as to fill in between the dots formed by the first scan (outward pass), thus obtaining a resolution of 600 dpi in the main scanning direction.

On the other hand, with regard to the sub scanning direction, the nozzle pitch is 100 dpi, and dots are formed with a resolution of 100 dpi in the sub scanning direction by one main scan (1 pass). Therefore, a resolution of 400 dpi is achieved by carrying out gap-filling printing by 4 pass printing (4 scans). The main scanning speed of the carriage 30 in the high productivity mode is 1270 mm/sec.

In the standard mode, printing is carried out with a resolution of 600 dpi×800 dpi, and the resolution of 600 dpi×800 dpi is obtained by 2 pass printing for the main scanning direction and 8 pass printing for the sub scanning.

In the high image quality mode, printing is carried out with a resolution of 1,200×1,200 dpi, and the resolution of 1,200 dpi×1,200 dpi is obtained by 4 pass printing for the main scanning direction and 12 pass printing for the sub scanning.

<Swath Width by Shingling Scanning>

In the drawing mode of wide format equipment, drawing conditions for shingling (interlacing) are determined for each of the set resolutions. Specifically, since shingling drawing is carried out by dividing the width Lw (nozzle array length) of a discharge nozzle array of an ink jet head by the number of passes (times of repetition of scanning), the swath width varies depending on the nozzle array width of the ink jet head and the number of passes (number of divisions for interlacing) in the main scanning direction and the sub scanning direction. Details of shingling drawing by a multipass method are explained in for example JP-A-2004-306617.

As one example, the relationship between the swath width and the number of passes in shingling drawing when a QS-10 head (100 dpi, 256 nozzles) manufactured by a FUJIFILM Dimatix is as in the Table below (Table 1). The swath width that is expected by drawing is the value obtained by dividing the nozzle array width by the product of the number of passes in the main scanning direction and the number of passes in the sub scanning direction.

TABLE 1

| Width of nozzle array used (mm) | 64.8 | 64.8 | 64.8 | 64.8 |
|---|---|---|---|---|
| Number of main passes | 1 | 1 | 2 | 2 |
| Number of sub passes | 2 | 4 | 2 | 4 |
| Swath width (mm) | 32.4 | 16.2 | 16.2 | 8.1 |

(Configuration of UV Irradiation Section)

As shown in FIG. 4, the provisional curing light sources 32A and 32B are disposed on left and right sides of the ink jet head 24 in the carriage movement direction (Y direction). Furthermore, the main curing light sources 34A and 34B are disposed on the downstream side, in the recording medium transport direction (X direction), of the ink jet head 24. The main curing light sources 34A and 34B are disposed further outside (position further away) than the provisional curing light sources 32A and 32B in the Y direction from the ink jet head 24. The main curing light sources 34A and 34B are configured so that they can move in a direction (−X direction) opposite to the recording medium transport direction, and their positions can be changed so as to be aligned with the provisional curing light sources 32A and 32B and the ink jet head 24 along the carriage movement direction.

A color ink droplet that has been discharged from a nozzle (nozzle contained in the nozzle array 61Y, 61M, 61C, 61K, 61LC, or 61LM) for a colored ink composition (color ink) of the ink jet head 24 and has landed on the recording medium 12 is irradiated with UV for preliminary curing by means of the provisional curing light source 32A (or 32B) that passes thereabove immediately thereafter.

Furthermore, an ink droplet on the recording medium 12 that has passed through the printing region of the ink jet head 24 accompanying intermittent transport of the recording medium 12 is irradiated by UV for main curing by means of the main curing light sources 34A and 34B. In this way, temporarily putting the ink droplet in a preliminarily cured state enables the dot to have a spreading time (time for dot to spread to a predetermined size) while preventing interference between fired droplets, thus achieving a uniform height for dots and promoting interaction between the droplet and the medium to thus increase adhesion.

On the other hand, since a white ink layer formed by a white ink becomes an overcoat layer and/or an undercoat layer for a color image layer, the same dot resolution as for the color image layer is not required.

When the banding phenomenon of a white ink layer is examined in detail, the color ink requires pinning light in order to fix the position of the fired droplet, but since the white ink layer forms a base or a surface layer, there is little necessity for pinning a droplet at the fired position. Instead, it is preferable that when forming a white ink layer, the amount of pinning light corresponding to the discharge position for the white ink is set to OFF (0 mJ/cm$^2$) or the amount of irradiation light is decreased so that landed droplets are not pinned, and the ink is made to spread easily while wet, thus achieving planarization and uniformization of the layer.

Therefore, the present embodiment is configured so that a white ink droplet that has been discharged from the nozzle for a white ink (a nozzle contained in the nozzle array 61W) and has landed on the recording medium 12 is not irradiated with UV for preliminary curing, or if it is irradiated it is irradiated with an amount of UV that is smaller than that for preliminary curing of a color ink.

This ensures that there is time for the white ink dot landed on the recording medium to spread, thus improving planarization and uniformization of the layer.

Furthermore, in the present example, the white ink that has been discharged from the nozzle for a white ink (the nozzle contained in the nozzle array 61W) and has landed on the recording medium is irradiated with substantially the same amount of UV as that for the main curing treatment by means of the main curing light source 34A that has been moved to a position where UV irradiation corresponding to the position where the white ink is discharged is possible.

Because of the UV transmittance of the white ink layer formed by the white ink being low, it is preferable to carry out a curing treatment by applying substantially the same amount of activation energy as at the time of the main curing treatment at a stage when the film thickness of the white ink is small (immediately after the white ink has landed on the recording medium).

The provisional curing light sources 32A and 32B may be switched on at the same time during printing by the ink jet head 24, but the lifespan of the light sources can be increased by switching on only the provisional curing light source that is to the rear with respect to movement of the carriage in the main scanning direction. Furthermore, the main curing light sources 34A and 34B are switched on at the same time during printing by the ink jet recording equipment 10. In a drawing mode where the scanning speed is low, one thereof may be switched off, and the timing with which the provisional curing light sources 32A and 32B are made to start emitting light can be the same as or different from the timing with which the main curing light sources 34A and 34B are made to start emitting light.

(Explanation of Movement of Main Curing Light Source)

Figure 5:
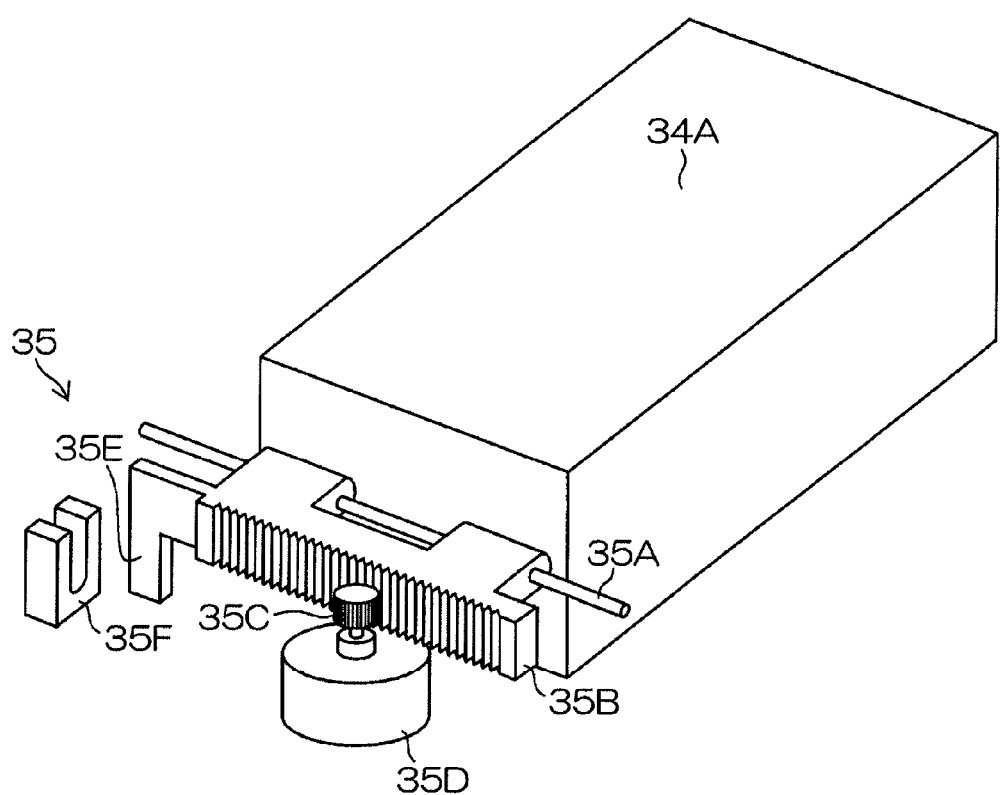
FIG. 5: A perspective view showing an example of the configuration of a light source movement part for moving the UV irradiation section shown in FIG. 4.

FIG. 5 is a perspective view showing a configuration example of a movement mechanism (light source movement part) 35 for the main curing light source 34A. The light source movement part 35 shown in this figure employs a rack and pinion linear movement mechanism. That is, the light source movement part 35 comprises a shaft 35A that is fixedly disposed along the recording medium transport direction, which is the direction of movement for the main curing light source 34A, a rack 35B that is mounted on a case of the main curing light source 34A and has tooth-shaped asperities along the shaft 35A, a drive motor 35D that has a pinion gear 35C mounted on a rotating shaft, and an optical position sensor 35F for detecting a detection piece 35E formed on an end part of the rack.

When the rotational shaft of the drive motor 35D is rotated, the pinion gear 35C rotates, the rack 35B moves along the shaft 35A due to meshing between the pinion gear 35C and the rack 35B, and the main curing light source 34A moves along the shaft 35A together with the rack 35B. When the detection piece 35E provided at the extremity of the rack 35B enters a detection range of the position sensor 35F, rotation of the drive motor 35D is stopped, and the main curing light source 34A stops at a predetermined position.

A movement mechanism having the same configuration may be provided on the main curing light source 34B positioned on the side opposite to the main curing light source 34A relative to the ink jet head 24 so that it is configured to be movable. Furthermore, the main curing light source 34A may be configured to be movable between a plurality of positions by providing a plurality of the position sensors 35F.

(Explanation of Image Formation Process)

The ink jet recording equipment 10 shown in the present example is configured so that an image having a layer structure is formed by layering a color image layer (illustrated by reference numeral 82 in FIG. 1) formed from a color ink (Y, M, C, K, LC, LM, etc.) and a white ink layer (illustrated by reference numeral 80 in FIG. 1) formed from a white ink. The amount of UV irradiation is controlled according to the order of layer formation and UV absorption characteristics (ink curing characteristics).

For example, since the white ink composition contains titanium oxide, zinc oxide, etc. as a pigment, the UV transmittance is poor compared with a color ink and a clear ink, and when the same amount of UV per unit volume as for the color ink or the clear ink is applied, the curing time is long. In order to eliminate any difference in curing characteristics caused by the UV transmission characteristics of the white ink and the color ink, irradiation with UV is controlled so that the amount of UV irradiation per unit time is larger for the white ink than for the color ink. A specific example of such image formation is described later.

From the viewpoint of UV transmission, the black ink composition is classified as an ink that requires a longer curing time, but since it is used for formation of a color image layer and it is necessary to prevent interference between fired droplets by subjecting it to preliminary curing immediately after firing droplets, it is classified as a color ink.

<White Ink Layer>

The white ink layer, which becomes an undercoat layer (base layer) and/or an overcoat layer for a color layer (image layer) formed from the color ink, usually comprises titanium dioxide, zinc oxide, etc. as a pigment and has a lower transmittance than the color ink. When it is used in a wide format printer, since it is used as a base layer or a surface layer, there is little necessity for carrying out pinning exposure (preliminary curing) immediately after a droplet is fired. Instead, in order to promote spreading while wet and planarization of the fired droplet, it is preferable to employ a mechanism in which unlike the color layer the white layer is not exposed to pinning light or a mechanism in which the action of curing by pinning light is suppressed.

In accordance with an experiment, the color layer is preferably irradiated immediately after firing with an amount of pinning light per unit area of 1 $mJ/cm^2$ to 20 $mJ/cm^2$, and more preferably 2 $mJ/cm^2$ to 8 $mJ/cm^2$. On the other hand, with regard to the white ink layer, it is preferable to apply an amount of pinning light of 0 $mJ/cm^2$ to 15 $mJ/cm^2$ immediately after a droplet is fired, and more preferably 0 $mJ/cm^2$ to 8 $mJ/cm^2$.

Pinning light is applied once to multiple times by carriage scanning in order to prevent the droplet shape from collapsing due to coalescence or interference with another ink immediately after the droplet is fired or prevent the droplet from moving. Curing light means exposure for completely curing the ink forming an image. Curing light is also applied multiple times by carriage scanning. The total amount of exposure reaches from 200 $mJ/cm^2$ up to 1,000 to 3,000 $mJ/cm^2$ as a result of one to multiple times of pinning exposure and multiple times of curing exposure. The tendency for ink sensitivity is determined by the sensitivity with respect to irradiation wavelength and the content of the initiator and the sensitizer contained in the UV curing type ink, and the ink is cured by radical polymerization.

In the present embodiment, the provisional curing light source irradiation regions are divided according to the drawing regions of divided nozzle regions forming each layer such as a color layer or a white ink layer so that appropriate pinning light can be applied according to the divided nozzle regions, and the amount of light for each region (illumination intensity distribution) is controlled. Details are described later.

(Detailed Explanation of Image Formation Process)

With regard to an image formation method that is applied to the ink jet recording equipment 10 shown in the present example, each nozzle array 61 is divided into a plurality of regions in the recording medium transport direction, and a color image layer, a transparent layer, and a white ink layer are formed by discharging the color ink, the clear ink, or the white ink using any of the divided regions. The number of divisions of the nozzle array 61 is the number N of image formation layers.

Furthermore, the configuration is such that the recording medium 12 is intermittently fed out in one direction in units that are obtained by dividing the length, in the recording medium transport direction, of the divided region of the nozzle array 61 by the number of multiple passes (units determined by (overall length of nozzle array Lw/number N of image formation layers)/number of multiple passes), and a layer of the ink discharged from a region on the downstream side in the recording medium transport direction of the nozzle array 61 is layered on a layer of the ink discharged from a region on the upstream side in the same direction. Here, the 'number of multiple passes' is defined as the product of the number of passes in the carriage scanning direction and the number of passes in the recording medium transport direction.

Moreover, the white ink, which requires a longer time for curing than the other inks, is irradiated with substantially the same amount of UV as that for the main curing treatment immediately after a droplet has landed by means of one of the main curing light sources 34A and 34B, which has been moved to the white ink discharge position. The length of the irradiation area in the recording medium transport direction of the main curing light sources 34A and 34B is set to be no greater than (overall length of nozzle array Lw/number N of image formation layers) so that the same amount of UV as that for the main curing treatment is applied only to an area where the white ink has landed.

In the explanation below, the length of the irradiation area in the recording medium transport direction of the main curing light sources 34A and 34B is considered to be the same as the length in the recording medium transport direction of the main curing light sources 34A and 34B. The actual length in the recording medium transport direction of the main curing light sources 34A and 34B is determined so that a predetermined irradiation area is obtained while taking into consideration spreading of the irradiation area. Moreover, the 'number N of image formation layer' can also be expressed as the 'number of divisions'.

First Specific Example

The first specific example is one in which the printed material shown in FIG. 1B is formed, and has a two layer configuration having a layer structure in which the white ink layer 80 is formed on the recording medium 12, and the color image layer 82 is formed (layered) on the white ink layer 80.

Figure 6:
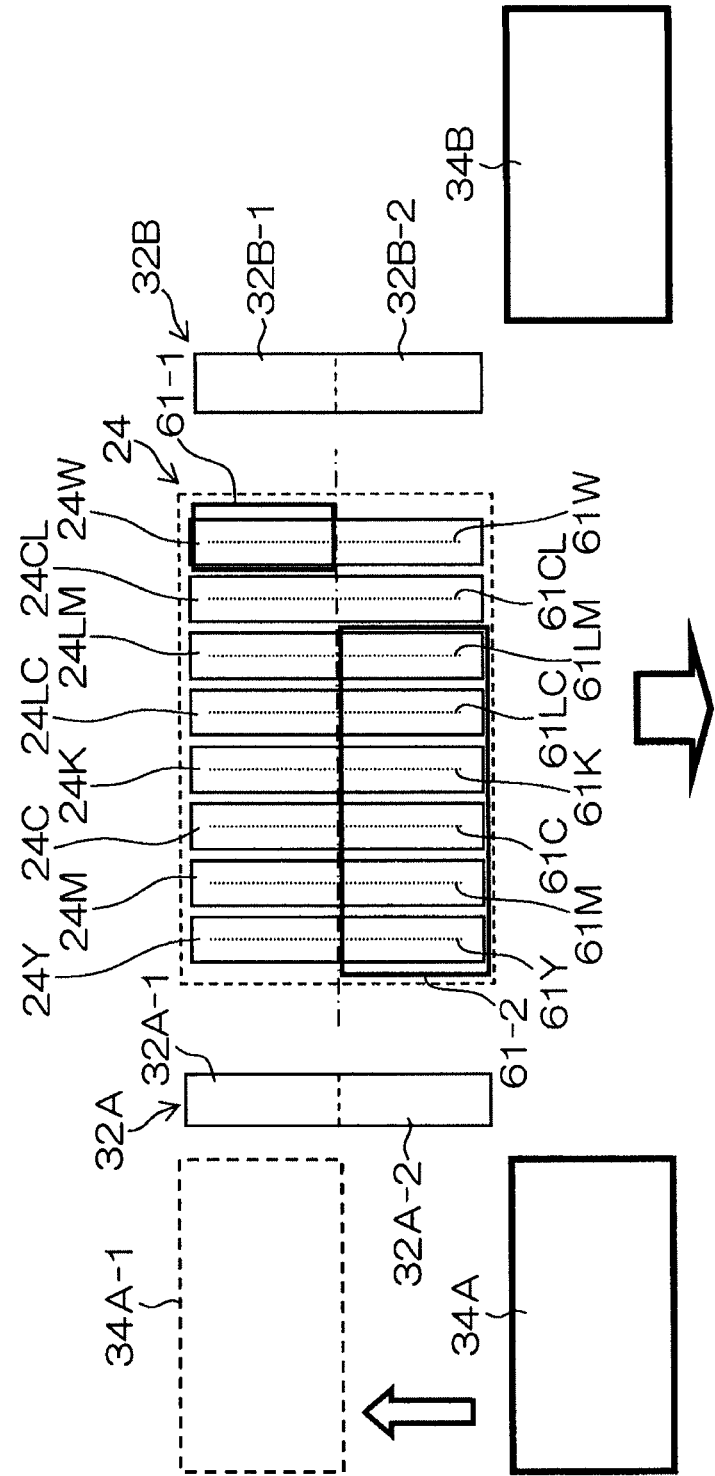
FIG. 6: An explanatory view showing an example of the configuration of the ink jet head and the UV irradiation section for forming an image shown in FIG. 1B.

FIG. 6 is an explanatory view schematically showing the configuration of the ink jet head 24 forming an image having the layer structure shown in FIG. 1B and the arrangement of the main curing light sources 34A and 34B. The recording medium transport direction (X direction) is from top to bottom as shown by the downward arrow in the figure, and the reciprocating movement direction (Y direction) for the carriage 30 is the left and right direction.

As shown in FIG. 6, each nozzle array 61 is divided into an upstream side region 61-1 and a downstream side region 61-2, the white ink is discharged only from the upstream side region 61-1 of the nozzle array 61W, and the color inks are discharged only from the downstream side region 61-2 of the nozzle arrays 61Y, 61M, 61C, 61K, 61LC, and 61LM. When a white ink layer 80 (see FIG. 1) is formed from the white ink discharged from the upstream side region 61-1, the recording medium 12 is moved only by a distance ((Lw/2)/number of multiple passes) in the recording medium transport direction, and a color image layer 82 is formed on the previously formed white ink layer 80 from the color ink discharged from the downstream side region 61-2.

While forming the color image layer 82 on the white ink layer 80, the white ink is discharged only from the upstream side region 61-1 of the nozzle array 61W to a discharge position for the white ink on the upstream side in the recording medium transport direction that is adjacent to the discharge position for the color ink. That is, at the same time as formation of the color image layer 82, formation of a white ink layer 80 that becomes a region where a subsequent color image is formed proceeds. Furthermore, discharging of the white ink forming the white ink layer 80 and discharging of the color ink forming the color image layer 82 are carried out by the multipass method, which is explained above.

The main curing light source 34A is moved (direction of movement shown by upward arrow) to the position shown by the broken line denoted by reference numeral 34A-1, that is, a position corresponding to the discharge position for the white ink (a position aligned with the upstream side region 61-1 of the nozzle array 61W for discharging white ink in the carriage movement direction), and substantially the same amount of UV as that for the main curing treatment is applied to the white ink by means of the main curing light source 34A immediately after landing on the recording medium 12. On the other hand, after the color ink is subjected to a preliminary curing treatment by means of the provisional curing light sources 32A and 32B, it is subjected to the main curing treatment by means of the main curing light source 34B.

That is, step 1 of the image formation process is a step of forming the white ink layer 80. The main curing light source 34A on the left-hand side in FIG. 6 is moved (reference numeral 34A-1) so as to correspond to the discharge position for the white ink, and the carriage 30 (see FIG. 4) is scanned in the carriage movement direction. The white ink is discharge only from the upstream side region 61-1 of the nozzle array 61W. When the carriage 30 is moved from left to right in FIG. 6, the white ink is fired as droplets, and the white ink immediately after landing on the recording medium 12 is irradiated with UV from the main curing light source 34A, which scans in the carriage movement direction while following the nozzle array 61W. Substantially the same amount of UV as the main curing treatment is applied by one carriage scan (at least 10 mJ/cm² per carriage scan), and the white ink layer 80 (see FIG. 1B) in which the white ink is substantially cured is formed.

In the case of the present example, at the time of scanning when the carriage 30 moves from right to left in FIG. 6, firing of the white ink is stopped, but the main curing light source 34A remains switched on, and irradiation of UV from the main curing light source 34A continues.

Since the white ink comprises titanium oxide or zinc oxide as a pigment, it has the property of it being difficult for it to absorb UV (difficult to cure) compared with the color ink or the clear ink.

In a case in which UV light-emitting diode (UV-LED) devices are used as light-emitting sources for the provisional curing light sources 32A and 32B and the main curing light sources 34A and 34B, the light-emitting wavelength band of the UV-LED device is only a long wavelength band of 365 nm to 405 nm, and it is necessary to make an initiator contained in the ink be sensitive toward a long wavelength.

Furthermore, since the white ink layer 80 is a so-called solid image, it can employ a dot (liquid droplet) having a larger size than that of the color image. As described above, since the UV transmittance of the white ink (white ink layer 80) is lower than that of the color ink, etc., substantially the same amount of activation energy as that for the main curing treatment is applied at a stage when the film thickness of the white ink is small, and curing of the white ink is carried out. Therefore, the white ink is not subjected to pinning exposure by means of the provisional curing light sources 32A and 32B (or is subjected to irradiation with a lower amount of light than the pinning light amount for the color ink), and the same amount of activation energy as that for the main curing treatment is applied to the landed droplet thus completely curing it, after ensuring that there is as much time as possible for spreading while wet.

Step 2 is a step for forming the color image layer 82. The white ink layer 80 is already formed at the discharge position for the color ink on the recording medium 12, which is on the downstream side only by a distance (Lw/2) in the recording medium transport direction from the discharge position for the white ink. In the color image layer formation step (step 2), the carriage 30 is scanned in the carriage movement direction at this position above the white ink layer 80, and color inks are discharged from the downstream side region 61-2 of the nozzle array 61Y, 61M, 61C, 61K, 61LC, or 61LM, and the color ink droplets are fired so as to be superimposed on the white ink layer 80.

Furthermore, the color ink immediately after landing on the recording medium 12 is irradiated with UV from the provisional curing light sources 32A and 32B that follow the nozzle array 61Y, 61M, 61C, 61K, 61LC, or 61LM, thus carrying out preliminary curing and turning it into a gel state. By so doing, interference between color ink droplets that have landed can be prevented.

In this process, UV that is applied from the provisional curing light sources 32A and 32B to the color ink immediately after landing has a low amount of light of for example 1 to 5 mJ/cm² per scan of the carriage. The low amount of light for preliminary curing that is employed for image formation shown in this example is on the order of ⅒ to ½ of the high amount of light for main curing.

Although details are described later, with regard to the provisional curing light sources 32A and 32B, the irradiation region is divided into two in the X direction so as to correspond to the drawing area of each of the divided nozzle regions (the upstream side region 61-1 and the downstream side region 61-2) of the nozzle array that is divided into two, and the amount of light can be controlled for each of the division units (divided irradiation regions) shown by reference numerals 32A-1, 32A-2, 32B-1, and 32B-2 in FIG. 6.

Step 3 is the period from the step of forming the color image layer 82 to the main curing treatment step. A section where the color image layer 82 has been layered on the white ink layer 80 and that is further on the downstream side only by (Lw/2) in the recording medium transport direction from the discharge position of the color ink on the recording medium 12 comes out of the discharge position of the nozzle array 61 and is positioned in the UV irradiation area by the main curing light source 34B. By allowing a predetermined time from the preliminary curing treatment step to the main curing treatment step, it is possible to increase the affinity between the white ink layer 80 and the color image layer 82, promote spreading of dots, promote suppression of pile height and, furthermore, improve the surface gloss of the color image.

Step 4 is the main curing treatment step. The main curing light source 34B disposed on the downstream side in the recording medium transport direction of the ink jet head 24 is used, the carriage 30 is scanned in the carriage movement direction, and the color image layer 82, which has moved to the UV irradiation position of the main curing light source 34B, is subjected to the main curing treatment. The amount of UV in the main curing treatment of the color image layer 82 is at least 10 mJ/cm$^2$ per scan of the carriage. By subjecting the color image layer 82 to main curing, the surface gloss of the color image layer 82 improves, and a balance can be achieved between improvement of the adhesion between the white ink layer 80 and the color image layer 82 and hardening of the film quality of the color image layer 82.

(Configuration Example of Provisional Curing Light Source Unit)

Figure 7:
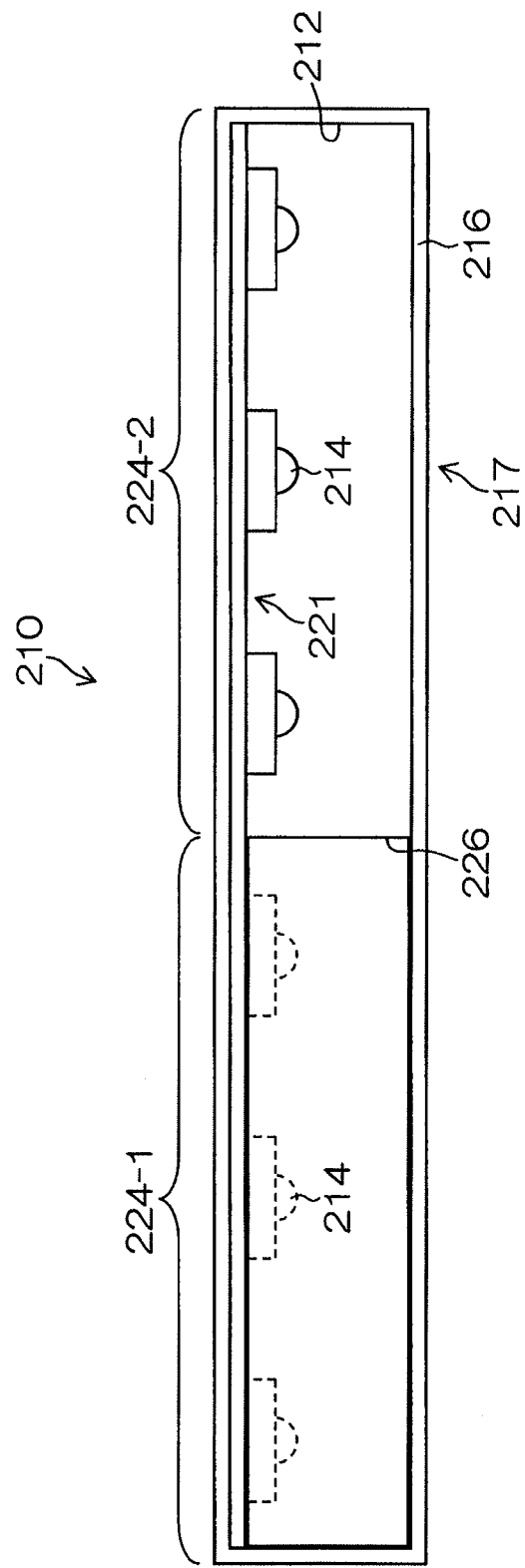
FIG. 7: A transparent side view showing an example of the configuration of a provisional curing light source unit used as a provisional curing light source of the present embodiment.
Figure 8:
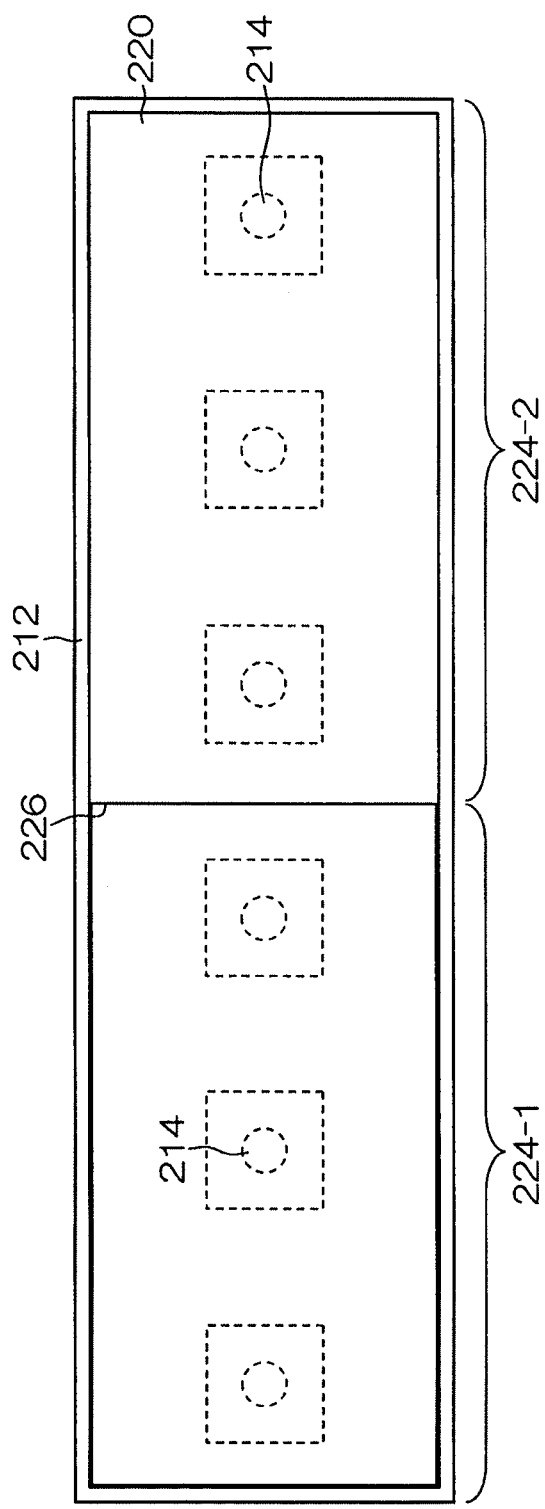
FIG. 8: A transparent plan view of the provisional curing light source unit of FIG. 7.

FIG. 7 is a transparent side view showing a configuration example of a provisional curing light source unit that is used as the provisional curing light sources 32A and 32B of the present embodiment. FIG. 8 is a transparent plan view thereof. A provisional curing light source unit 210 related to the configuration example shown in FIG. 7 and FIG. 8 has a substantially rectangular parallelepiped box shape. The provisional curing light source unit 210 has a structure in which a plurality of UV light-emitting diode devices (hereinafter, referred to as 'UV-LED devices') 214 are housed in an aluminum housing 212, and a transparent type light diffuser plate 216 is disposed on a bottom face of the housing 212.

A wiring board 220 on which the LED devices 214 are mounted is disposed in an upper part of the housing 212 in a state in which an LED-mounting face 221 is directed toward the light diffuser plate 216 (a state in which the light-emitting face of the UV-LED devices 214 is directed downward in FIG. 7).

The number of UV-LED devices 214 mounted on the wiring board 220 is not particularly limited, but from the viewpoint of a required UV irradiation width and cost, the smaller the better. In this example, six UV-LED devices 214 are aligned in one line on the wiring board 220. In order to obtain a UV irradiation width that enables UV irradiation to be carried out all at once for the nozzle array width Lw along the recording medium transport direction (X direction) of the ink jet head 24 explained in FIG. 4 and FIG. 6, the six UV-LED devices 214 are aligned in the recording medium transport direction. The lateral direction in FIG. 7 corresponds to the recording medium transport direction (X direction), and the recording medium 12 is transported from right to left in FIG. 7.

The wiring board 220 employs a metal substrate having strengthened heat releasing and heat resistance properties. Although the detailed structure of the metal substrate is not illustrated, an insulation layer is formed above a metal plate such as an aluminum or copper plate, and the UV-LED devices 214 and a LED drive wiring circuit (anode wiring, cathode wiring), etc. are formed above the insulation layer. A metal base substrate in which a circuit is formed above a base metal or a metal core substrate in which a metal plate is embedded within a substrate may be used.

Furthermore, an area, around the LED devices 214, of the LED-mounting face 221 of the wiring board 220 is subjected to a high-reflectance white resist treatment having UV resistance. Due to this white resist layer (not illustrated), UV can be reflected and scattered by the surface of the wiring board 220, and light emitted by the UV-LED devices 214 can be efficiently used in UV irradiation for preliminary curing.

The light diffuser plate 216 is a milky white plate that is formed from an optical material that diffuses light emitted from the UV-LED devices 214 while allowing it to be transmitted. For example, the light diffuser plate 216 employs a white acrylic plate in which a white pigment (light-diffusing material) is dispersed. It is not limited to a white acrylic plate, and an optical member molded by dispersing and mixing light-diffusing microparticles in a transparent material such as glass can also be used. Light diffuser plates having different transmittance or diffusion characteristics can be obtained by changing the content or the average particle size of the light-diffusing material (white pigment, etc.).

Means for diffusing light as a transparent type light diffuser plate is not limited to means in which a silica powder is dispersed in an acrylic resin, and can easily be realized by carrying out a frosting treatment, an opaque glass treatment, a ground glass treatment, etc. of the surface of a substrate formed from fused silica.

Such a transparent type light diffuser plate 216 is disposed in the lower part of the housing 212 so as to face the LED-mounting face 221 of the wiring board 220. In FIG. 7, a lower face (reference numeral 217) of the light diffuser plate 216 is a light-emitting face that opposes the recording medium (not illustrated). When all of the UV-LED devices 214 (six in this example) are switched on, UV is applied to the recording medium 12 from the light-emitting face 217 of the light diffuser plate 216 with a light irradiation width of at least the nozzle array width Lw of the ink jet head 24.

In the provisional curing light source unit 210 of this example, the LED array in which the six UV-LED devices 214 are aligned in the X direction is divided into two. That is, the plurality of UV-LED devices 214 aligned in the X direction are divided into two regions, an upstream side region 224-1 and a downstream side region 224-2 in the recording medium transport direction (X direction), each of the divided regions 224-1 and 224-2 comprising three UV-LED devices 214.

A light-shielding partition member 226 is provided within the housing 212 as an area-restricting member for defining regions of the LED device array that is divided into two, and it has a structure in which light from the UV-LED devices 214 in one region does not enter the other region. In general, UV-LED devices have a wide irradiation area and have the property of propogating while spreading, but as in this example because of the structure in which an area surrounding the LED device is covered by the partition member 226 the irradiation regions can be separated.

It is also possible to control the amount of light emission of the UV-LED devices 214 within the region individually for each of the divided regions 224-1 and 224-2. For example, when a layer is formed using the white ink, the three UV-LED devices 214 belonging to the upstream side region 224-1 are switched off, and the three UV-LED devices 214 belonging to the downstream side region 224-2 are switched on.

In accordance with the combination of such division of the light-emitting area by the partition member 226 and control of light emission of the LED devices belonging to each region 224-1 or 224-2, the UV irradiation region can be divided, and the amount of light in each of the divided irradiation regions can be controlled individually.

That is, the configuration example shown in FIG. 7 and FIG. 8 is a top irradiation type LED light source unit in which a row of the LED devices are disposed in the upper part of the light source box, and the LED irradiation switch-on region is divided and controlled according to the divided regions of the nozzle array of the ink jet head 24. Examples of control of the amount of light include current value control, pulse width modulation control, and on-off control. The configuration is provided with any of current control means for controlling a current value, pulse width modulation control means for carrying out pulse width modulation control, and on-off control means for carrying out on-off control, or an appropriate combination thereof.

The configuration is not limited to that illustrated in FIG. 7 and FIG. 8; for example, a lower face of the housing 212 can be provided with a high reflectance aluminum plate that defines an irradiation region, and the irradiation region on the upstream side/downstream side can be changed by displacing the aluminum plate. Alternatively, a mode in which the irradiation region is changed by exchanging a frame of the high reflectance aluminum plate is also possible. In this case, since the irradiation area is restricted by the high reflectance aluminum plate, this aluminum plate corresponds to the 'area-restricting member'. Other than the above, a mode in which the irradiation region is restricted by providing a mechanical shutter, a liquid crystal shutter, etc. for limiting the light irradiation area is possible.

Second Specific Example

Figure 9:
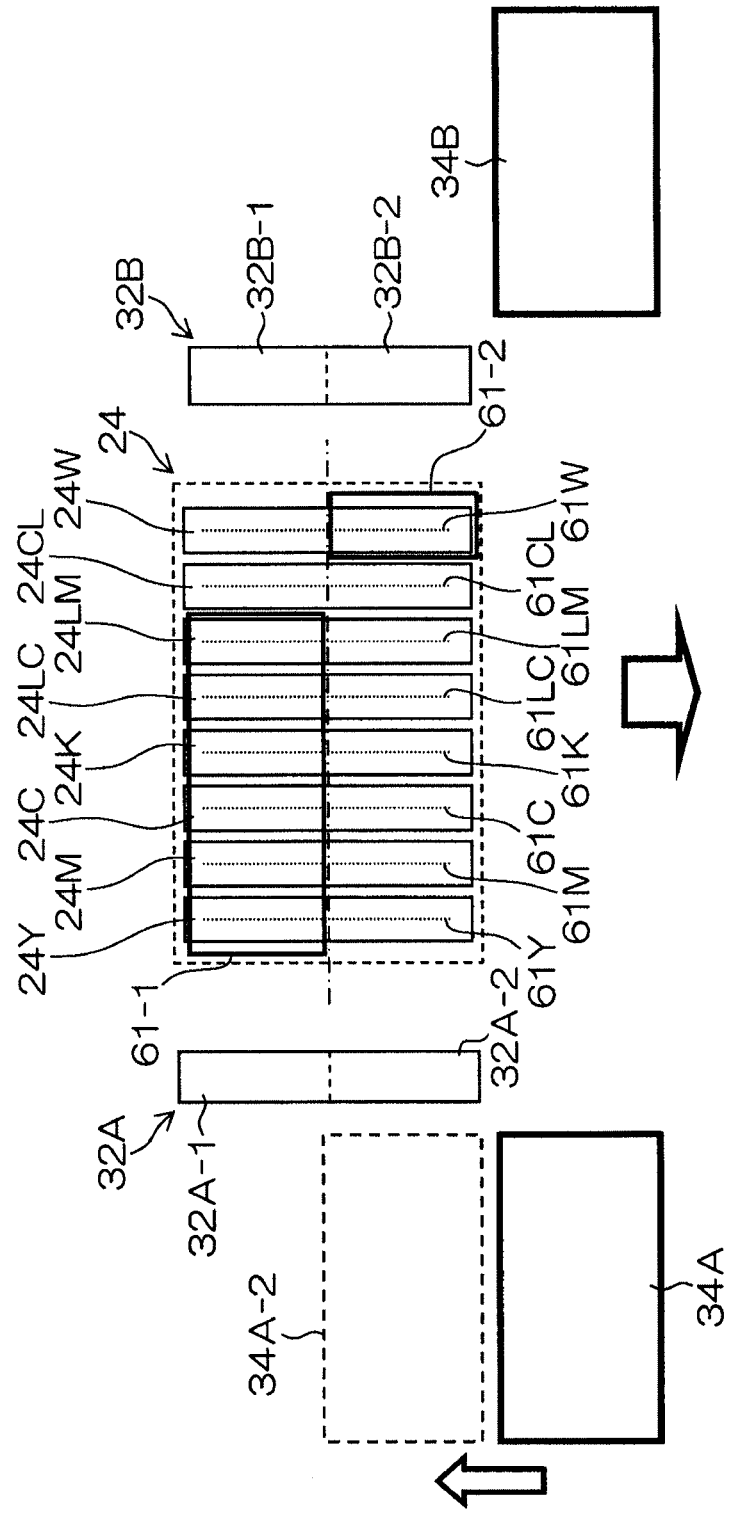
FIG. 9: An explanatory view showing one example of the configuration of the ink jet head and the UV irradiation section for forming an image shown in FIG. 1A.

FIG. 1A is an explanatory view schematically showing the image layer structure formed by the image formation process related to the second specific example. FIG. 9 is an explanatory view schematically showing the configuration of the ink jet head 24 and the arrangement of the main curing light sources 34A and 34B for forming an image having the layer structure shown in FIG. 1A. In the explanation below, portions that are the same as or similar to the portions that have been explained above are denoted by the same reference numerals, and explanation thereof is omitted.

The number of image formation layers of the image shown in FIG. 1A is 2; the color image layer 82 is formed on the transparent recording medium 12, and the white ink layer 80 is formed on the color image layer 82. When an image having such a structure is viewed from the reverse face (the side opposite to the face where the image is formed) of the recording medium 12, the color image layer 82 can be observed with the white ink layer 80 as a background.

Step 1 is a step of forming the color image layer 82. The main curing light source 34A on the left-hand side in FIG. 9 is moved to a discharge position for the white ink (a position that is aligned with the downstream side region 61-2 of the nozzle array 61W in the carriage movement direction), which is shown by the broken line with reference numeral 34A-2 (the movement direction is illustrated by an upward arrow). By scanning the carriage 30 in the carriage movement direction, a color ink is discharged onto the recording medium 12 from the upstream side region 61-1 of the nozzle array 61Y, 61M, 61C, 61K, 61LC, or 61LM. Furthermore, the color ink immediately after landing on the recording medium 12 is irradiated with a low amount of light (1 to 5 mJ/cm$^2$ per scan of the carriage) of UV from the provisional curing light sources 32A and 32B following the nozzle array 61Y, 61M, 61C, 61K, 61LC, or 61LM with one carriage scan, thus carrying out preliminary curing and turning it to a gel state. By so doing, interference between landed droplets of the color ink is prevented.

Step 2 is the period from the step of forming the color image layer 82 to the step of forming the white ink layer 80. By maintaining the preliminary cured state for a predetermined time, it is possible to increase the affinity between the recording medium 12 and the color image layer 82, promote spreading of dots, promote suppression of pile height and, furthermore, improve the surface gloss of the color image.

Step 3 is the step of forming the white ink layer 80. At the discharge position for the white ink (on the already formed color image layer 82) on the downstream side by only (Lw/2) from the discharge position for the color ink on the recording medium 12 in the recording medium transport direction, the carriage 30 (see FIG. 4) is scanned in the carriage movement direction, and the white ink is discharged onto the color image layer 82 in the preliminarily cured state only from the downstream side region 61-2 of the nozzle array 61W. The white ink immediately after landing on the recording medium 12 and the color image layer 82 in a preliminarily cured state beneath the white ink are irradiated from the main curing light source 34A that scans in the carriage movement direction by following the nozzle array 61W with at least a large amount of UV of the same level as for the main curing treatment by one scan of the carriage (10 mJ/cm$^2$ per scan of the carriage), the white ink layer 80 (see FIG. 1A) is formed, and curing of the color image layer 82 is promoted.

Control of the irradiation region by the provisional curing light sources 32A and 32B with respect to the white ink layer 80 is the same as that explained for the first specific example.

Step 4 is the main curing treatment step. The white ink layer 80 and the color image layer 82 are subjected to a main curing treatment using the main curing light source 34B disposed on the downstream side in the recording medium transport direction of the ink jet head 24. The amount of UV in such a main curing treatment is 10 mJ/cm$^2$ per scan of the carriage. By subjecting the white ink layer 80 and the color image layer 82 to main curing, the surface gloss of the color image layer 82 is improved, and a balance can be achieved between improvement of the adhesion between the white ink layer 80 and the color image layer 82 and hardening of the film quality of the color image layer 82.

(Ink Supply System)

Figure 10:
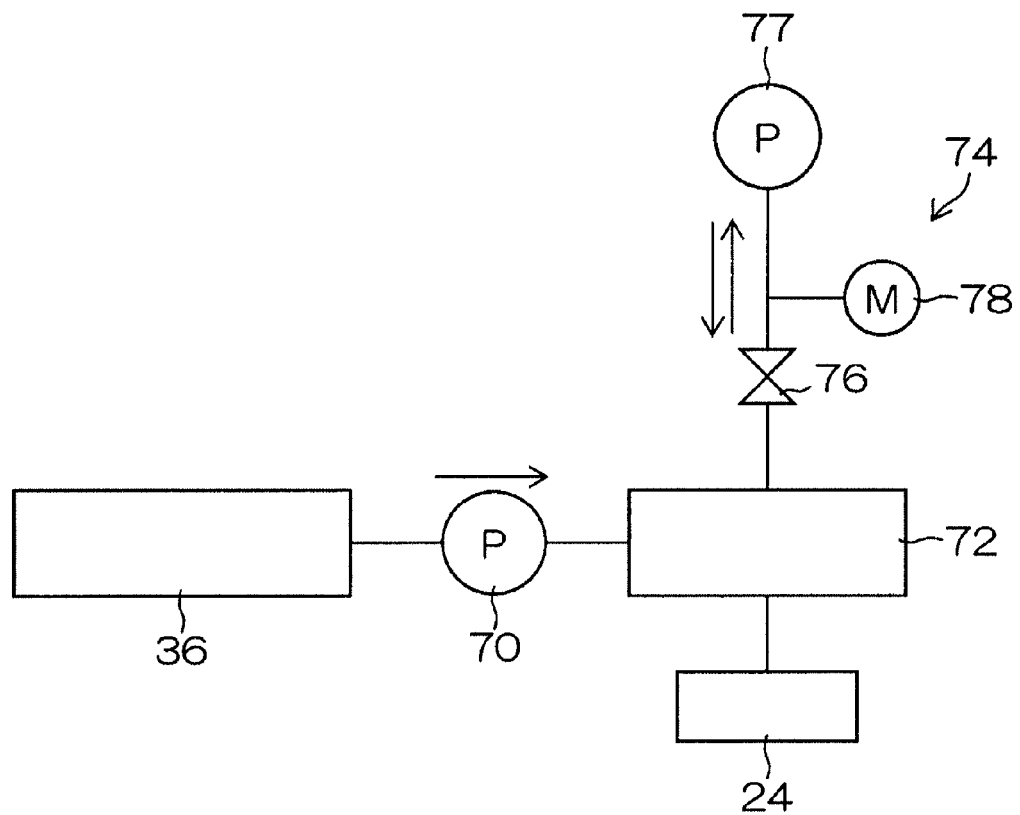
FIG. 10: A block diagram showing the configuration of an ink supply system of the ink jet recording equipment.

FIG. 10 is a block diagram showing the configuration of an ink supply system for the ink jet recording equipment 10. As shown in the figure, ink stored in the ink cartridge 36 is sucked up by a supply pump 70 and fed to the ink jet head 24 via a subtank 72. The subtank 72 is provided with a pressure-adjusting section 74 for adjusting the pressure of the ink in the interior. The pressure-adjusting section 74 is equipped with a pressurizing/decompressing pump 77 communicating with the subtank 72 via a valve 76, and a pressure gauge 78 provided between the valve 76 and the pressurizing/decompressing pump 77.

When carrying out normal printing, the pressurizing/decompressing pump 77 operates in a direction that sucks up the ink within the subtank 72, and the internal pressure of the subtank 72 and the internal pressure of the ink jet head 24 are maintained negative. When carrying out maintenance of the ink jet head 24, the pressurizing/decompressing pump 77 operates in a direction that pressurizes the ink within the subtank 72, the interior of the subtank 72 and the interior of the ink jet head 24 are forcibly pressurized, and the ink within the ink jet head 24 is discharged via a nozzle. The ink that has been forcibly discharged from the ink jet head 24 is stored in the above-mentioned ink receptor of the cap (not illustrated). (Explanation of Control System for Ink Jet Recording Equipment)

Figure 11:
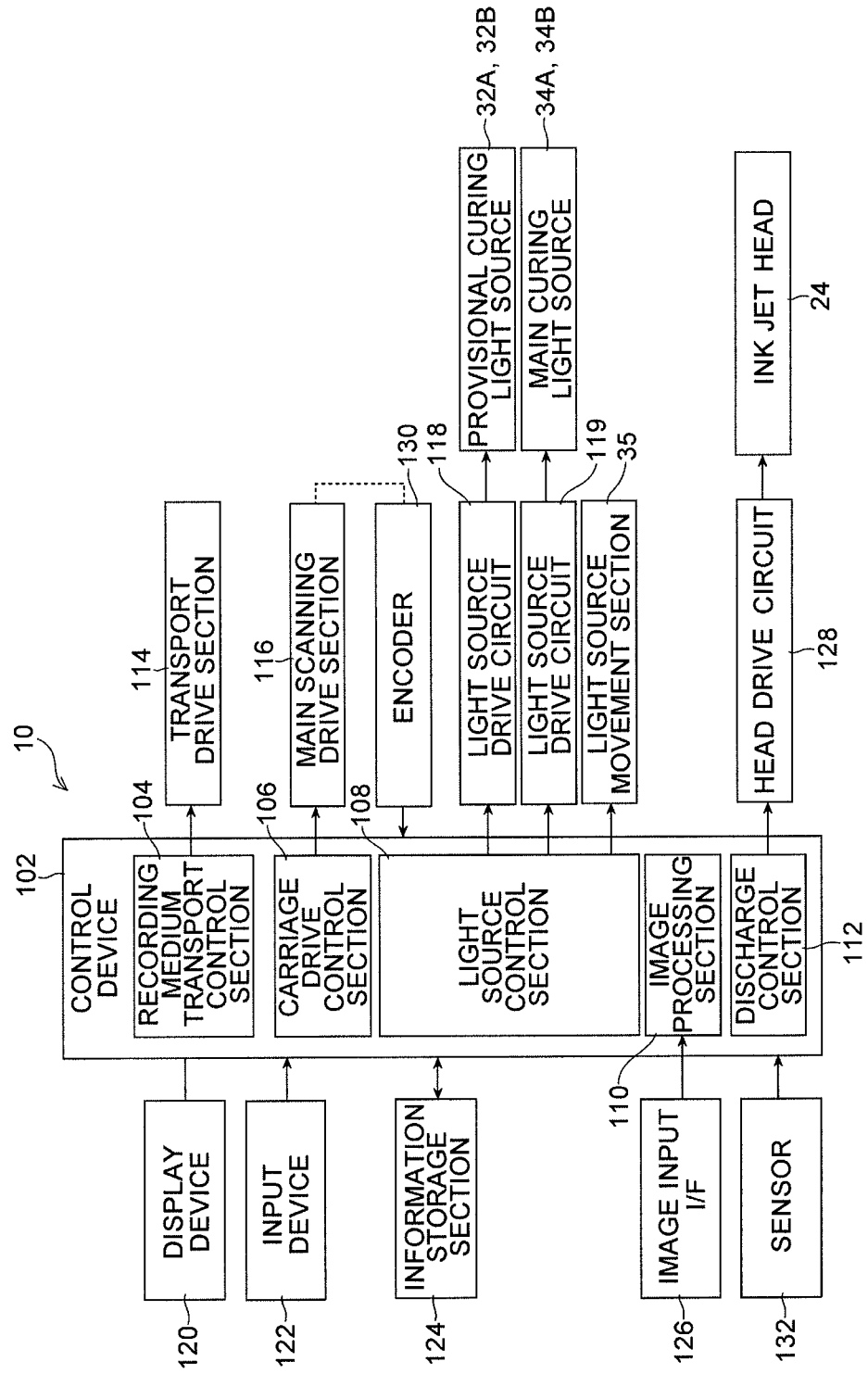
FIG. 11: A block diagram showing the configuration of the ink jet recording equipment.

FIG. 11 is a block diagram showing the configuration of the ink jet recording equipment 10. As shown in the figure, the ink jet recording equipment 10 is provided with a control device 102 as control means. As the control device 102, for example, a computer, etc. equipped with a central processing unit (CPU) may be used. The control device 102 functions as a control device for controlling the entire ink jet recording equipment 10 in accordance with a predetermined program and also functions as a processing device for carrying out various types of processing. The control device 102 includes a recording medium transport control section 104, a carriage drive control section 106, a light source control section 108, an image processing section 110, and a discharge control section 112. Each of these sections is realized by a hardware circuit or by software, or a combination thereof.

The recording medium transport control section 104 controls a transport drive section 114 for carrying out transport of the recording medium 12 (see FIG. 2). The transport drive section 114 includes a drive motor for driving the nip rollers 40 shown in FIG. 3 and a drive circuit therefor. The recording medium 12 transported onto the platen 26 (see FIG. 2) is fed intermittently in the sub scanning direction at swath width units according to reciprocating scanning (printing pass movement) in the main scanning direction by the ink jet head 24.

The carriage drive control section 106 shown in FIG. 11 controls a main scanning drive section 116 for moving the carriage 30 (see FIG. 2) in the main scanning direction. The main scanning drive section 116 includes a drive motor linked to a movement mechanism of the carriage 30 and a control circuit therefor. The light source control section 108 is control means for controlling the emission of light from the provisional curing light sources 32A and 32B via a light source drive circuit 118 and for controlling the emission of light from the main curing light sources 34A and 34B via a light source drive circuit 119. As the provisional curing light sources 32A and 32B and the main curing light sources 34A and 34B, UV-LED devices or UV lamps such as metal halide lamps are used.

Connected to the control device 102 are an input device 120 such as an operation panel, and a display device 122. The input device 120 is means for manually inputting an external operation signal into the control device 102, and can employ various forms such as a keyboard, a mouse, a touch panel, and an operation button. As the display device 122, various forms such as a liquid crystal display, an organic EL display, and a CRT may be used. An operator can carry out selection of the drawing mode, input of print conditions, input and editing of auxiliary information, etc. by operating the input device 120 and can check various types of information such as input content and search results by display on the display device 122.

Furthermore, the ink jet recording equipment 10 is provided with an information storage section 124 for storing various types of information and an image input interface 126 for retrieving image data for printing. As the image input interface, a serial interface may be used or a parallel interface may be used. This section may be equipped with a buffer memory (not illustrated) in order to increase the communication speed.

Image data that have been inputted via the image input interface 126 are converted into data for printing (dot data) in the image processing section 110. The dot data are usually formed by subjecting continuous tone image data to color conversion processing and halftone processing. The color conversion processing is processing for converting image data expressed as sRGB, etc. (for example, image data with 8 bits for each color of RGB) into color data of each color ink used in the ink jet recording equipment 10.

The halftone processing is processing for converting the color data of each color formed by the color conversion processing into dot data of each color by processing using an error diffusion method, a threshold matrix, etc. As means for the halftone processing, various types of known means such as an error diffusion method, a dither method, a threshold matrix method, and a density pattern method may be used. The halftone processing usually converts gray-scale image data having a grayscale value of at least 3 into grayscale image data having a grayscale value that is less than the original grayscale value. In the most simple example, the conversion is into dot image data of two values (dot on or off), but in halftone processing it is also possible to carry out multi value quantization corresponding to the type of dot size (e.g. three types, that is, large dot, intermediate dot, and small dot, etc.).

The 2 value or multi value image data (dot data) thus obtained are used as ink discharge data (fired droplet control data) for controlling the drive (ON)/non-drive (OFF) of each nozzle and furthermore the amount of liquid droplet (dot size) in the multi value case.

The discharge control section 112 generates a discharge control signal for a head drive circuit 128 based on the dot data generated in the image processing section 110. Furthermore, the discharge control section 112 comprises a drive waveform generation section, which is not illustrated. The drive waveform generation section is means for generating a drive voltage signal for driving a discharge energy-generating device (a piezo device in this example) corresponding to each nozzle of the ink jet head 24. Waveform data of the drive voltage signal are stored in advance in the information storage section 124, and the waveform data to be used are outputted as necessary. A signal (drive waveform) outputted from the drive waveform generation section is supplied to the head drive circuit 128. The signal outputted from the drive waveform generation section can be digital waveform data or an analogue voltage signal.

By applying a common drive voltage signal to each discharge energy-generating device of the ink jet head 24 via the head drive circuit 128 and on-off switching of a switch device (not illustrated) connected to an individual electrode of each energy-generating device according to the discharge timing of each nozzle, the ink is discharged from the corresponding nozzle.

The information storage section 124 stores a program that is executed by the CPU of the control device 102, and various types of data necessary for control, etc. The information storage section 124 stores set information regarding resolution and the number of passes (the number of repetitions of scanning) according to the drawing mode, information regarding control of the provisional curing light sources 32A and 32B and the main curing light sources 34A and 34B, etc.

An encoder 130 is mounted on the drive motor of the main scanning drive section 116 and the drive motor of the transport drive section 114, and outputs a pulse signal according to the amount of rotation and the rotational speed of the drive motor, and this pulse signal is fed to the control device 102. The position of the carriage 30 and the position of the recording medium 12 are known based on the pulse signal outputted from the encoder 130.

A sensor 132 is mounted on the carriage 30, and the width of the recording medium 12 is known based on a sensor signal from the sensor 132.

The control device 102 controls movement of the light source movement part 35 of the main curing light sources 34A and 34B. For example, when information regarding selection of the image formation process or information regarding the position of the main curing light sources 34A and 34B are inputted from the input device 120, the main curing light source 34A (34B) is moved to a position corresponding to the image formation process.

In accordance with the ink jet recording equipment and the image formation method that have the above-mentioned configuration, since the pinning exposure region can be divided and controlled so as to correspond to the divided regions of the nozzle array, appropriate curing processing can be realized for each ink layer. It is thereby possible to avoid the occurrence of the banding phenomenon in the white ink layer. That is, by switching off the pinning exposure for the ink discharge region of the white ink or reducing the amount of light, spreading of the white ink droplets can be promoted, thus achieving planarization and uniformization of the layer. This enables a situation in which periodic stripes are visible for each swath (occurrence of banding) to be avoided.

Furthermore, in accordance with the present embodiment, since an ink (color ink) that has good UV transmission characteristics and has a high sensitivity toward UV and a high curing speed is irradiated with a small amount of UV from the provisional curing light sources 32A and 32B immediately after being discharged to thus turn it into a preliminarily cured state, one of the main curing light sources 34A and 34B is moved to the discharge position for an ink (white ink) that has poor UV transmission characteristics (low sensitivity toward UV) and a slow curing speed, and the ink having a low sensitivity toward UV and a low curing speed is cured by irradiating it with a large amount of UV from the main curing light source 34A (34B) immediately after being discharged, the amount of UV (irradiation energy quantity) is optimized according to the ink used for drawing an image, and image formation by superimposing two or more types of inks having different sensitivities as layers becomes possible.

Specifically, the color ink is irradiated with a small amount of UV from the provisional curing light sources 32A and 32B immediately after a droplet is fired (landed on the recording medium) and turned into a preliminarily cured state, and after a dot spreading time has elapsed and the pile height is made uniform, it is irradiated with a large amount of UV from the main curing light source 34B (34A) and turned into a main cured state. It therefore becomes possible to increase the dot gain by taking a dot spreading time between the preliminary curing and the main curing and, furthermore, since time is taken for making the pile height uniform, the graininess of the image improves.

Moreover, since at least one of the main curing light sources 34A and 34B is configured so that it can move in parallel to the recording medium transport direction and can be selectively placed at a discharge position for an ink that has a low sensitivity toward UV and a low curing speed and, moreover, the area irradiated by the main curing light sources 34A and 34B is determined so as to correspond to the discharge area (overall length of nozzle array Lw/number N of image formation layers (number of divisions)) for the ink that has a low sensitivity toward UV and a low curing speed, only the ink that has a low sensitivity toward UV and a low curing speed is selectively irradiated with a large amount of UV, and problems due to difference in curing time between inks can be avoided.

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium is preferable, among them, a plastic film and paper are more preferable, and paper is yet more preferable.

In the present invention, the minimum droplet volume of the nozzle for discharging a colored ink composition is preferably at least 5 pL but less than 20 pL, and the minimum droplet volume of the nozzle for discharging a white ink composition is preferably at least 20 pL but no greater than 60 pL.

As described above, the white ink composition forms a base layer or an overcoat layer and is not required to have a high resolution. On the other hand, the colored ink composition forms a color image and is required to have a high resolution. High productivity is obtained by increasing the minimum droplet volume of the nozzle for discharging the white ink composition compared with the minimum droplet volume of the nozzle for discharging the colored ink composition.

The minimum droplet volume of the nozzle for discharging the colored ink composition is more preferably 6 to 18 pL, and yet more preferably 6 to 15 pL. Furthermore, the minimum droplet volume of the nozzle for discharging the white ink composition is more preferably 20 to 50 pL, and yet more preferably 20 to 45 pL.

In the present invention, since it is preferable for the ink composition discharged to have a fixed temperature, image formation equipment in which a section from the ink composition supply tank to the ink jet head may be thermally insulated and heated is preferably used.

The method for controlling temperature is not particularly limited; for example, it is preferable to carry out control of heating according to the flow rate of the ink composition and the temperature of the environment by providing a plurality of temperature sensors in respective piping sections. A temperature sensor may be provided in the ink composition supply tank and in the vicinity of the nozzle of the ink jet head. Furthermore, it is preferable that the head unit that is to be heated is thermally isolated or insulated so that the main body is not affected by the temperature of the external atmosphere. In order to shorten the printer start up time that is required for heating or in order to reduce the loss of thermal energy, it is preferable to carry out thermal insulation from other portions and decrease the overall thermal capacity of the heating unit.

Since a radiation curing type ink composition such as the ink composition of the present invention generally has higher viscosity than an aqueous ink composition that is usually used as an ink composition for ink jet recording, there is a large variation in viscosity due to change in temperature at the time of discharge. The variation in viscosity of the ink composition greatly affects change in liquid droplet size and speed of liquid droplet discharge, consequently causing degradation in image quality. It is therefore preferable to maintain a constant temperature for the ink composition at the time of discharge. The control range for the temperature of the ink composition is therefore preferably ±5° C. of a set temperature, more preferably ±2° C. of the set temperature, and yet more preferably ±1° C. of the set temperature.

The ink composition of the present invention is exposed to UV as described above for preferably 0.01 to 2 sec., more preferably 0.1 to 1.5 sec., and yet more preferably 0.3 to 1 sec.

Irradiation with actinic radiation is carried out when a certain time (preferably 0.01 to 0.5 sec., more preferably 0.01 to 0.3 sec., and yet more preferably 0.01 to 0.15 sec.) has elapsed after the ink composition has landed. In this way, by controlling the time taken from landing of the ink composition until irradiation so that it is very short, it becomes possible to prevent the ink composition that has landed on the recording medium from spreading before being cured. Moreover, since the ink composition can be exposed before it penetrates into a deep part in a porous recording medium where a light source cannot reach, it is possible to suppress residual unreacted monomer, which is preferable.

In accordance with the present invention, there can be provided an ink set for forming multiple layers that can form an image having excellent substrate—ink and ink—ink adhesion when forming multiple layers and excellent image quality and surface gloss, an ink jet recording method employing the ink set and having high productivity, and a printed material recorded by the ink jet recording method.

Example

The present invention is explained below more specifically by reference to Examples and Comparative Examples. However, the present invention should not be construed as being limited by these Examples. 'Parts' in the description below means 'parts by weight' and '%' means 'wt %' unless otherwise specified.

Preparation of Yellow Mill Base

| | |
|---|---|
| Yellow pigment: NOVOPERM YELLOW H2G (Clariant) | 30 parts by weight |
| SR9003 (propoxylated (2) neopentyl glycol diacrylate (compound obtained by diacrylating 2 mole propylene oxide adduct of neopentyl glycol), SARTOMER) | 30 parts by weight |
| BYK168 (dispersant, BYK Chemie) | 40 parts by weight |

The above components were stirred to give a yellow mill base. Preparation of a pigment mill base was carried out by placing them in an M50 disperser motor mill (Eiger Machinery, Inc.) and dispersing using zirconia beads having a diameter of 0.65 mm at a peripheral speed of 9 m/s for 8 hours.

Preparation of Magenta Mill Base

| | |
|---|---|
| Magenta pigment: CINQUASIA MAGENTA RT-355D (Ciba Specialty Chemicals) | 30 parts by weight |
| SR9003 | 30 parts by weight |
| BYK168 | 40 parts by weight |

The above components were stirred under the same dispersion conditions as for preparation of the yellow mill base, thus giving a magenta mill base.

Preparation of Cyan Mill Base

| | |
|---|---|
| Cyan pigment: IRGALITE BLUE GLVO (Ciba Specialty Chemicals) | 30 parts by weight |
| SR9003 | 30 parts by weight |
| BYK168 | 40 parts by weight |

The above components were stirred under the same dispersion conditions as for preparation of the yellow mill base, thus giving a cyan mill base.

Preparation of Black Mill Base

| | |
|---|---|
| Black pigment: SPECIAL BLACK 250 (Ciba Specialty Chemicals) | 30 parts by weight |
| SR9003 | 30 parts by weight |
| BYK168 | 40 parts by weight |

The above components were stirred under the same dispersion conditions as for preparation of the yellow mill base, thus giving a black mill base.

Preparation of White Mill Base

| | |
|---|---|
| White pigment: alumina-treated titanium oxide (KRONOS) | 60 parts by weight |
| SR9003 | 36 parts by weight |
| Solsperse 36000 (Avecia) | 4 parts by weight |

The above components were stirred under the same dispersion conditions as for preparation of the yellow mill base, thus giving a white mill base.

Examples and Comparative Examples

Method for Preparing Ink Composition

Each of the ink compositions was obtained by mixing and stirring the materials described in Table 2 and Table 3. The numerical values in the tables denote the amount (parts by weight) of each of the components added.

TABLE 2

| | | Example Ink set 1 | | | | |
|---|---|---|---|---|---|---|
| | | Y | M | C | K | W |
| Mill base | Yellow mill base | 8.0 | — | — | — | — |
| | Magenta mill base | — | 13.0 | — | — | — |
| | Cyan mill base | — | — | 8.0 | — | — |
| | Black mill base | — | — | — | 8.0 | — |
| | White mill base | — | — | — | — | 20.0 |

TABLE 2-continued

| | | | | | | |
|---|---|---|---|---|---|---|
| Monomer | NVC | 13.0 | 13.0 | 13.0 | 13.0 | 10.0 |
| | NVF | 10.0 | 10.0 | 10.0 | 10.0 | 5.0 |
| | SR531 | 32.0 | 32.0 | 32.0 | 31.5 | 19.0 |
| | PEA | 13.0 | 10.0 | 14.0 | 12.0 | 10.0 |
| | FA-512 | 5.0 | 5.0 | 5.0 | 5.5 | 9.0 |
| | SR351S | 5.0 | 5.0 | 5.0 | 5.0 | 5.0 |
| | HDDA | 3.0 | 3.0 | 3.0 | 3.0 | 3.0 |
| Oligomer | CN964A85 | — | — | — | — | — |
| | CN962 | 3.0 | 3.0 | 3.0 | 3.0 | 3.0 |
| Initiator | Irg369 | 2.0 | 1.5 | 2.0 | 2.0 | — |
| | Irg819 | 2.0 | 1.5 | 2.0 | 3.0 | — |
| | TPO | — | — | — | — | 15.0 |
| | ITX | 3.0 | 2.0 | 2.0 | 3.0 | — |
| Additive | ST-1 | 1.0 | 1.0 | 1.0 | 1.0 | 1.0 |
| | Total | 100 | 100 | 100 | 100 | 100 |
| | Surface tension [mN/m] | 38 | 37 | 38 | 38 | 38 |
| | Monofunctional monomer total | 72.3 | 69.3 | 73.3 | 71.3 | 53.0 |
| | Initiator total | 7.0 | 5.0 | 6.0 | 8.0 | 15.0 |
| | Ratio to amount of white ink initiator | 0.47 | 0.33 | 0.53 | 0.53 | — |

| | | Example Ink set 2 | | | | | | |
|---|---|---|---|---|---|---|---|---|
| | | Y | M | C | K | Lm | Lc | W |
| Mill base | Yellow mill base | 8.0 | — | — | — | — | — | — |
| | Magenta mill base | — | 13.0 | — | — | 4.0 | — | — |
| | Cyan mill base | — | — | 8.0 | — | — | 2.0 | — |
| | Black mill base | — | — | — | 8.0 | — | — | — |
| | White mill base | — | — | — | — | — | — | 20.0 |
| Monomer | NVC | 23.0 | 23.0 | 23.0 | 23.0 | 23.0 | 23.0 | 15.0 |
| | NVF | — | — | — | — | — | — | — |
| | SR531 | 30.0 | 30.0 | 30.0 | 30.0 | 33.7 | 33.7 | 15.0 |
| | PEA | 9.0 | 4.0 | 9.0 | 8.5 | 13.5 | 13.5 | 21.0 |
| | FA-512 | 7.0 | 7.0 | 7.0 | 7.0 | 5.0 | 5.0 | 5.0 |
| | SR351S | 5.0 | 5.0 | 5.0 | 5.0 | 7.0 | 7.0 | 5.0 |
| | HDDA | 3.0 | 3.0 | 3.0 | 3.0 | 5.0 | 5.0 | 3.0 |
| Oligomer | CN964A85 | 3.0 | 3.0 | 3.0 | 3.0 | 3.0 | 5.0 | 3.0 |
| | CN962 | — | — | — | — | — | — | — |
| Initiator | Irg369 | — | — | — | — | — | — | — |
| | Irg819 | 6.0 | 6.0 | 6.0 | 6.5 | 3.0 | 3.0 | — |
| | TPO | 2.0 | 2.0 | 2.0 | 2.0 | 1.0 | 1.0 | 12.0 |
| | ITX | 3.0 | 3.0 | 3.0 | 3.0 | 0.8 | 0.8 | — |
| Additive | ST-1 | 1.0 | 1.0 | 1.0 | 1.0 | 1.0 | 1.0 | 1.0 |
| | Total | 100 | 100 | 100 | 100 | 100 | 100 | 100 |
| | Surface tension [mN/m] | 38 | 36 | 37 | 37 | 37 | 37 | 38 |
| | Monofunctional monomer total | 68.4 | 63.4 | 68.4 | 67.9 | 74.4 | 74.4 | 56.2 |
| | Initiator total | 11.0 | 11.0 | 11.0 | 11.5 | 4.8 | 4.8 | 12.0 |
| | Ratio to amount of white ink initiator | 0.92 | 0.92 | 0.92 | 0.96 | 0.40 | 0.40 | — |

| | | Example Ink set 3 | | | | | | |
|---|---|---|---|---|---|---|---|---|
| | | Y | M | C | K | Lm | Lc | W |
| Mill base | Yellow mill base | 8.0 | — | — | — | — | — | — |
| | Magenta mill base | — | 13.0 | — | — | 4.0 | — | — |
| | Cyan mill base | — | — | 8.0 | — | — | 2.0 | — |
| | Black mill base | — | — | — | 8.0 | — | — | — |
| | White mill base | — | — | — | — | — | — | 20.0 |
| Monomer | NVC | 23.0 | 23.0 | 23.0 | 23.0 | 23.0 | 23.0 | 15.0 |
| | NVF | — | — | — | — | — | — | — |
| | SR531 | 40.0 | 40.0 | 40.0 | 40.0 | 45.0 | 45.0 | 35.5 |
| | PEA | — | — | — | — | — | — | — |
| | FA-512 | 8.0 | 5.0 | 9.0 | 7.0 | 6.2 | 6.2 | 5.0 |
| | SR351S | 5.0 | 5.0 | 5.0 | 5.0 | 7.0 | 7.0 | 5.0 |
| | HDDA | 3.0 | 3.0 | 3.0 | 3.0 | 5.0 | 5.0 | 3.0 |
| Oligomer | CN964A85 | 3.0 | 3.0 | 3.0 | 3.0 | 3.0 | 5.0 | 3.0 |
| | CN962 | — | — | — | — | — | — | — |
| Initiator | Irg369 | — | — | — | — | — | — | — |
| | Irg819 | 4.0 | 3.0 | 4.0 | 5.0 | 3.0 | 3.0 | — |
| | TPO | 2.0 | 2.0 | 2.0 | 2.0 | 2.0 | 2.0 | 12.5 |
| | ITX | 3.0 | 2.0 | 2.0 | 3.0 | 0.8 | 0.8 | — |
| Additive | ST-1 | 1.0 | 1.0 | 1.0 | 1.0 | 1.0 | 1.0 | 1.0 |
| | Total | 100 | 100 | 100 | 100 | 100 | 100 | 100 |
| | Surface tension [mN/m] | 36 | 35 | 35 | 36 | 36 | 36 | 36 |
| | Monofunctional monomer total | 69.9 | 66.9 | 70.9 | 68.9 | 72.9 | 72.9 | 54.6 |
| | Initiator total | 9.0 | 7.0 | 8.0 | 10.0 | 5.8 | 5.8 | 12.5 |
| | Ratio to amount of white ink initiator | 0.72 | 0.56 | 0.64 | 0.80 | 0.46 | 0.46 | — |

TABLE 2-continued

|  |  | Example Ink set 4 | | | | | | |
| --- | --- | --- | --- | --- | --- | --- | --- | --- |
|  |  | Y | M | C | K | Lm | Lc | W |
| Mill base | Yellow mill base | 8.0 | — | — | — | — | — | — |
|  | Magenta mill base | — | 13.0 | — | — | 4.0 | — | — |
|  | Cyan mill base | — | — | 8.0 | — | — | 2.0 | — |
|  | Black mill base | — | — | — | 8.0 | — | — | — |
|  | White mill base | — | — | — | — | — | — | 20.0 |
| Monomer | NVC | 23.0 | 23.0 | 23.0 | 23.0 | 23.0 | 23.0 | 15.0 |
|  | NVF | — | — | — | — | — | — | — |
|  | SR531 | 45.0 | 42.5 | 43.5 | 45.0 | 49.8 | 49.8 | 36.0 |
|  | PEA | — | — | — | — | — | — | — |
|  | FA-512 | — | — | — | — | — | — | — |
|  | SR351S | 3.0 | 3.0 | 3.0 | 3.0 | 5.0 | 5.0 | 3.0 |
|  | HDDA | 8.0 | 5.0 | 9.0 | 7.0 | 8.2 | 8.2 | 10.0 |
| Oligomer | CN964A85 | 3.0 | 3.0 | 3.0 | 3.0 | 3.0 | 5.0 | 3.0 |
|  | CN962 | — | — | — | — | — | — | — |
| Initiator | Irg369 | — | — | — | — | — | — | — |
|  | Irg819 | 4.0 | 4.0 | 4.0 | 5.0 | 3.0 | 3.0 | — |
|  | TPO | 2.0 | 3.0 | 3.0 | 2.0 | 2.0 | 2.0 | 12.0 |
|  | ITX | 3.0 | 2.5 | 2.5 | 3.0 | 1.0 | 1.0 | — |
| Additive | ST-1 | 1.0 | 1.0 | 1.0 | 1.0 | 1.0 | 1.0 | 1.0 |
|  | Total | 100 | 100 | 100 | 100 | 100 | 100 | 100 |
|  | Surface tension [mN/m] | 37 | 36 | 36 | 36 | 36 | 36 | 36 |
|  | Monofunctional monomer total | 66.7 | 64.3 | 65.2 | 66.7 | 71.2 | 71.2 | 50.1 |
|  | Initiator total | 9.0 | 9.5 | 9.5 | 10.0 | 6.0 | 6.0 | 12.0 |
|  | Ratio to amount of white ink initiator | 0.75 | 0.79 | 0.79 | 0.83 | 0.50 | 0.50 | — |

TABLE 3

|  |  | Comparative Example | | | | | | | | | |
| --- | --- | --- | --- | --- | --- | --- | --- | --- | --- | --- | --- |
|  |  | Ink set 1 | | | | | Ink set 2 | | | | |
|  |  | Y | M | C | K | W | Y | M | C | K | W |
| Mill base | Yellow mill base | 8.0 | — | — | — | — | 8.0 | — | — | — | — |
|  | Magenta mill base | — | 13.0 | — | — | — | — | 13.0 | — | — | — |
|  | Cyan mill base | — | — | 8.0 | — | — | — | — | 8.0 | — | — |
|  | Black mill base | — | — | — | 8.0 | — | — | — | — | 8.0 | — |
|  | White mill base | — | — | — | — | 20.0 | — | — | — | — | 20.0 |
| Monomer | NVC | — | — | — | — | — | 23.0 | 23.0 | 23.0 | 23.0 | 15.0 |
|  | NVF | — | — | — | — | — | — | — | — | — | — |
|  | SR531 | 30.0 | 30.0 | 30.0 | 30.0 | 19.0 | — | — | — | — | — |
|  | PEA | 36.0 | 33.0 | 37.0 | 35.0 | 30.0 | 48.0 | 45.0 | 49.0 | 47.0 | 38.0 |
|  | FA-512 | 5.0 | 5.0 | 5.0 | 5.5 | 9.0 | 7.0 | 7.0 | 7.0 | 7.0 | 5.0 |
|  | SR351S | 5.0 | 5.0 | 5.0 | 5.0 | 5.0 | — | — | — | — | — |
|  | HDDA | 3.0 | 3.0 | 3.0 | 3.0 | 3.0 | 3.0 | 3.0 | 3.0 | 3.0 | 3.0 |
|  | SR833 | — | — | — | — | — | — | — | — | — | — |
| Oligomer | CN964A85 | — | — | — | — | — | 3.0 | 3.0 | 3.0 | 3.0 | 3.0 |
|  | CN962 | 3.0 | 3.0 | 3.0 | 3.0 | 3.0 | — | — | — | — | — |
| Initiator | Irg369 | 2.0 | 2.0 | 2.0 | 1.5 | — | — | — | — | — | — |
|  | Irg819 | 4.0 | 3.0 | 4.0 | 5.0 | — | 4.0 | 3.0 | 4.0 | 5.0 | — |
|  | TPO | — | — | — | — | 10.0 | — | — | — | — | 15.0 |
|  | ITX | 3.0 | 2.0 | 2.0 | 3.0 | — | 3.0 | 2.0 | 2.0 | 3.0 | — |
| Additive | ST-1 | 1.0 | 1.0 | 1.0 | 1.0 | 1.0 | 1.0 | 1.0 | 1.0 | 1.0 | 1.0 |
|  | Total | 100 | 100 | 100 | 100 | 100 | 100 | 100 | 100 | 100 | 100 |
|  | Surface tension [mN/m] | 35 | 34 | 35 | 35 | 35 | 38 | 37 | 37 | 37 | 37 |
|  | Monofunctional monomer total | 70.4 | 67.4 | 71.4 | 69.9 | 58.0 | 78.9 | 75.9 | 79.9 | 77.9 | 58.9 |
|  | Initiator total | 9.0 | 7.0 | 8.0 | 9.5 | 10.0 | 7.0 | 5.0 | 6.0 | 8.0 | 15.0 |
|  | Ratio to amount of white ink initiator | 0.90 | 0.70 | 0.95 | 0.95 | — | 0.47 | 0.33 | 0.40 | 0.53 | — |

|  |  | Comparative Example | | | | | | | | | |
| --- | --- | --- | --- | --- | --- | --- | --- | --- | --- | --- | --- |
|  |  | Ink set 3 | | | | | Ink set 4 | | | | |
|  |  | Y | M | C | K | W | Y | M | C | K | W |
| Mill base | Yellow mill base | 8.0 | — | — | — | — | 8.0 | — | — | — | — |
|  | Magenta mill base | — | 13.0 | — | — | — | — | 13.0 | — | — | — |
|  | Cyan mill base | — | — | 8.0 | — | — | — | — | 8.0 | — | — |
|  | Black mill base | — | — | — | 8.0 | — | — | — | — | 8.0 | — |
|  | White mill base | — | — | — | — | 20.0 | — | — | — | — | 20.0 |

TABLE 3-continued

| Monomer | NVC | 13.0 | 13.0 | 13.0 | 13.0 | 10.0 | 23.0 | 23.0 | 23.0 | 23.0 | 15.0 |
|---|---|---|---|---|---|---|---|---|---|---|---|
| | NVF | 10.0 | 10.0 | 10.0 | 10.0 | 5.0 | — | — | — | — | — |
| | SR531 | 28.0 | 27.0 | 28.0 | 28.0 | 19.0 | 30.0 | 30.0 | 30.0 | 30.0 | 8.2 |
| | PEA | 13.0 | 10.0 | 14.0 | 12.0 | 15.5 | 17.0 | 13.0 | 18.0 | 17.5 | 18.0 |
| | FA-512 | 5.0 | 5.0 | 5.0 | 5.5 | 9.0 | 7.0 | 7.0 | 7.0 | 7.0 | 5.0 |
| | SR351S | 5.0 | 5.0 | 5.0 | 5.0 | 5.0 | 5.0 | 5.0 | 5.0 | 5.0 | 5.0 |
| | HDDA | 3.0 | 3.0 | 3.0 | 3.0 | 3.0 | 3.0 | 3.0 | 3.0 | 3.0 | 3.0 |
| | SR833 | — | — | — | — | — | — | — | — | — | — |
| Oligomer | CN964A85 | — | — | — | — | — | 3.0 | 3.0 | 3.0 | 3.0 | 3.0 |
| | CN962 | 3.0 | 3.0 | 3.0 | 3.0 | 3.0 | — | — | — | — | — |
| Initiator | Irg369 | 2.0 | 2.0 | 2.0 | 1.5 | — | — | — | — | — | — |
| | Irg819 | 4.0 | 4.0 | 4.0 | 5.0 | — | 1.0 | 1.0 | 1.0 | 1.0 | 1.0 |
| | TPO | — | — | — | — | 9.5 | — | — | — | — | 20.0 |
| | ITX | 5.0 | 4.0 | 4.0 | 5.0 | — | 2.0 | 1.0 | 1.0 | 1.5 | 0.8 |
| Additive | ST-1 | 1.0 | 1.0 | 1.0 | 1.0 | 1.0 | 1.0 | 1.0 | 1.0 | 1.0 | 1.0 |
| | Total | 100 | 100 | 100 | 100 | 100 | 100 | 100 | 100 | 100 | 100 |
| | Surface tension [mN/m] | 38 | 38 | 38 | 38 | 37 | 36 | 36 | 36 | 37 | 36 |
| | Monofunctional monomer total | 68.5 | 64.6 | 69.5 | 68.0 | 58.5 | 76.4 | 72.4 | 77.4 | 76.9 | 46.7 |
| | Initiator total | 11.0 | 10.0 | 10.0 | 11.5 | 9.5 | 3.0 | 2.0 | 2.0 | 2.5 | 21.8 |
| | Ratio to amount of white ink initiator | 1.16 | 1.05 | 1.05 | 1.21 | — | 0.14 | 0.09 | 0.09 | 0.11 | — |

The components described in Table 2 and Table 3 above were as follows.
NVC: N-vinylcaprolactam (V-CAP, ISP)
NVF: N-vinylformamide (Tokyo Chemical Industry Co., Ltd.)
SR531: mixture of 95 wt % of cyclic trimethylolpropane formal acrylate and 5 wt % of trimethylolpropane triacrylate (SR531, Sartomer)
PEA: phenoxyethyl acrylate (SR399S, Sartomer)
FA-512: dicyclopentanyloxyethyl acrylate (Hitachi Chemical Co., Ltd.)
SR351S: trimethylolpropane triacrylate (Sartomer)
HDDA: 1,6-hexanediol diacrylate (SR238F, Sartomer)
CN964A85: urethane acrylate oligomer (average number of functional groups 2, Sartomer Company Inc. Japan)
CN962: urethane acrylate oligomer (average number of functional groups 2, Sartomer Company Inc. Japan)
Irg369: 2-benzyl-2-dimethylamino-1-(4-morpholinophenyl)butan-1-one (IRGACURE 369, Ciba Japan)
Irg819: bis(2,4,6-trimethylbenzoyl)phenylphosphine oxide (IRGACURE 819, Ciba Japan)
TPO: 2,4,6-trimethylbenzoyldiphenylphosphine oxide (Darocur TPO, Ciba Japan)
ITX: isopropylthioxanthone (SPEEDCURE ITX, Lambson)
ST-1: mixture of 8 wt % of tris(N-nitroso-N-phenylhydroxyamine) aluminum salt and 92 wt % of phenoxyethyl acrylate (polymerization inhibitor, FIRSTCURE ST-1, Chem First)

<Ink Jet Recording Method>

Inkjet recording equipment having the configuration shown in FIG. 6 to FIG. 9 was used.

With regard to the ink compositions of each of yellow, magenta, cyan, black, light cyan, and light magenta colors, the ink jet head employed a Q-class Sapphire QS-256/10 piezo type ink jet head (FUJIFILM DIMATIX, number of nozzles 256, minimum droplet volume 10 pL, 50 kHz).

With regard to the white and clear ink compositions, the ink jet head employed a Q-class Sapphire QS-256/30 piezo type ink jet head (FUJIFILM DIMATIX, number of nozzles 256, minimum droplet volume 30 pL, 33 kHz).

As the preliminary light source (pinning light source), a light source having six light-emitting diodes (UV-LED, NC4U134, Nichia Corporation, wavelength 385 nm) arranged as shown in FIG. 8 was provided at each of the left and right sides (a total of 2) of the ink jet head, the illumination intensity per light source being 780 mW/cm$^2$.

As the main curing light source, a light source having ten light-emitting diodes (UV-LED, NC4U134, Nichia Corporation, wavelength 385 nm) was provided at each of the left and right sides (a total of 2), the illumination intensity per light source being 1,500 mW/cm$^2$.

The ink supply system comprised an ink pack, a supply pipe, a SEPAREL EF-G2 degassing filter (DIC), an ink supply tank immediately before an ink jet head, a degassing filter, and a piezo type ink jet head, the pressure being decreased to 0.5 atm. in the degassing filter sections.

An image was formed by multiple passes using equipment having the above-mentioned configuration.

When forming two layers, as shown in FIG. 6 or FIG. 9, one of the main curing light sources was moved to the side opposite to the head in the nozzle direction, the nozzles of the color and white heads were divided into two, and image formation was carried out. When the base was a color image layer, as shown in FIG. 6, the nozzles of the head for the color ink composition were of the half on the upstream side in the paper feed direction, and the nozzles of the head for the white ink composition were of the half on the downstream side in the paper feed direction. When the base was white, as shown in FIG. 9, the nozzles of the head for the color ink composition were of the half on the downstream side in the paper feed direction, and the nozzles of the head for the white ink composition were of the half on the upstream side in the paper feed direction. All of the provisional curing light sources were switched on.

The images obtained were subjected to the evaluation below.

<Evaluation of Banding>

An image having a color layer with a film thickness of 12 μm and a white ink layer with a film thickness of 25 μm was formed on Viewful UV MT-188 (transparent PET, thickness 188 μm, Kimoto) by the above-mentioned print method. In this process, with regard to the color layer, a gray-scale image of 80%, 60%, 40%, and 20% relative to a 100% solid image was printed. Furthermore, the maximum illumination intensity on the substrate surface was 1,500 W/cm$^2$, and the exposure was 400 mJ/cm$^2$.

A printed material was examined by 10 evaluators from a distance of 50 cm, and the presence/absence of banding was evaluated. An evaluation of 3 or greater causes no practical problem.

5: all answered that no banding was observed.
4: 1 to 2 out of 10 answered that banding was observed.

3: 3 to 5 out of 10 answered that banding was observed.
2: 6 to 8 out of 10 answered that banding was observed.
1: 9 or more out of 10 answered that banding was observed.

<Evaluation of Adhesion>

As an adhesion evaluation method, a crosshatch test (JIS K 5600-5-6, 2004) was carried out. A solid image having a color layer with a film thickness of 12 μm and a white ink layer with a film thickness of 25 μm was formed on Viewful UV MT-188 (transparent PET, thickness 188 μm, Kimoto) by the above-mentioned ink jet image recording method. Subsequently, each printed material was subjected to the crosshatch test. Evaluation was carried out in accordance with JIS K5600-5-6 using the 6 levels of 0 to 5. Here, an evaluation of 0 means that the cut edge was completely smooth and there was no peel off in any grid, and evaluation was made using the criteria below.

When an evaluation of adhesion between ink and substrate was made, the grid was cut at a depth such that the cut reached the substrate, and when an evaluation of adhesion between ink and ink was made, the grid was cut at a depth such that the cut reached the interface between the upper layer and the lower layer. An evaluation of 3 or greater causes no practical problem.

5: JIS K5600-5-6 Class 0
4: JIS K5600-5-6 Class 1
3: JIS K5600-5-6 Class 2
2: JIS K5600-5-6 Class 3
1: JIS K5600-5-6 Classes 4 and 5

<Evaluation of Curability>

A 100% solid image having a color layer with a film thickness of 12 μm and a white ink layer with a film thickness of 25 μm was printed on a polyvinyl chloride sheet by the above-mentioned printing method. The maximum illumination intensity on the substrate surface was 1,500 W/cm$^2$, and the exposure was 400 mJ/cm$^2$.

—Evaluation of Curing Sensitivity—

Curing sensitivity was defined by color transfer and tackiness of the surface after printing. The presence/absence of tackiness of the surface after printing was evaluated by touch, and color transfer was evaluated by pressing on plain paper (C2 copier paper, Fuji Xerox Co., Ltd.) immediately after printing. The less the color transfer and the tackiness, the higher the evaluation of sensitivity, and evaluation was made using the criteria below.

5: no color transfer and no tackiness
4: no color transfer and almost no tackiness
3: no color transfer and slight tackiness
2: slight color transfer and slight tackiness
1: color transfer and tackiness <Evaluation of Surface Gloss>

As a recording medium, Tokubishi Art Paper (paper weight 104 g/m$^2$) manufactured by Mitsubishi Paper Mills Ltd. was used An image obtained was subjected to measurement in accordance with JIS Z8741 using a surface gloss meter manufactured by Sheen Instruments at a measurement angle of 60°.

5: surface gloss of at least 25
4: surface gloss of at least 20 but less than 25
3: surface gloss of at least 15 but less than 20
2: surface gloss of at least 10 but less than 15
1: surface gloss of less than 10

An evaluation of 3 or greater was acceptable in practice.

In the Tables below, 3C means 3 color gray (gray formed from yellow, magenta, and cyan), and 4C means 4 color gray (gray formed from yellow, magenta, cyan, and black). Furthermore, M denotes an image with a magenta color, and when the ink set had an ink composition with a light magenta color, the image was formed with the magenta and light magenta ink compositions. Similarly, C means an image with a cyan color, and when the ink set had an ink composition with a light cyan color, the image was formed with the cyan and light cyan ink compositions.

In 'lower layer W', as shown in FIG. 1B, a white ink layer was formed on a recording medium, and an image layer was formed thereon. In 'upper layer W', as shown in FIG. 1A, an image layer was formed on a recording medium, and a white ink layer was formed thereon.

Furthermore, in the Tables below, 'W' means that only the white ink layer was formed without forming a color image layer, and curability, adhesion, banding properties, and surface gloss were evaluated.

In addition, in Comparative Examples 1 to 4, since results with Y, M, C, and K were not satisfactory, evaluation was not made for 3C and 4C.

The results are shown in the Tables below.

TABLE 4

| | | Example 1-1 Lower layer W Ink set 1 | | | | | | | Example 1--2 Upper layer W Ink set 1 | | | | | | |
|---|---|---|---|---|---|---|---|---|---|---|---|---|---|---|---|
| | | Y | M | C | K | 3C | 4C | W | Y | M | C | K | 3C | 4C | W |
| Evaluation results | Curability | 3 | 4 | 4 | 3 | 3 | 3 | 3 | 3 | 3 | 3 | 3 | 3 | 3 | 3 |
| | Ink - substrate adhesion | — | — | — | — | — | — | 3 | 3 | 4 | 4 | 3 | 3 | 3 | 3 |
| | Ink - ink adhesion | 3 | 3 | 3 | 3 | 3 | 3 | — | 3 | 3 | 3 | 3 | 3 | 3 | — |
| | Banding | 4 | 3 | 3 | 3 | 3 | 3 | 3 | 4 | 3 | 3 | 3 | 3 | 3 | 3 |
| | Surface gloss | 4 | 4 | 4 | 3 | 3 | 3 | — | — | — | — | — | — | — | — |
| | | Example 2-2 Lower layer W Ink set 2 | | | | | | | Example 2-2 Upper layer W Ink set 2 | | | | | | |
| | | Y | M | C | K | 3C | 4C | W | Y | M | C | K | 3C | 4C | W |
| Evaluation results | Curability | 4 | 5 | 4 | 3 | 4 | 3 | 3 | 4 | 3 | 3 | 3 | 3 | 3 | 3 |
| | Ink - substrate adhesion | — | — | — | — | — | — | 3 | 3 | 4 | 4 | 3 | 3 | 4 | 3 |
| | Ink - ink adhesion | 4 | 4 | 4 | 4 | 3 | 4 | — | 4 | 4 | 4 | 4 | 4 | 3 | — |

TABLE 4-continued

| | | | | | | | | | | | | | | |
|---|---|---|---|---|---|---|---|---|---|---|---|---|---|---|
| | Banding | 4 | 4 | 4 | 3 | 3 | 3 | 4 | 4 | 4 | 3 | 3 | 3 | 4 |
| | Surface gloss | 5 | 5 | 4 | 3 | 4 | 3 | — | — | — | — | — | — | — |

| | | Example 3-1 Lower layer W Ink set 3 | | | | | | Example 3-2 Upper layer W Ink set 3 | | | | | | |
|---|---|---|---|---|---|---|---|---|---|---|---|---|---|---|
| | | Y | M | C | K | 3C | 4C | W | Y | M | C | K | 3C | 4C | W |
| Evaluation results | Curability | 4 | 5 | 5 | 4 | 4 | 4 | 4 | 4 | 4 | 4 | 4 | 4 | 4 | 4 |
| | Ink - substrate adhesion | — | — | — | — | — | — | 4 | 4 | 5 | 5 | 4 | 3 | 4 | 4 |
| | Ink - ink adhesion | 4 | 4 | 5 | 4 | 4 | 4 | — | 4 | 4 | 4 | 4 | 4 | 3 | — |
| | Banding | 5 | 5 | 5 | 4 | 4 | 4 | 4 | 5 | 4 | 4 | 4 | 3 | 4 | 4 |
| | Surface gloss | 5 | 5 | 5 | 4 | 4 | 5 | — | — | — | — | — | — | — | — |

| | | Example 4-1 Lower layer W Ink set 4 | | | | | | Example 4-2 Upper layer W Ink set 4 | | | | | | |
|---|---|---|---|---|---|---|---|---|---|---|---|---|---|---|
| | | Y | M | C | K | 3C | 4C | W | Y | M | C | K | 3C | 4C | W |
| Evaluation results | Curability | 5 | 5 | 5 | 4 | 5 | 4 | 4 | 4 | 5 | 5 | 4 | 4 | 4 | 4 |
| | Ink - substrate adhesion | — | — | — | — | — | — | 4 | 4 | 5 | 4 | 5 | 4 | 4 | 4 |
| | Ink - ink adhesion | 4 | 5 | 5 | 4 | 5 | 4 | — | 4 | 5 | 5 | 4 | 4 | 4 | — |
| | Banding | 5 | 5 | 5 | 5 | 5 | 4 | 4 | 5 | 5 | 5 | 5 | 4 | 4 | 4 |
| | Surface gloss | 5 | 5 | 5 | 4 | 5 | 5 | — | — | — | — | — | — | — | — |

TABLE 5

| | | Comparative Example 1 | | | | |
|---|---|---|---|---|---|---|
| | Lower layer W | Y | M | C | K | W |
| Evaluation results | Curability | 2 | 3 | 3 | 2 | 2 |
| | Ink - substrate adhesion | — | — | — | — | 2 |
| | Ink - ink adhesion | 1 | 2 | 2 | 1 | — |
| | Banding | 4 | 2 | 2 | 1 | 3 |
| | Surface gloss | 3 | 3 | 3 | 2 | — |

| | | Comparative Example 2 | | | | |
|---|---|---|---|---|---|---|
| | Lower layer W | Y | M | C | K | W |
| Evaluation results | Curability | 3 | 3 | 3 | 3 | 2 |
| | Ink - substrate adhesion | — | — | — | — | 3 |
| | Ink - ink adhesion | 2 | 3 | 3 | 3 | — |
| | Banding | 3 | 2 | 2 | 2 | 3 |
| | Surface gloss | 2 | 2 | 2 | 1 | — |

| | | Comparative Example 3 | | | | |
|---|---|---|---|---|---|---|
| | Lower layer W | Y | M | C | K | W |
| Evaluation results | Curability | 5 | 4 | 5 | 4 | 2 |
| | Ink - substrate adhesion | — | — | — | — | 3 |
| | Ink - ink adhesion | 1 | 2 | 2 | 1 | — |
| | Banding | 3 | 3 | 2 | 2 | 3 |
| | Surface gloss | 1 | 1 | 1 | 2 | — |

TABLE 5-continued

| | | Comparative Example 4 | | | | |
|---|---|---|---|---|---|---|
| | Lower layer W | Y | M | C | K | W |
| Evaluation results | Curability | 1 | 1 | 1 | 2 | 5 |
| | Ink - substrate adhesion | — | — | — | — | 2 |
| | Ink - ink adhesion | 3 | 2 | 3 | 2 | — |
| | Banding | 3 | 3 | 2 | 2 | 4 |
| | Surface gloss | 2 | 4 | 4 | 2 | — |

As shown in Table 4, in accordance with selection of an optimum initiator ratio and radically polymerizable compound composition, a balance could be achieved between curability and adhesion. Furthermore, an image having excellent surface gloss and suppressed banding was obtained.

On the other hand, the ink sets of the Comparative Examples, which did not satisfy the above-mentioned requirements, could not exhibit all of the above-mentioned effects, as shown in Table 5.

<Image Formation Method>

The number of provisional light sources was changed from one each for left and right (total of 2) to two each for left and right (total of 4). The main curing light sources were not changed. The illumination intensity was adjusted by changing the value of the current.

TABLE 6

| Provisional curing light source 500 mW/cm² Main curing light source 1,000 mW/cm² | | Example 5-1 Lower layer W Ink set 3 | | | | | | | Example 5-2 Upper layer W Ink set 3 | | | | | | |
|---|---|---|---|---|---|---|---|---|---|---|---|---|---|---|---|
| | | Y | M | C | K | 3C | 4C | W | Y | M | C | K | 3C | 4C | W |
| Evaluation results | Curability | 4 | 5 | 5 | 4 | 4 | 4 | 4 | 4 | 4 | 4 | 4 | 4 | 4 | 4 |
| | Ink - substrate adhesion | — | — | — | — | — | — | 4 | 4 | 5 | 5 | 4 | 3 | 4 | 4 |
| | Ink - ink adhesion | 4 | 4 | 5 | 4 | 4 | 4 | — | 4 | 4 | 4 | 4 | 4 | 3 | — |
| | Banding | 5 | 5 | 5 | 4 | 4 | 4 | 4 | 5 | 4 | 4 | 4 | 3 | 4 | 4 |
| | Surface gloss | 5 | 5 | 5 | 4 | 4 | 5 | — | — | — | — | — | — | — | — |
| Provisional curing light source 750 mW/cm² | | Example 6-1 Lower layer W | | | | | | | Example 6-2 Upper layer W | | | | | | |

TABLE 6-continued

| Main curing light source 750 | | Ink set 3 | | | | | | Ink set 3 | | | | | | |
|---|---|---|---|---|---|---|---|---|---|---|---|---|---|---|
| | mW/cm² | Y | M | C | K | 3C | 4C | W | Y | M | C | K | 3C | 4C | W |
| Evaluation results | Curability | 5 | 5 | 5 | 4 | 4 | 4 | 4 | 5 | 5 | 5 | 5 | 5 | 5 | 4 |
| | Ink - substrate adhesion | — | — | — | — | — | — | 3 | 3 | 4 | 4 | 3 | 4 | 3 | 3 |
| | Ink - ink adhesion | 3 | 3 | 4 | 3 | 3 | 3 | — | 4 | 4 | 4 | 3 | 3 | 3 | — |
| | Banding | 4 | 3 | 3 | 3 | 3 | 3 | 3 | 4 | 3 | 4 | 3 | 3 | 3 | 3 |
| | Surface gloss | 3 | 4 | 3 | 3 | 3 | 3 | — | — | — | — | — | — | — | — |

| Provisional curing light source 1,000 mW/cm² Main curing light source 500 | | Example 7-1 Lower layer W Ink set 3 | | | | | | | Example 7-2 Upper layer W Ink set 3 | | | | | | |
|---|---|---|---|---|---|---|---|---|---|---|---|---|---|---|---|
| | mW/cm² | Y | M | C | K | 3C | 4C | W | Y | M | C | K | 3C | 4C | W |
| Evaluation results | Curability | 5 | 5 | 5 | 4 | 5 | 4 | 4 | 5 | 5 | 5 | 5 | 5 | 5 | 4 |
| | Ink - substrate adhesion | — | — | — | — | — | — | 3 | 3 | 4 | 3 | 3 | 3 | 3 | 3 |
| | Ink - ink adhesion | 3 | 3 | 3 | 3 | 3 | 3 | — | 3 | 4 | 3 | 3 | 3 | 3 | — |
| | Banding | 3 | 3 | 3 | 3 | 3 | 3 | 3 | 4 | 3 | 3 | 3 | 3 | 3 | 3 |
| | Surface gloss | 3 | 3 | 3 | 3 | 3 | 3 | — | — | — | — | — | — | — | — |

As shown in Table 6, it is surmised that by making the illumination intensity of the provisional curing light source lower than that of the main curing light source, a semi-cured state was maintained, affinity with the base was imparted, and better performance was thus obtained for two layer formation.

EXPLANATION OF REFERENCE NUMERALS AND SYMBOLS

10 ink jet recording equipment, 12 recording medium, 20 main body, 22 support legs, 24 ink jet head, 26 platen, 28 guide mechanism, 30 carriage, 32A, 32B provisional curing light source, 34A, 34B main curing light source, 35 movement mechanism (light source movement part), 35A shaft, 35B rack, 35C pinion gear, 35D drive motor, 35E detection piece, 35F position sensor, 36 ink cartridge, 38 mounting section, 40 nip roller, 42 supply-side roll, 44 wind-up roll, 46 guide, 50 temperature control section, 52 pre-temperature control section, 54 post-temperature control section, 61, 61C, 61M, 61Y, 61K, 61LC, 61LM, 61CL, 61W nozzle array, 61-1 upstream side region, 61-2 downstream side region, 70 supply pump, 72 subtank, 74 pressure-adjusting section, 76 valve, 77 pressurizing/decompressing pump, 78 pressure gauge, 80 white ink layer, 82 color image layer, 102 control device, 104 recording medium transport control section, 106 carriage drive control section, 108 light source control section, 110 image processing section, 112 discharge control section, 114 transport drive section, 116 main scanning drive section, 120 input device, 124 information storage section, 128 head drive circuit, 130 encoder, 132 sensor.

What is claimed is:

1. An ink set for forming multiple layers comprising:
   a colored ink composition comprising a yellow ink composition, a magenta ink composition, a cyan ink composition, and a black ink composition, and a white ink composition,
   each ink composition comprising
   (Component A) a radically polymerizable compound and
   (Component B) a radical polymerization initiator,
   Component A above comprising
   (Component A-1) an N-vinyl compound and
   (Component A-2) a compound represented by Formula (a-2) below, and
   when the content of the radical polymerization initiator in the white ink composition is X and the content of the radical polymerization initiator in the magenta ink composition is Y, Expression (1) below being satisfied

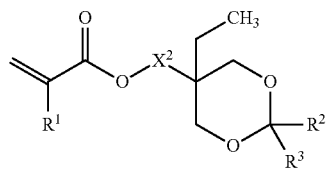

(a-2)

wherein $R^1$, $R^2$, and $R^3$ independently denote a hydrogen atom, a methyl group, or an ethyl group, and $X^2$ denotes a single bond or a divalent linking group $$0.1 \leq \frac{Y}{X} < 1. \qquad (1)$$

2. The ink set for forming multiple layers according to claim 1, wherein when the content of the radical polymerization initiator in the white ink composition is X and the content of the radical polymerization initiator in the magenta ink composition is Y, Expression (2) below is satisfied $$0.3 \leq \frac{Y}{X} < 1. \qquad (2)$$

3. The ink set for forming multiple layers according to claim 1, wherein Component A above further comprises (Component A-3) trimethylolpropane triacrylate.

4. The ink set for forming multiple layers according to claim 1, wherein Component A-1 above is an N-vinyllactam.

5. The ink set for forming multiple layers according to claim 1, wherein Component A-1 above comprises N-vinylcaprolactam.

6. The ink set for forming multiple layers according to claim 1, wherein the content of the radical polymerization initiator in the magenta ink composition is at least 3 wt % but less than 12 wt %, and the content of the radical polymerization initiator in the white ink composition is at least 12 wt % but no greater than 20 wt %.

7. The ink set for forming multiple layers according to claim 1, wherein Component A above comprises a monofunctional radically polymerizable compound in an amount of at least 50 wt % but no greater than 90 wt % relative to the total amount of Component A.

8. The ink set for forming multiple layers according to claim 1, wherein the magenta ink composition comprises as Component B a bisacylphosphine oxide compound and/or a monoacylphosphine oxide compound, and the white ink composition comprises as Component B a monoacylphosphine oxide compound.

9. The ink set for forming multiple layers according to claim 1, wherein all the ink compositions have a surface tension of 32 to 40 mN/m.

10. The ink set for forming multiple layers according to claim 2, wherein Component A above further comprises (Component A-3) trimethylolpropane triacrylate.

11. The ink set for forming multiple layers according to claim 10, wherein Component A-1 above comprises N-vinylcaprolactam.

12. The ink set for forming multiple layers according to claim 11, wherein the content of the radical polymerization initiator in the magenta ink composition is at least 3 wt % but less than 12 wt %, and the content of the radical polymerization initiator in the white ink composition is at least 12 wt % but no greater than 20 wt %.

13. The ink set for forming multiple layers according to claim 11, wherein Component A above comprises a monofunctional radically polymerizable compound in an amount of at least 50 wt % but no greater than 90 wt % relative to the total amount of Component A.

14. The ink set for forming multiple layers according to claim 11, wherein the magenta ink composition comprises as Component B a bisacylphosphine oxide compound and/or a monoacylphosphine oxide compound, and the white ink composition comprises as Component B a monoacylphosphine oxide compound.

15. An ink jet recording method employing the ink set for forming multiple layers according to claim 1, the method comprising:
    an image formation step of carrying out image formation by discharging the colored ink composition, and
    a white ink layer application step of applying the white ink composition to thus form a white ink layer.

16. The ink jet recording method according to claim 15, wherein the method comprises in sequence
    an image formation step of carrying out image formation by discharging the colored ink composition onto a recording medium, and
    a white ink layer application step of applying the white ink composition onto the image that is formed to thus form a white ink layer.

17. The ink jet recording method according to claim 15, wherein the method comprises in sequence
    a white ink layer application step of applying the white ink composition onto a recording medium to thus form a white ink layer, and
    an image formation step of carrying out image formation by applying the colored ink composition onto the white ink layer.

18. The ink jet recording method according to claim 15, wherein the method comprises
    a scanning step of reciprocatingly moving in a first direction relative to a recording medium an ink jet head comprising a plurality of nozzle arrays comprising a first nozzle array having a plurality of nozzles arranged for discharging the colored ink composition and a second nozzle array having a plurality of nozzles arranged for discharging the white ink composition,
    a relative movement step of moving the recording medium relative to the ink jet head in a second direction that is not parallel to the first direction,
    a discharge control step of dividing the nozzle array into a plurality of regions in the second direction and controlling ink discharge of the ink jet head for each of the divided nozzle region, and
    an actinic radiation irradiation step of carrying out irradiation with actinic radiation of ink that has been discharged from the ink jet head in the discharge control step and is attached to the recording medium,
    the actinic radiation irradiation step being a step of carrying out said irradiation with actinic radiation by dividing an area that is to be irradiated with actinic radiation into a plurality of regions corresponding to the divided nozzle regions, and controlling the amount of light for each of the divided irradiation regions individually for each region.

19. The ink jet recording method according to claim 18, wherein the nozzles for discharging the colored ink composition have a minimum droplet volume of at least 5 pL but less than 20 pL, and the nozzles for discharging the white ink composition have a minimum droplet volume of at least 20 pL but no greater than 60 pL.

20. A printed material obtained by the method according to claim 15.

* * * * *